(12) United States Patent
Liang et al.

(10) Patent No.: US 11,078,421 B2
(45) Date of Patent: Aug. 3, 2021

(54) LIQUID CRYSTAL COMPOSITION AND DISPLAY USING COMPOSITION

(71) Applicant: Shijiazhuang Chengzhi Yonghua Display Material Co., Ltd., Hebei (CN)

(72) Inventors: Ruixiang Liang, Hebei (CN); Wenxiao Xing, Hebei (CN); Gang Wen, Hebei (CN); Hongru Gao, Hebei (CN); Xuanfei Sun, Hebei (CN); Yapeng Huang, Hebei (CN); Xiaoming Xiong, Hebei (CN); Junhong Su, Hebei (CN)

(73) Assignee: SHIJIAZHUANG CHENGZHI YOUNGHUA DISPLAY MATERIAL CO., LTD., Shijiazhuang (CN)

( * ) Notice: Subject to any disclaimer, the term of this patent is extended or adjusted under 35 U.S.C. 154(b) by 88 days.

(21) Appl. No.: 16/374,119

(22) Filed: Apr. 3, 2019

(65) Prior Publication Data

US 2019/0316038 A1 Oct. 17, 2019

(30) Foreign Application Priority Data

Apr. 13, 2018 (CN) .......................... 201810329506.5

(51) Int. Cl.
| | | |
|---|---|---|
| G02F 1/1333 | (2006.01) |
| C09K 19/38 | (2006.01) |
| C09K 19/12 | (2006.01) |
| C09K 19/32 | (2006.01) |
| C09K 19/30 | (2006.01) |
| C09K 19/04 | (2006.01) |

(52) U.S. Cl.
CPC .......... *C09K 19/3861* (2013.01); *C09K 19/12* (2013.01); *C09K 19/3098* (2013.01); *C09K 19/32* (2013.01); *C09K 2019/0448* (2013.01); *C09K 2019/122* (2013.01); *C09K 2019/123* (2013.01); *C09K 2019/3004* (2013.01); *C09K 2019/3009* (2013.01); *C09K 2019/3016* (2013.01)

(58) Field of Classification Search
CPC .... C09K 19/3861; C09K 19/12; C09K 19/32; C09K 19/3098; C09K 2019/0448; C09K 2019/122; C09K 2019/123; C09K 2019/3004; C09K 2019/3009; C09K 2019/3016; G02F 1/1333
USPC ..................................................... 252/299.62
See application file for complete search history.

(56) References Cited

U.S. PATENT DOCUMENTS 7,731,865 B2 * 6/2010 Bernatz ................ C09K 19/42
252/299.01
2019/0316038 A1 * 10/2019 Liang ................ C09K 19/3098

* cited by examiner

*Primary Examiner* — Geraldina Visconti
(74) *Attorney, Agent, or Firm* — Muncy, Geissler, Olds and Lowe, P.C.

(57) ABSTRACT

Provided are a polymerizable composition of a polymerizable compound represented by formula I and a polymerizable compound represented by formula II, a liquid crystal composition formed by combining this polymerizable composition with a specific liquid crystal component, particularly a PSVA liquid crystal composition suitable for display or TV applications, and a PSA-IPS liquid crystal composition for an IPS mode; in particular, the polymerizable liquid crystal composition has a good solubility, and an adjustable rate of polymerization and morphology after polymerization; furthermore, a "material system" formed from the selected polymerizable component and liquid crystal component has a low rotary viscosity and good photoelectric properties, and has a high VHR after (UV) photoradiation, this avoiding the problems of the occurrence of afterimages in final displays, etc.

9 Claims, No Drawings

LIQUID CRYSTAL COMPOSITION AND DISPLAY USING COMPOSITION

TECHNICAL FIELD

The present invention relates to the liquid crystal display field, and in particular relates to a liquid crystal composition formed by combining a specific polymerizable liquid crystal composition with a specific liquid crystal component, and a display element or liquid crystal display comprising the liquid crystal composition.

BACKGROUND ART

As the leader of flat panel displays, TFT-LCD has gradually taken a dominant position in the display field. TFT-LCD is currently mostly used in high-end fields where there are quite strict requirements for viewing angle, e.g. aerospace, medicine, and graphic image processing. However, when viewing a display at a position deviated from the normal line perpendicular to the display, the contrast of display pictures is significantly reduced, and grayscale inversion even occurs when the viewing angle is large, which may seriously affect the application field of TFT-LCD. Therefore, from the birth of active matrix LCD, wide viewing angle technologies have all the time been an important research topic for liquid crystal display technicians[1].

At present, relatively popular wide viewing angle technologies mainly include TN+Wide Film (TN+a wide viewing angle polarizer); VA (vertical alignment wide viewing angle active matrix display technologies), including PVA, MVA, PSVA, etc.; IPS (in-plane switching display technology); FFS (fringe field switching wide viewing technology), etc. Since vertical alignment liquid crystal displays have excellent properties such as a higher contrast and a fast response time, vertical alignment has become the focus of current researches.

The liquid crystal vertical alignment (VA) technologies realize the symmetry of optical properties by converting a conventional single domain structure into a multi-domain structure, and realize a wide viewing angle display by means of optical film compensation. The advantage of the vertical alignment mode is that the front contrast is extremely high and can easily reach a value of 500:1 or more. VA mode LCDs operate in a normally black mode, thereby greatly reducing the possibility of "bright spots" on LCD panels. Polymerizable mesogenic units (RMs) are currently a very popular and important topic in the display industry, and possible application fields thereof include polymer stabilized alignment (PSA) liquid crystal display, polymer stabilized blue-phase (PS-BP) liquid crystal display, pattern retarder films, etc.

The PSA principle is being applied to different typical LC displays such as PSA-VA, PSA-OCB, PS-IPS/FFS and PS-TN liquid crystal displays. Taking the most widely used PSA-VA display as an example, the pretilt angle of a liquid crystal cell can be obtained by a PSA method, and the pretilt angle has a positive effect on the response time. For PSA-VA displays, standard MVA or PVA pixel and electrode designs can be used; however, if a specially patterned design is used the electrode design on one side and no protrusion design is used on the other end, the production can be significantly simplified while the display is imparted with a very good contrast and a very high light transmittance.

PSVA technology is a polymer-stabilized vertical alignment technology jointly developed by AUO and Merck. This technology mainly involves controlling the liquid crystal to tilt by TFT/ITO electrodes with slits; in addition, photosensitive macromolecules are added to the liquid crystal material, a panel is assembled, an electric field is then applied to tilt the liquid crystal, a photosensitive monomer in the liquid crystal is reacted by means of ultraviolet light, and the liquid crystal is caused to have a pretilt angle in accordance with the driving direction of the electric field to achieve multi-domain characteristics[2]. Therefore, compared with MVA/PVA technology, the advantages of PSVA are a good black state, a fast response time, a high transmittance, low costs, etc.

It has been found in the prior art that LC mixtures and RMs still have some disadvantages in applications in PSA displays. First, so far not every desired soluble RM is suitable for use in PSA displays; in addition, if it is desired to carry out a polymerization by means of a UV light without the addition of a photoinitiator (which may be advantageous for some applications), the choice becomes narrower; furthermore, a "material system" formed from an LC mixture (hereinafter also referred to as an "LC host mixture") in combination with the selected polymerizable component should have the lowest rotary viscosity and the best photoelectric performance for increasing the "voltage holding ratio" (VHR) to achieve effects. In terms of PSA-VA, a high VHR after photoradiation using (UV) light is very important; otherwise, the problems of the occurrence of afterimages in the display, etc., may be finally caused. So far, not all combinations of LC mixtures and polymerizable components are suitable for PSA displays. This is mainly due to the effects in the aspects of the UV-sensitive wavelength of polymerizable units being too short, or there being no or an insufficient tilt angle after light irradiation, or the polymerizable component having a poorer homogeneity after light irradiation, or due to the VHR after UV being lower for TFT display applications, etc.

Due to the selection of different UV wavelengths and irradiation processes by different device manufacturers, corresponding polymers required for the optimal process are also not the same, and it is very difficult to meet requirements of a manufacturer by using a single polymer; to match up with different manufacturers, the development of different polymerizable liquid crystal compositions is the key to success, and different polymerizable liquid crystal compositions may be formed by means of the adjustment of different polymerizable liquid crystal compounds; the polymerizable liquid crystal compositions formed by means of adjustments as such may be adjusted for the rate of polymerization according to the requirements of different manufacturers, and the polymerizable component has a good effect on the rotary viscosity, VHR and pretilt angle of the liquid crystal compounds; furthermore, the composition has better solubility properties than a single compound.

SUMMARY OF THE INVENTION

The present invention provides a polymerizable liquid crystal composition, a liquid crystal composition formed by combining such a polymerizable liquid crystal compound with a specific liquid crystal component, a liquid crystal display element or liquid crystal display comprising the liquid crystal composition; in particular, a PSVA liquid crystal composition for displays or TV applications, and a PSA-IPS liquid crystal composition for an IPS mode; in particular, the polymerizable liquid crystal composition has a good solubility and an adjustable rate of polymerization; in addition, a "material system" formed from the selected polymerizable liquid crystal composition and liquid crystal component has a low rotary viscosity and good photoelectric properties, and has a high VHR after (UV) photoradiation, this avoiding the problems of the occurrence of afterimages in final displays, etc.

In order to achieve the above-mentioned advantageous technical effects, the present invention provides a polymerizable liquid crystal composition characterized by comprising one or more polymerizable liquid crystal compounds represented by formula I and one or more polymerizable liquid crystal compounds represented by formula II:

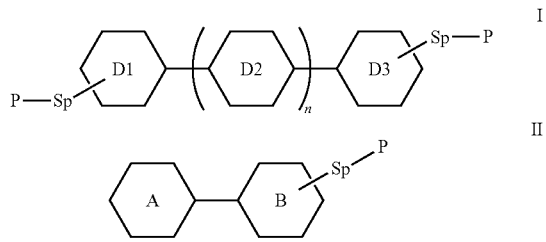

wherein

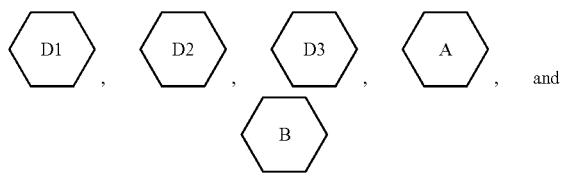

each independently represent

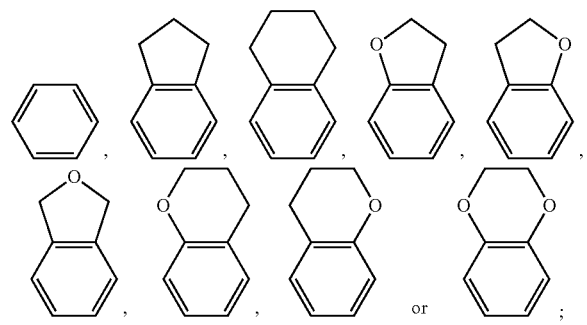

each P independently represents a polymerizable group

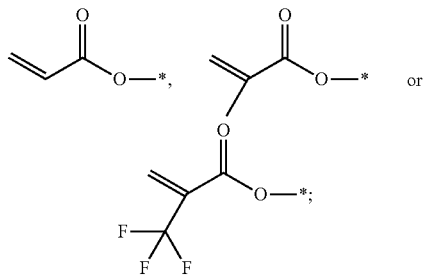

each Sp independently represents a single bond, a C1-C5 alkyl group, a C2-C5 alkenyl group, or a group formed by replacing any one or more unconnected CH$_2$ in a C1-C5 alkyl group or a C2-C5 alkenyl group by —O—, —S—, —CO—, —CH$_2$O—, —OCH$_2$—, —COO—, —OOC— or an acrylate group; and n represents 0 or 1.

The present invention further provides a liquid crystal composition comprising the polymerizable liquid crystal composition of the present invention as a first component, one or more compounds represented by formula IV as a second component and one or more compounds represented by formula V as a third component:

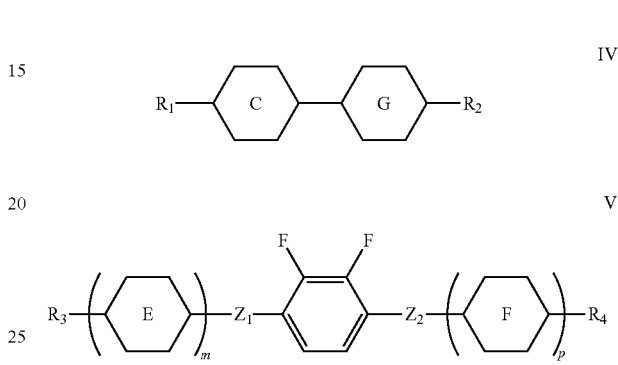

wherein $R_1$, $R_2$, $R_3$, and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected CH$_2$ in the groups represented by $R_3$ and $R_4$ may be substituted with cyclopentyl, cyclobutyl or cyclopropyl;

$Z_1$ and $Z_2$ each independently represent a single bond, —CH$_2$CH$_2$— or —CH$_2$O—;

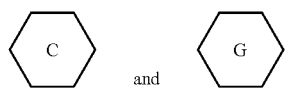

each independently represent

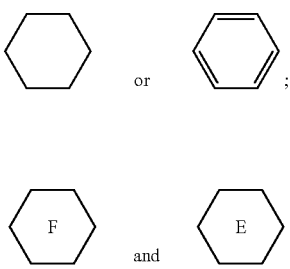

each independently represent one or more of

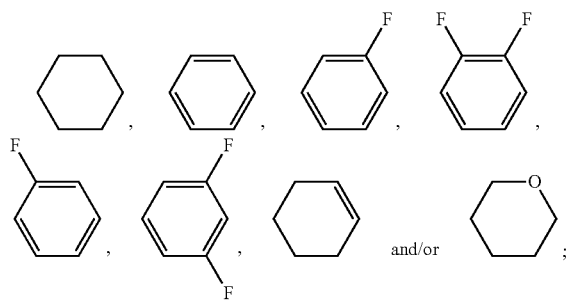

m represents 1 or 2; and
p represents 0, 1 or 2.

Further preferably, in the liquid crystal composition provided by the present invention, the total mass content of the polymerizable liquid crystal composition is 0.001%-1%, the total mass content of said one or more compounds of formula IV is 20%-80%, and the total mass content of said one or more compounds of formula V is 20%-60%.

The compound represented by formula I is preferably from compounds represented by formulas I-1 to I-20, and the compound represented by formula II is preferably from compounds represented by formula II-1 to II-15:

I-1
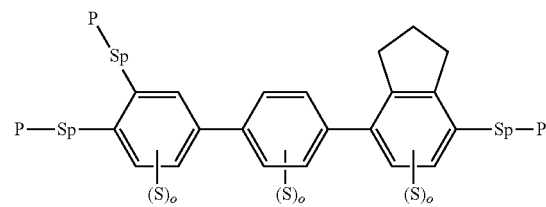

I-2
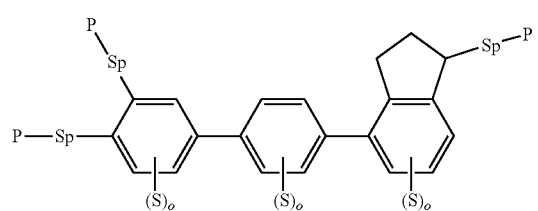

I-3
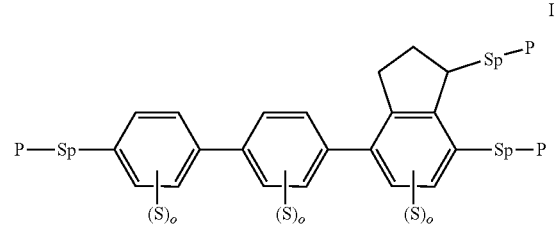

I-4
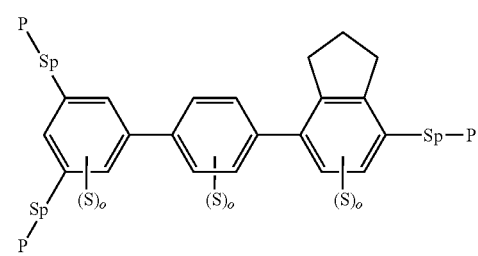

I-5
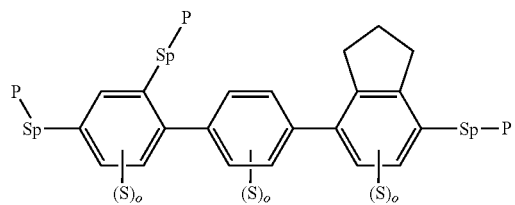

I-6
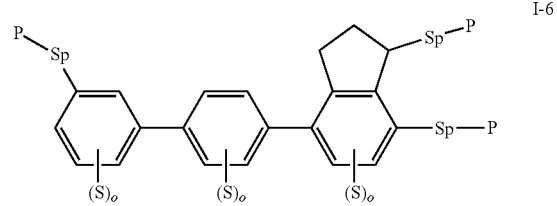

I-7
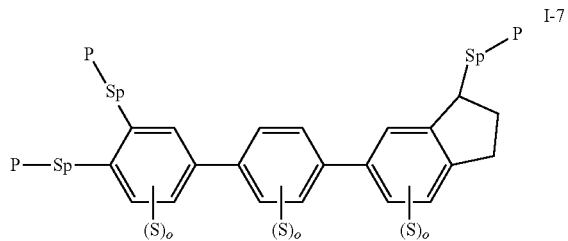

I-8
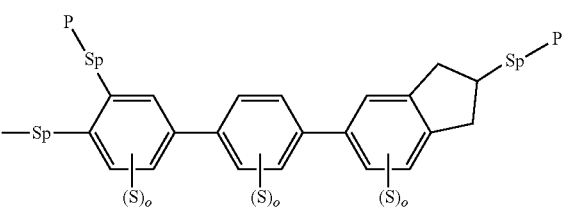

I-9
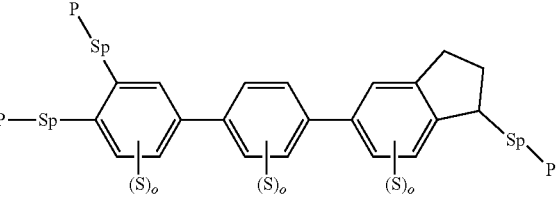

I-10
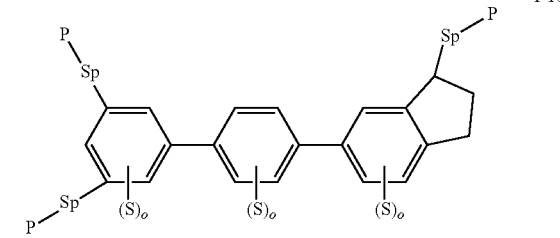

I-11
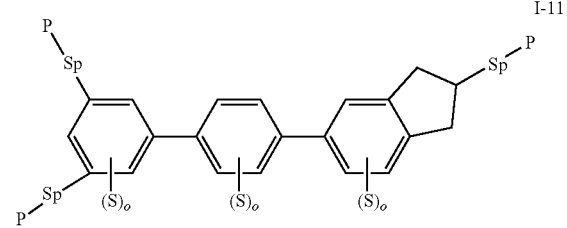

I-12
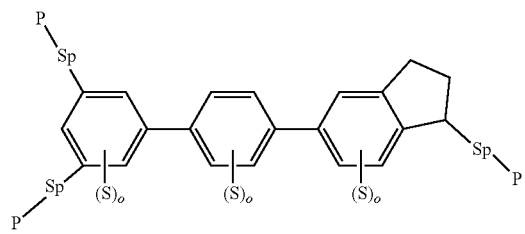
I-18
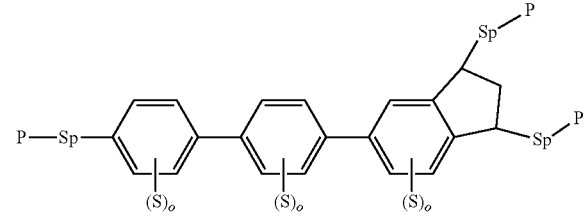
I-13
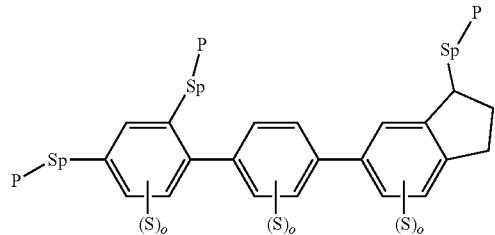
I-19
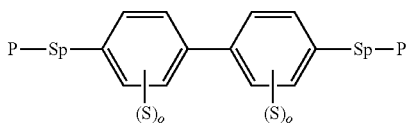
I-14
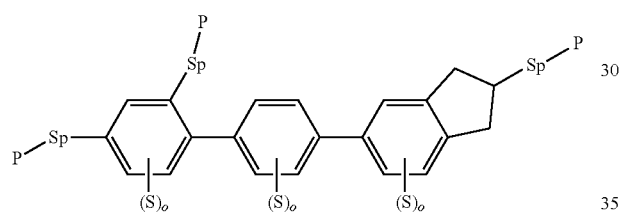
I-20
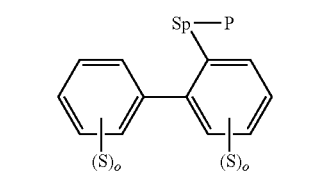
II-1
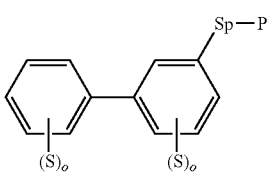
I-15
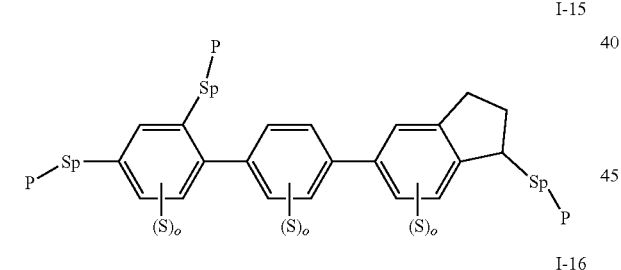
II-2
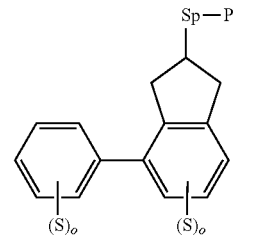
II-3
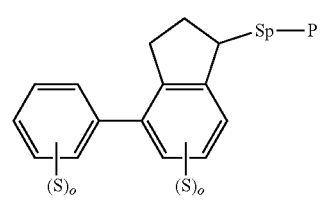
I-16
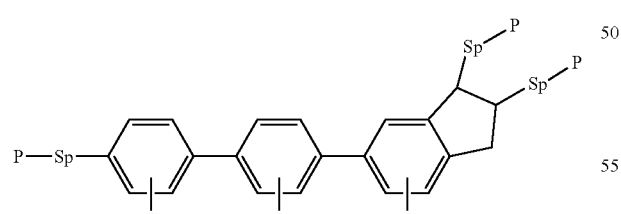
II-4
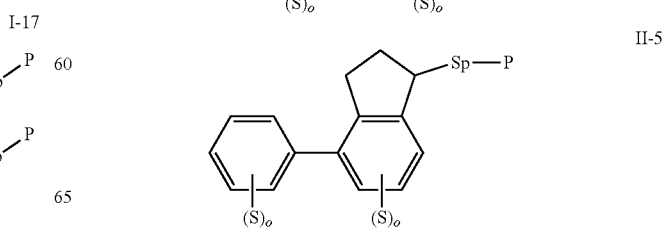
I-17
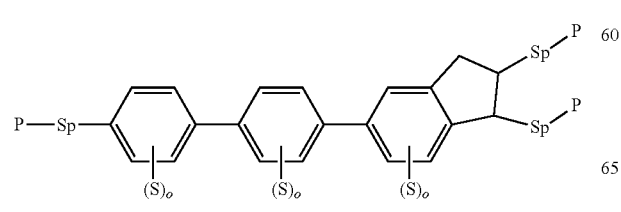
II-5

II-6
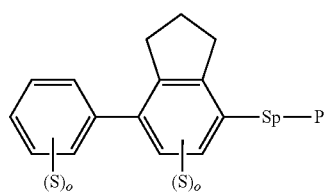

II-7
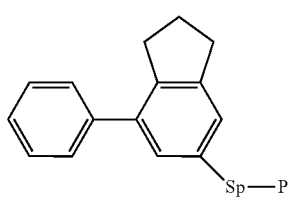

II-8
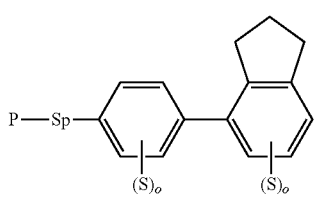

II-9
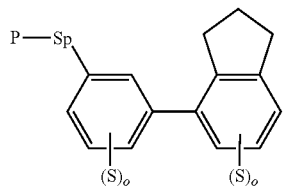

II-10
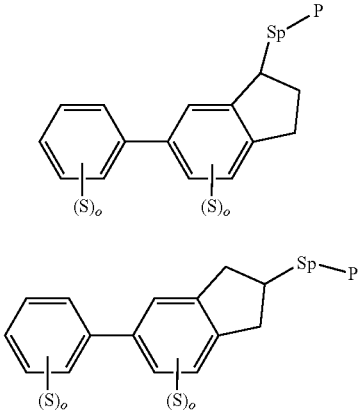

II-11

II-12
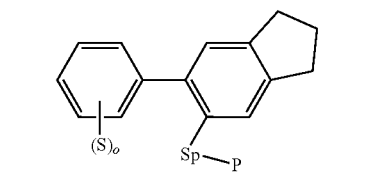

II-13
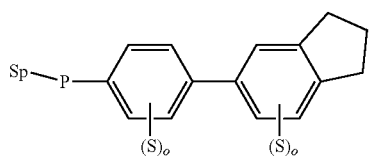

II-14
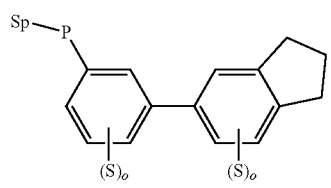

wherein
each S independently represents H, a C1-C5 alkyl group, a C1-C5 alkoxy group, a fluorine-substituted C1-C5 alkyl group, a fluorine-substituted C1-C5 alkoxy group, F or Cl, wherein any one or more unconnected CH$_2$ in the groups represented by S may be independently replaced by —O—, —S—, —CO—, —CH$_2$O—, —OCH$_2$—, —COO—, —OOC— or an acrylate group or a methacrylate group;
each P independently represents

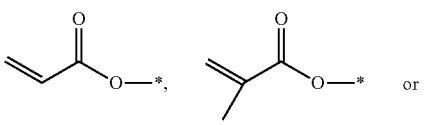

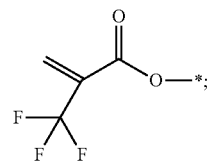

each Sp independently represents a single bond, a C1-C5 alkyl group, a C2-C5 alkenyl group, wherein any one or more unconnected CH$_2$ may be replaced by —O—, —S—, —CO—, —CH$_2$O—, —OCH$_2$—, —COO—, —OOC— or an acrylate group; and
each o independently represents 0, 1, 2 or 3.

The compound represented by formula I is further preferably from compounds represented by formulas I-1-1 to I-20-19, and the compound represented by formula II is further preferably from compounds represented by formulas II-1-1 to II-15-13:

I-1-1
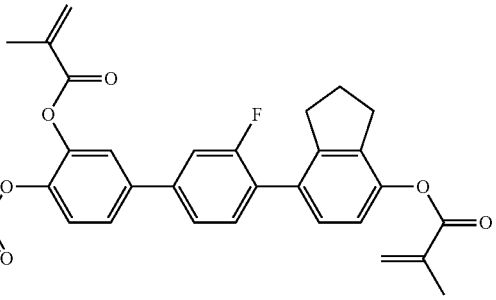

I-1-2
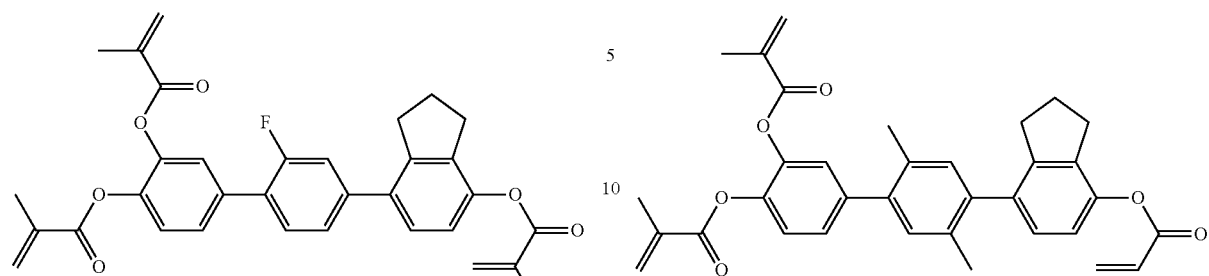
I-1-3
I-1-4
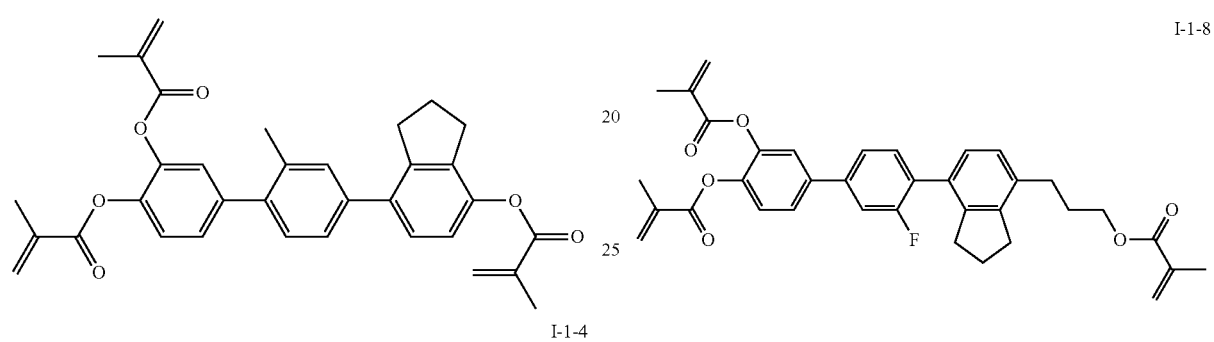
I-1-5
I-1-6
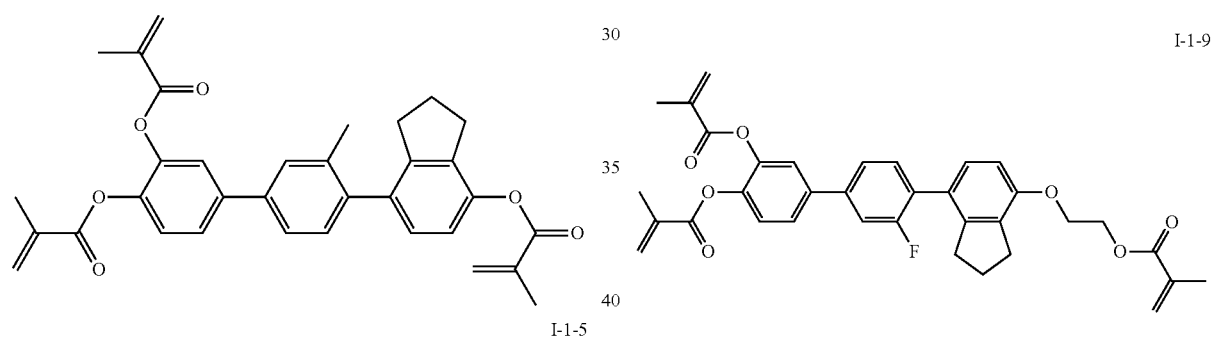
I-1-7
I-1-8
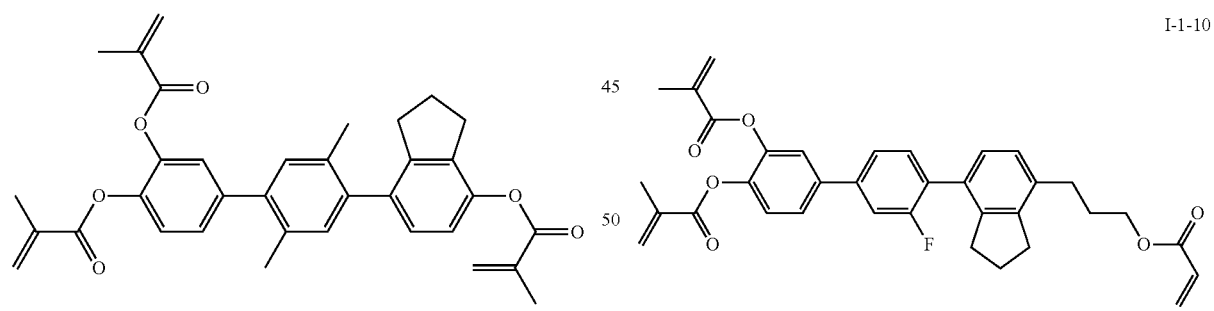
I-1-9
I-1-10
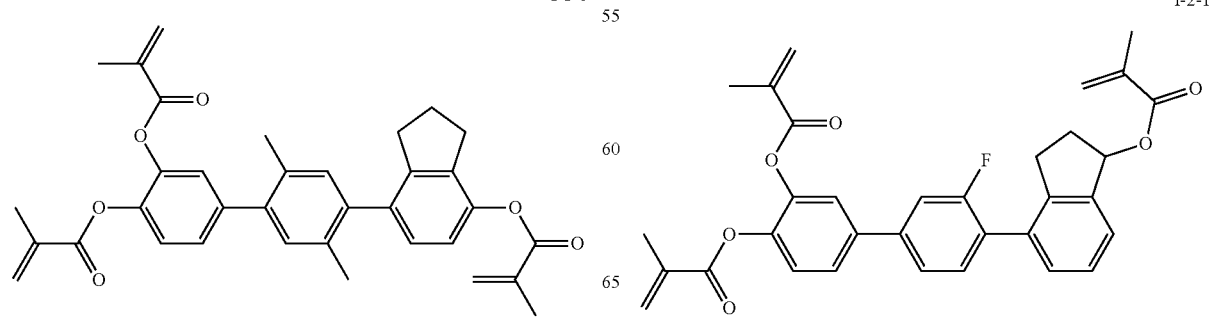
I-2-1

I-2-2
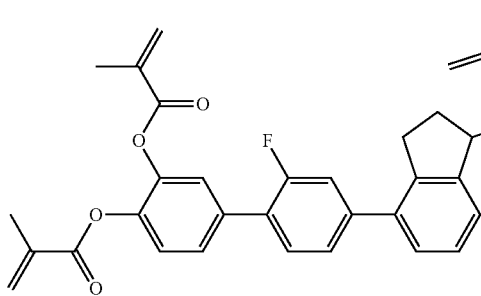
I-2-7
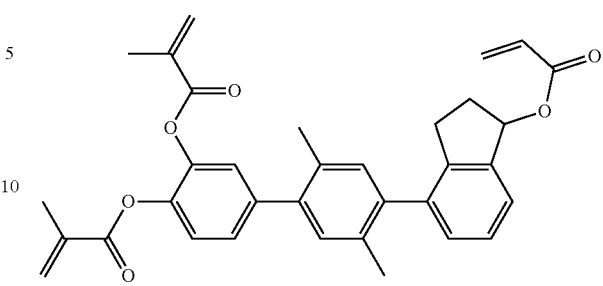
I-2-3
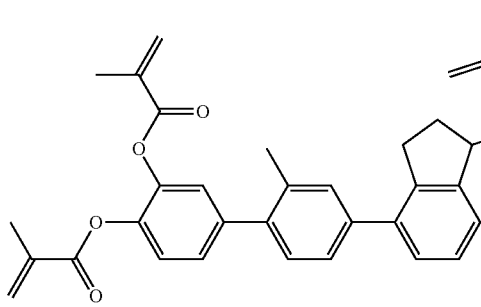
I-2-8
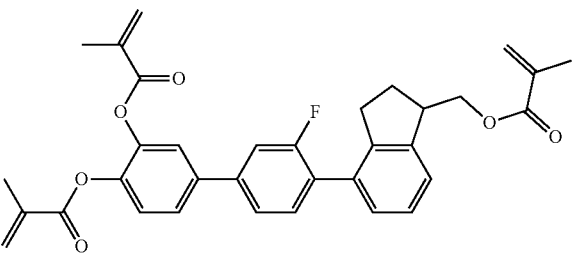
I-2-4
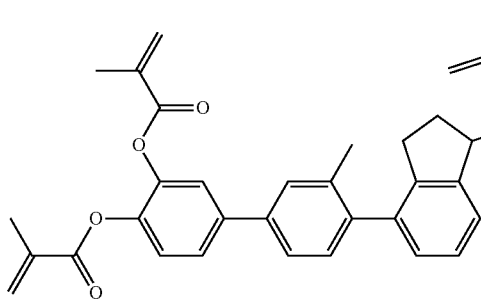
I-2-9
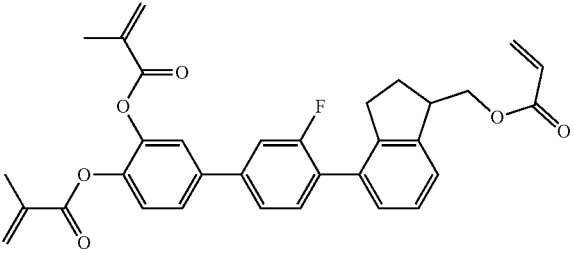
I-2-5
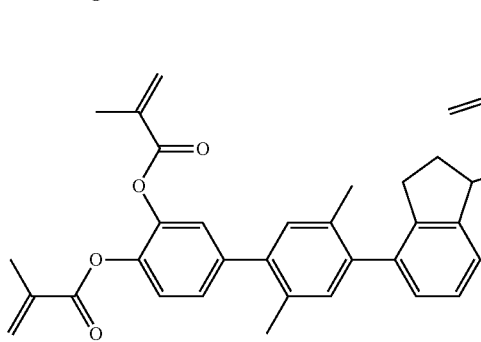
I-3-1
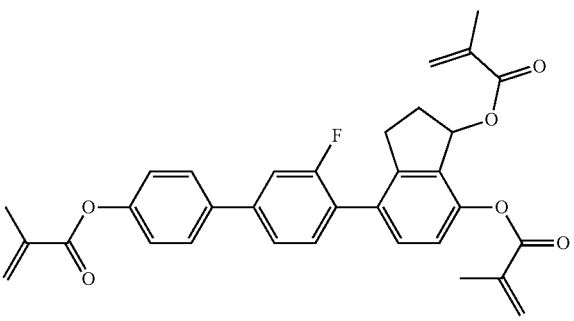
I-2-6
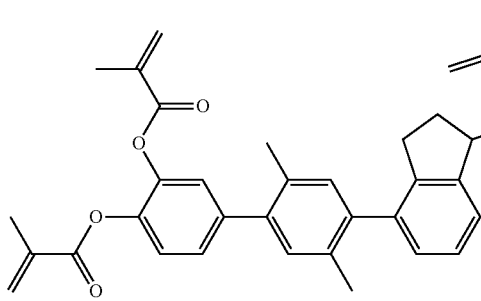
I-3-2
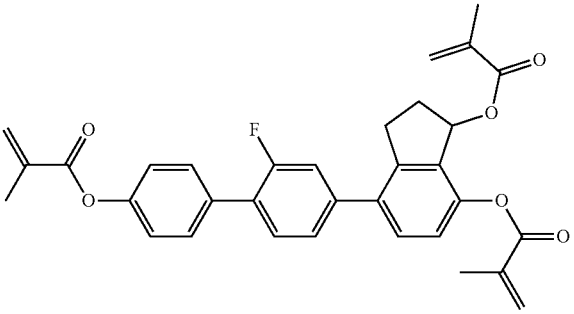

I-3-3
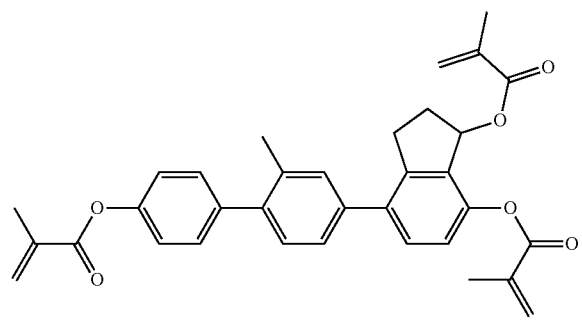
I-3-4
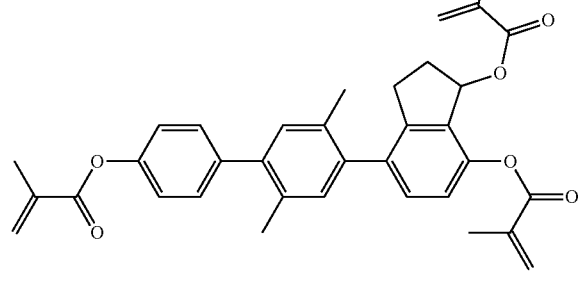
I-3-5
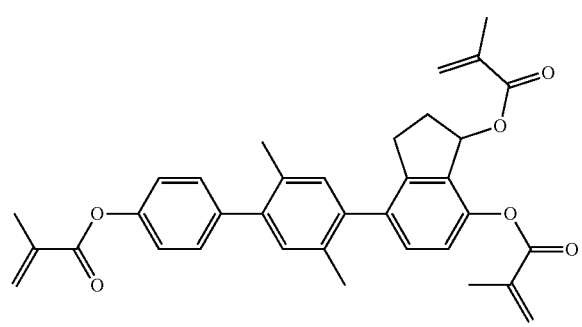
I-3-6
I-3-7
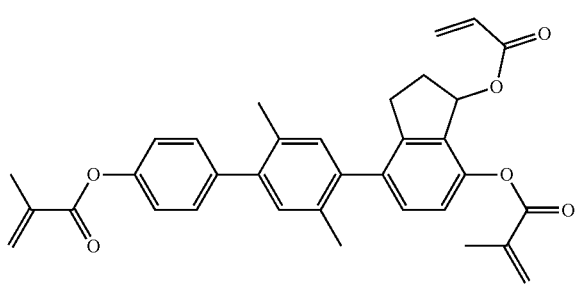
I-3-8
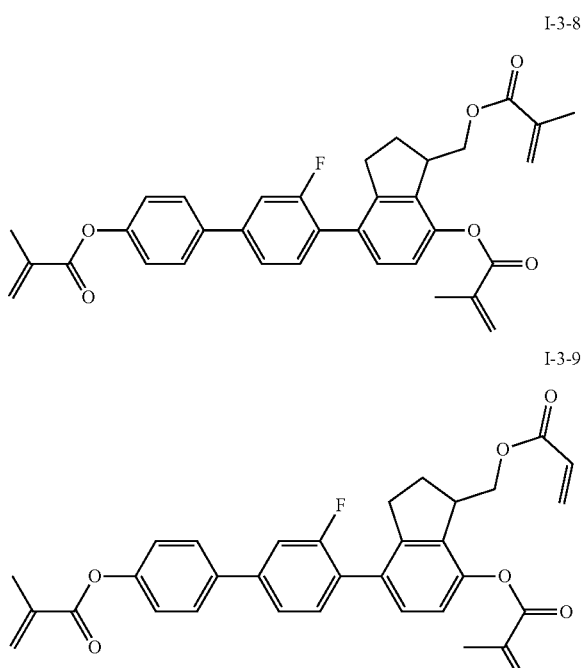
I-3-9
I-3-10
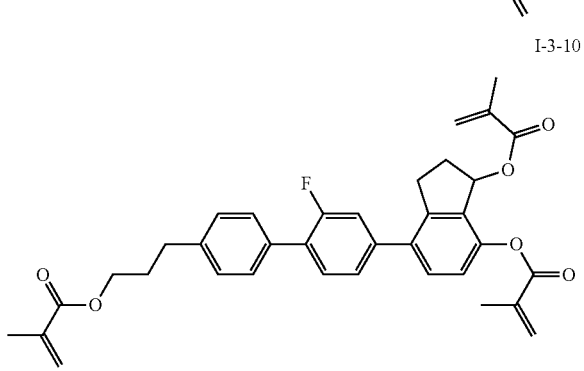
I-3-11
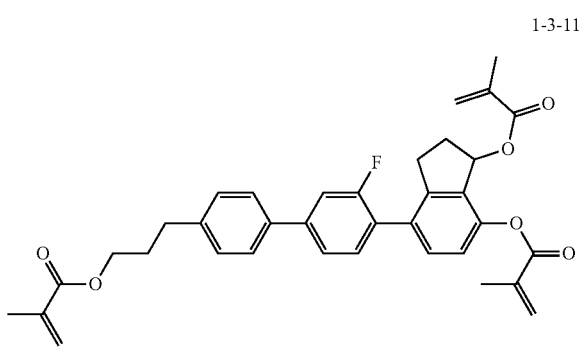

I-4-1
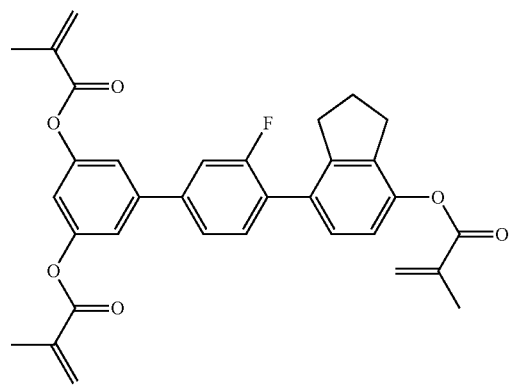
I-4-2
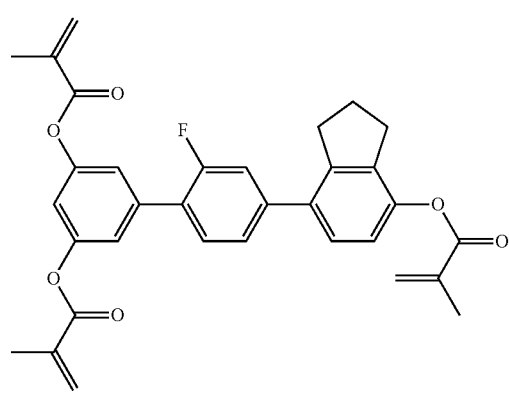
I-4-3
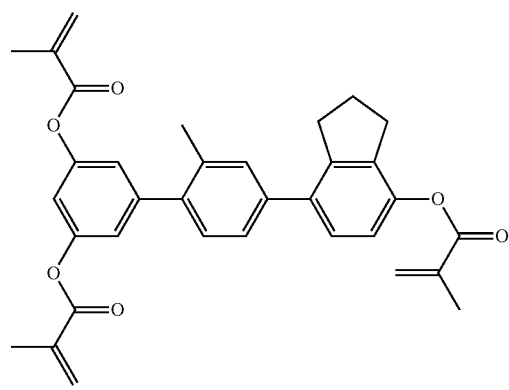
I-4-4
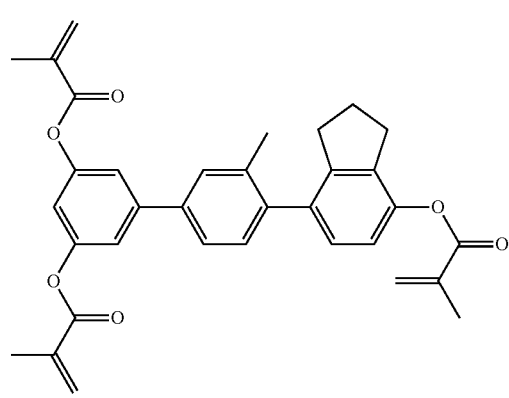
I-4-5
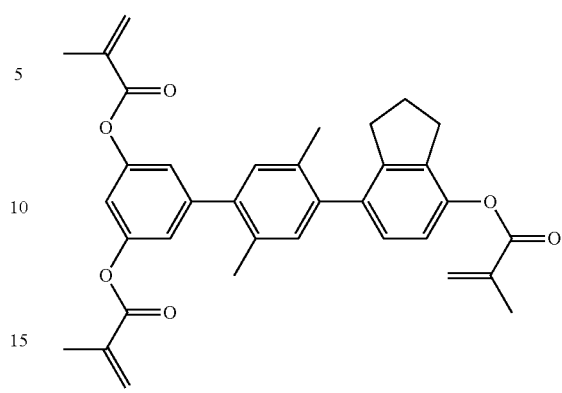
I-4-6
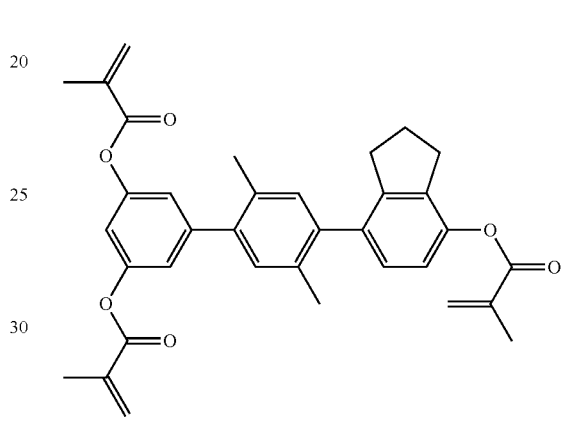
I-4-7
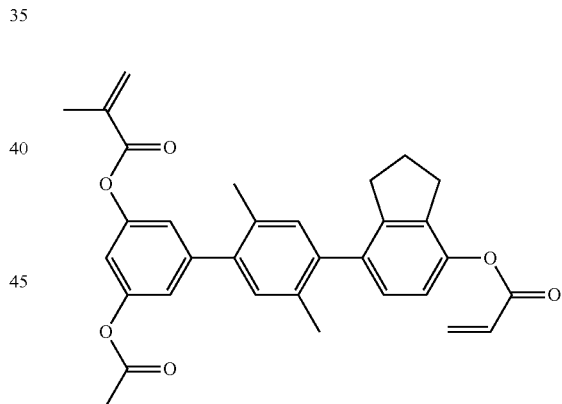
I-4-8
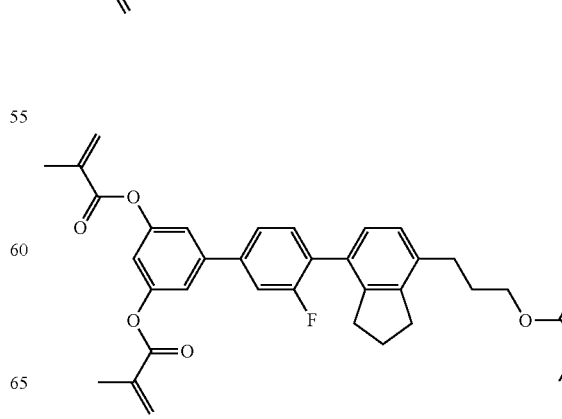

-continued
I-4-9
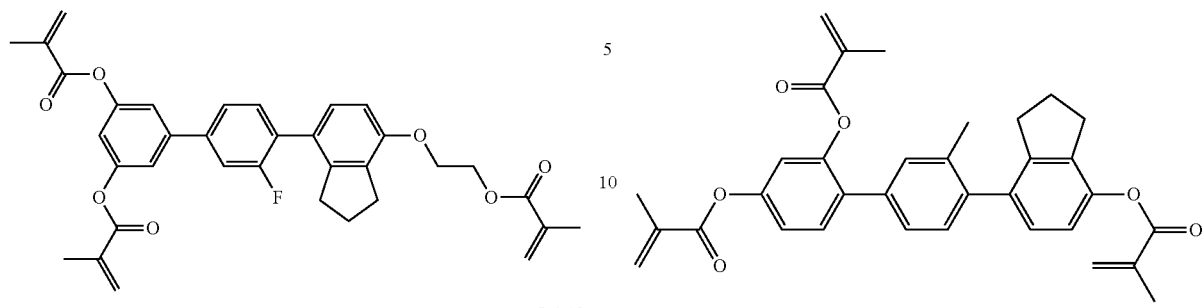
I-4-10
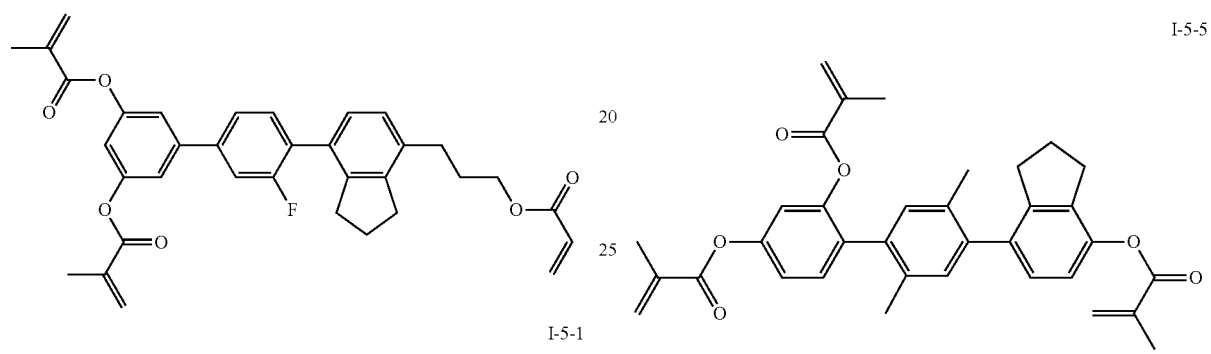
I-5-1
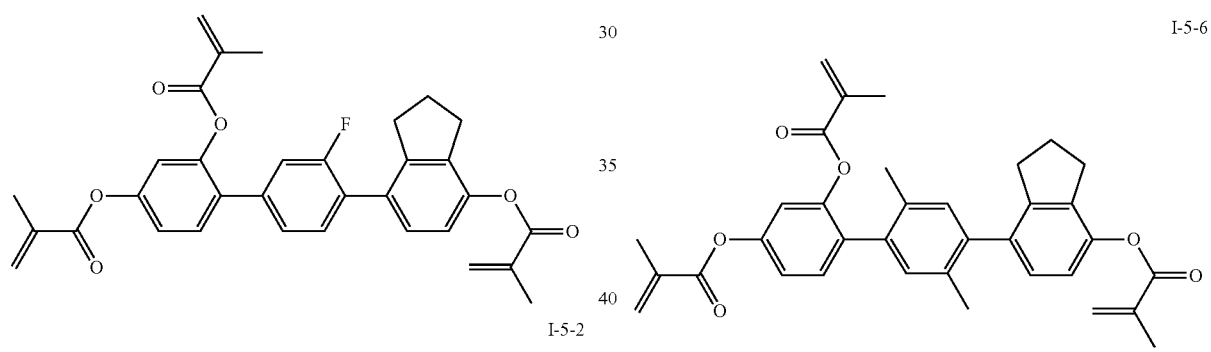
I-5-2
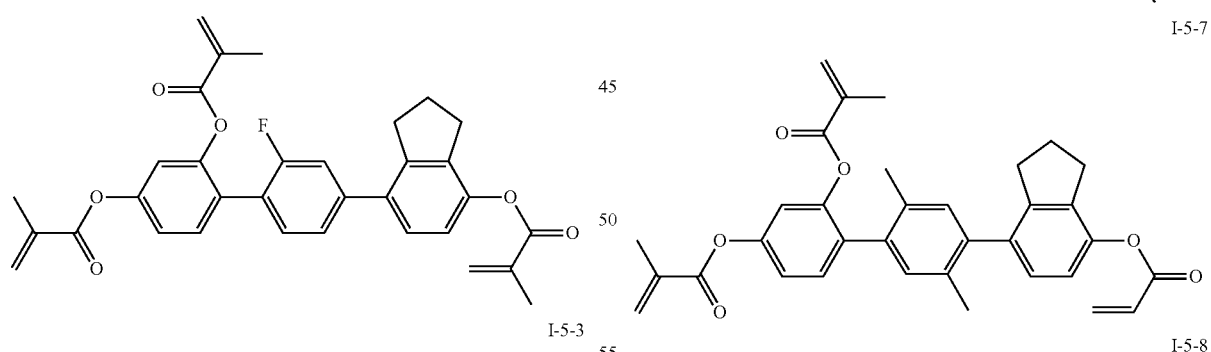
I-5-3
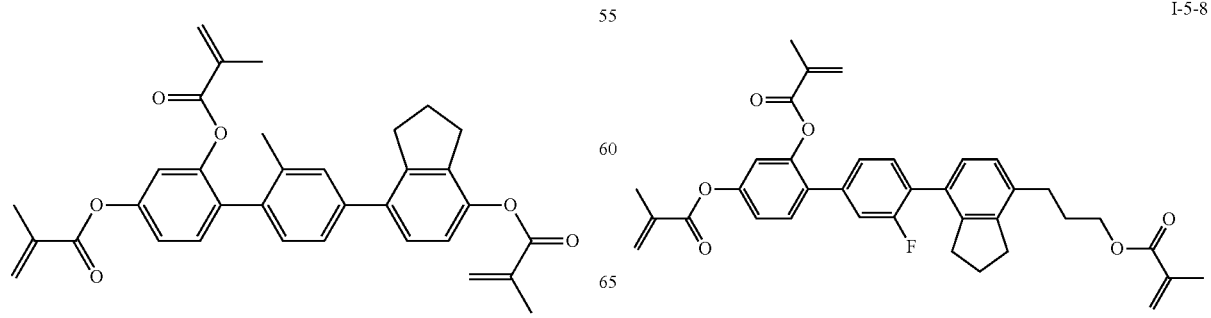
-continued
I-5-4
I-5-5
I-5-6
I-5-7
I-5-8

I-5-9
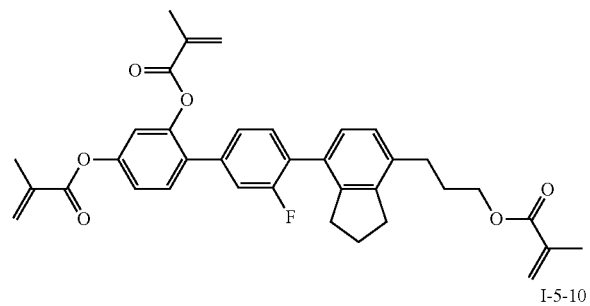
I-5-10
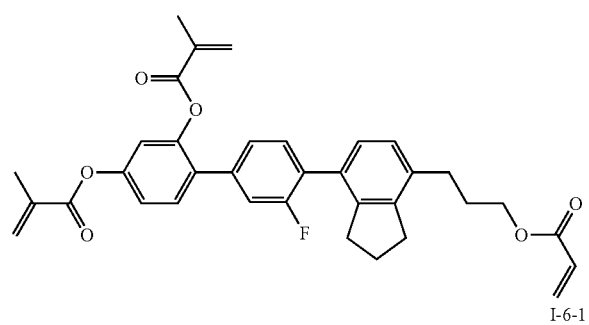
I-6-1
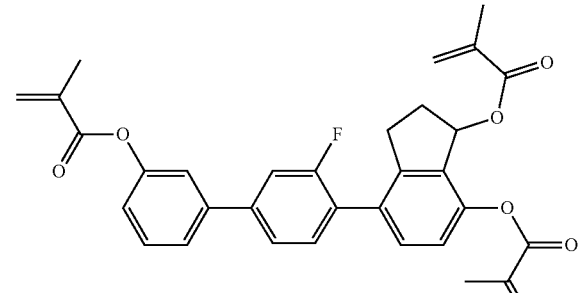
I-6-2
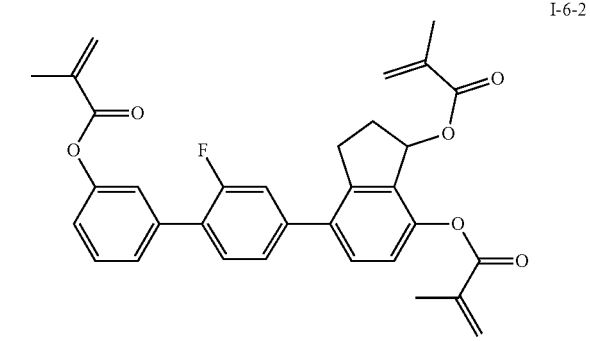
I-6-3
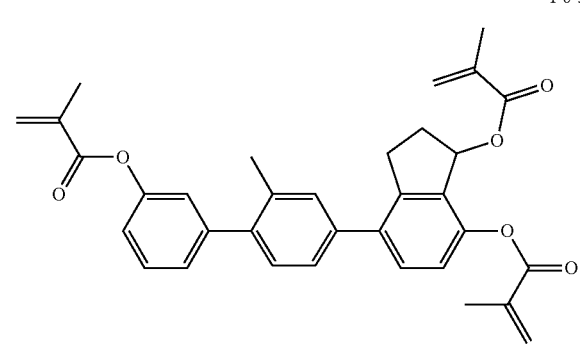
I-6-4
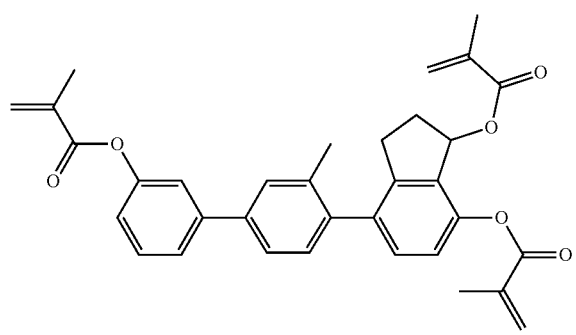
I-6-5
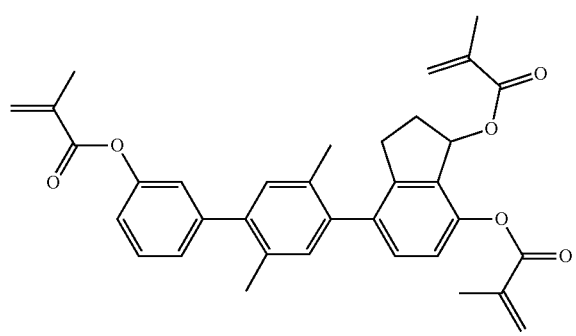
I-6-6
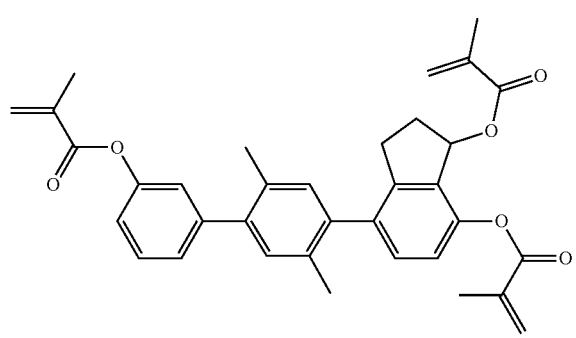
I-6-7
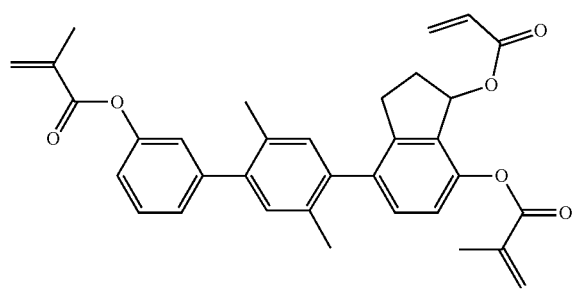

-continued
I-6-8
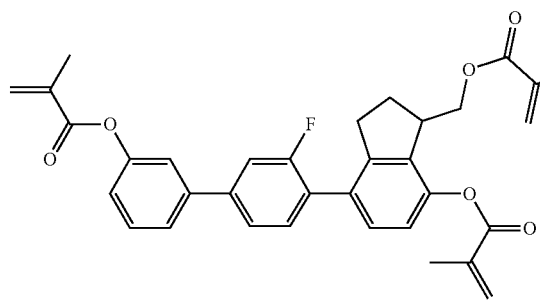
I-6-9
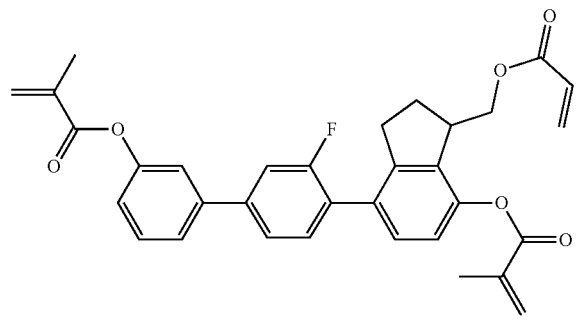
I-6-10
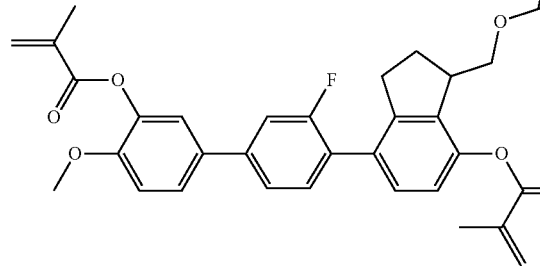
I-7-1
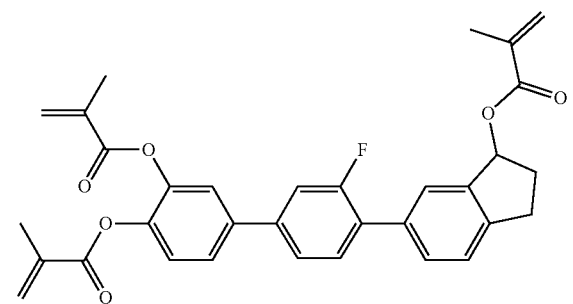
-continued
I-7-2
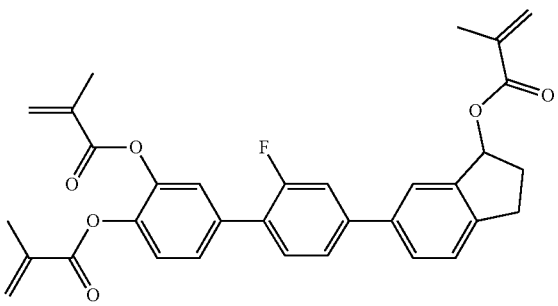
I-7-3
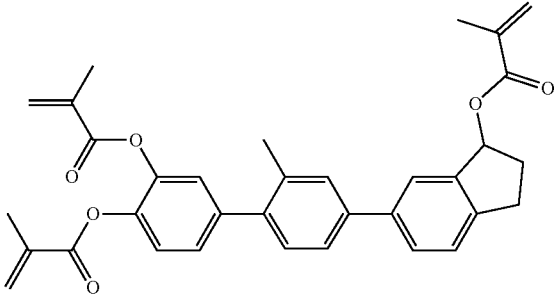
I-7-4
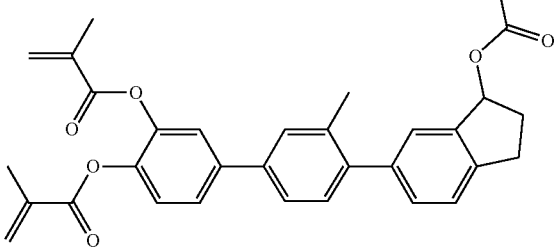
I-7-5
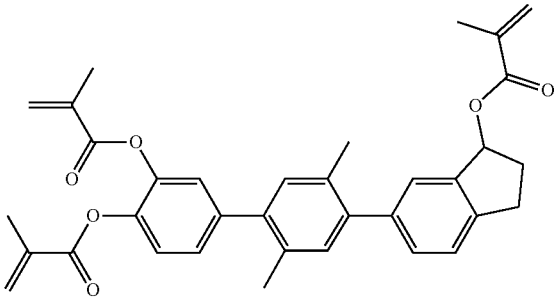
I-7-6
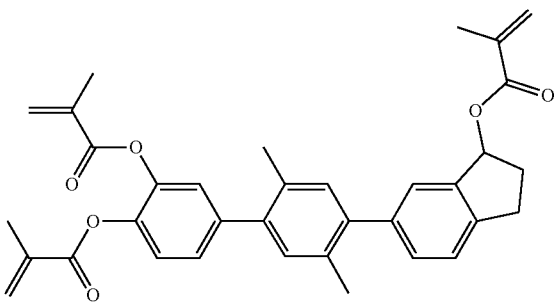

I-7-7
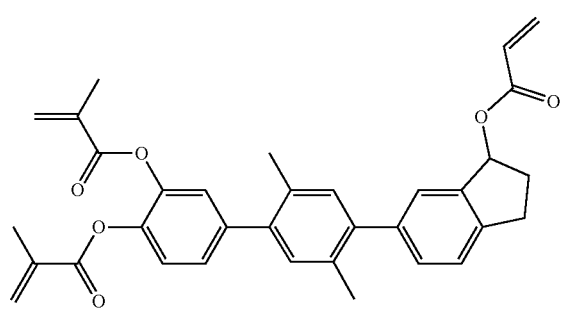
I-7-8
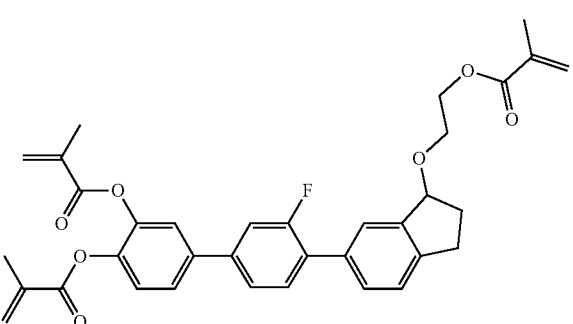
I-7-9
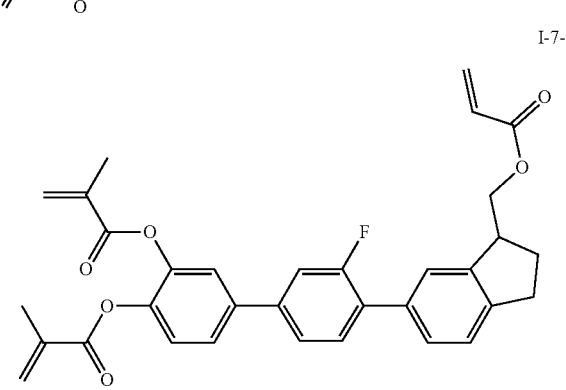
I-7-10
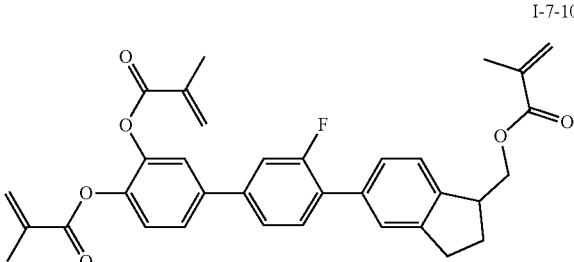
I-7-11
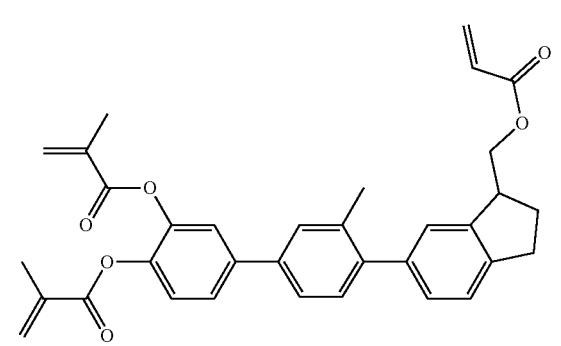
I-7-12
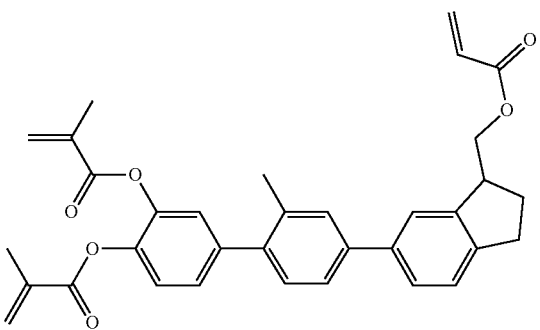
I-7-13
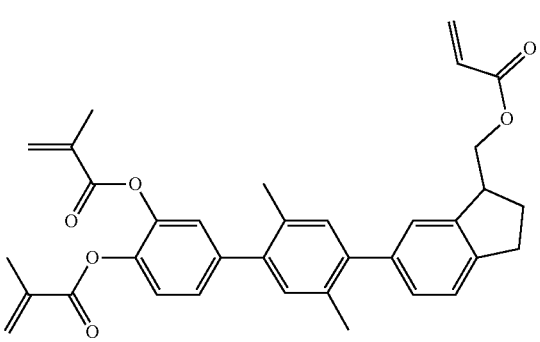
I-7-14
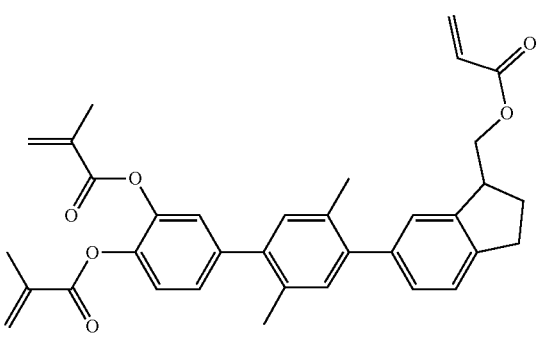
I-7-15
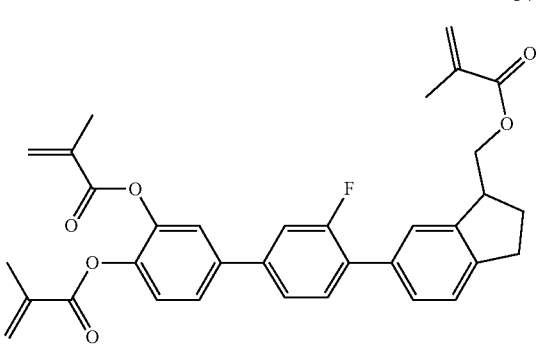

I-7-16

I-7-17

I-7-18

I-7-19

I-7-20

I-8-1

I-8-2

I-8-3

I-8-4

I-8-5

I-8-6
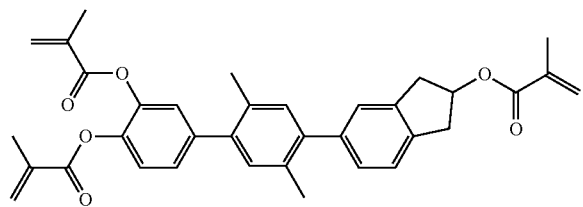
I-8-7
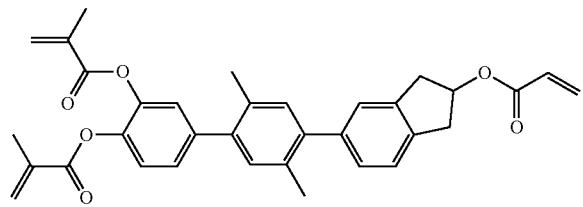
I-8-8
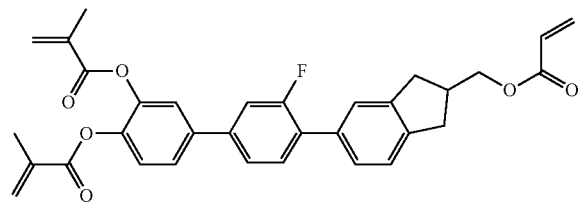
I-8-9
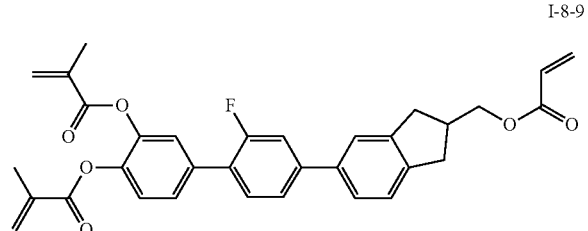
I-8-10
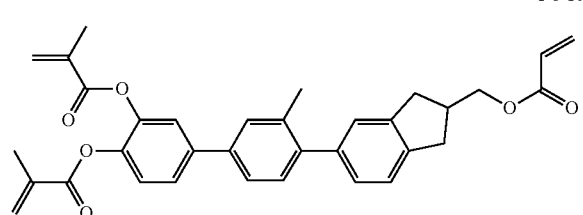
I-8-11
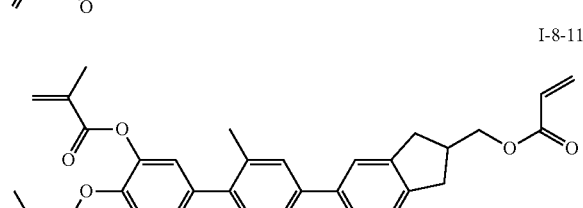
I-8-12
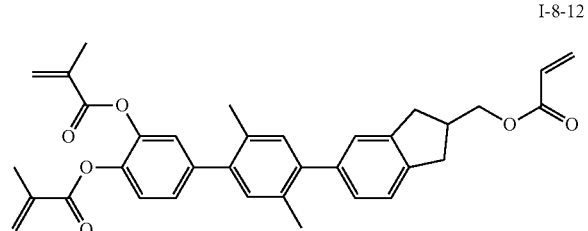
I-8-13
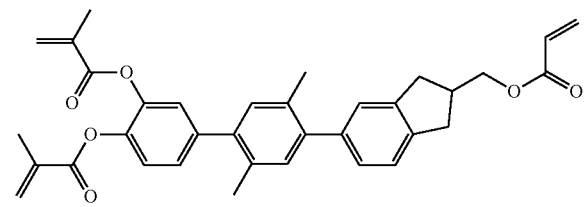
I-8-14
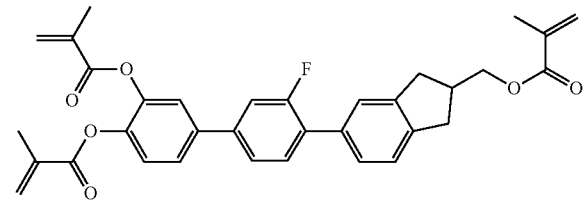
I-8-15
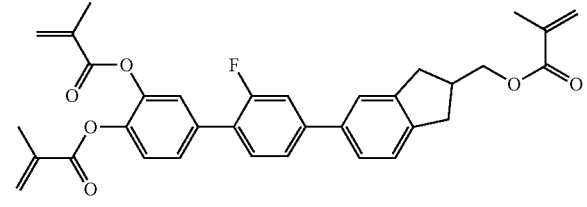
I-8-16
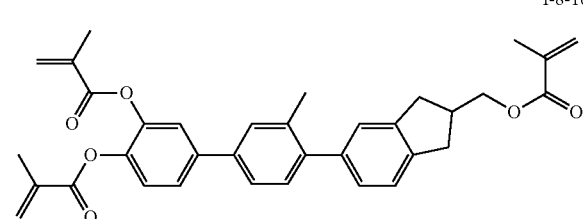
I-8-17
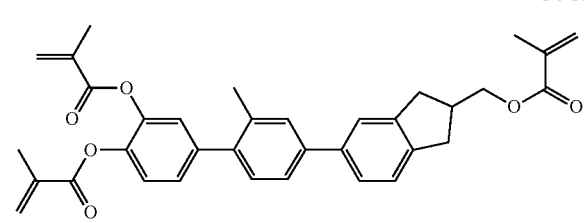
I-8-18
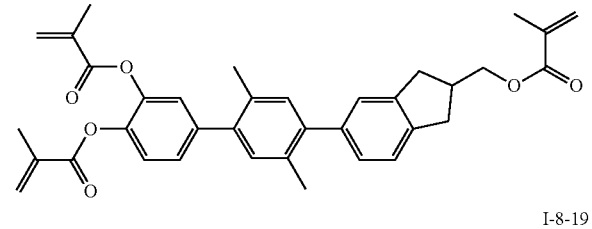
I-8-19
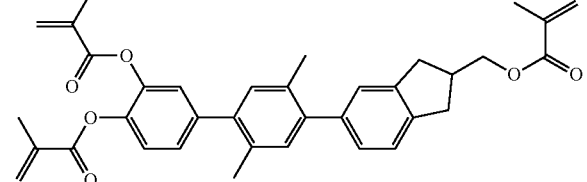

-continued
I-9-1
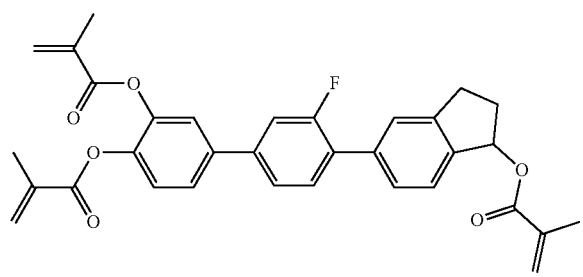
I-9-2
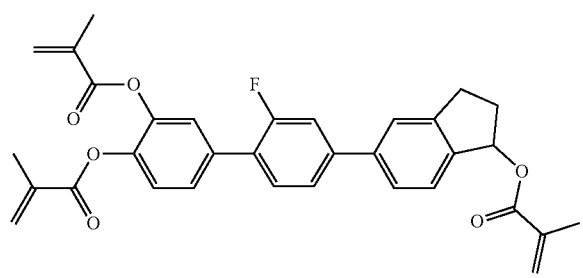
I-9-3
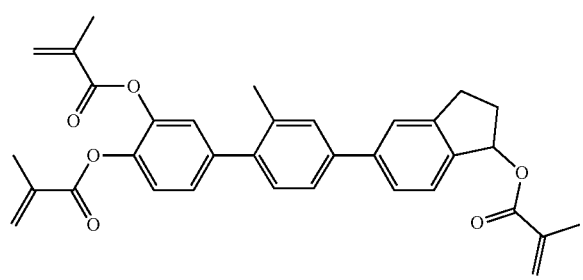
I-9-4
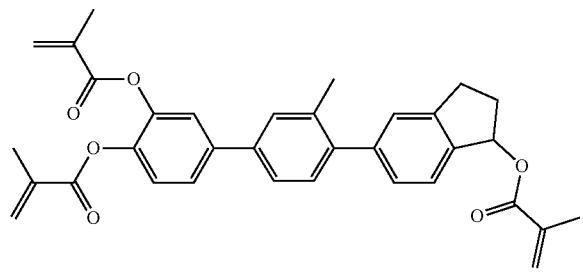
I-9-5
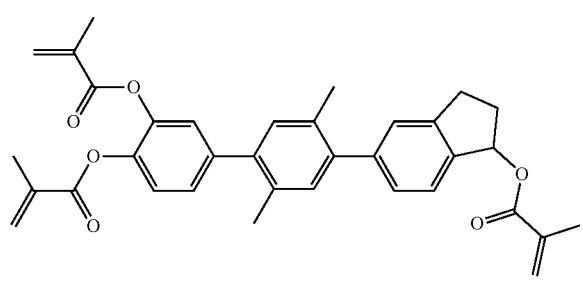
-continued
I-9-6
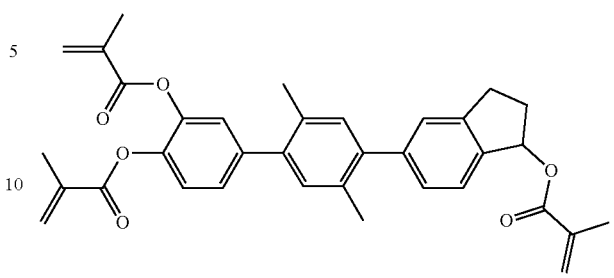
I-9-7
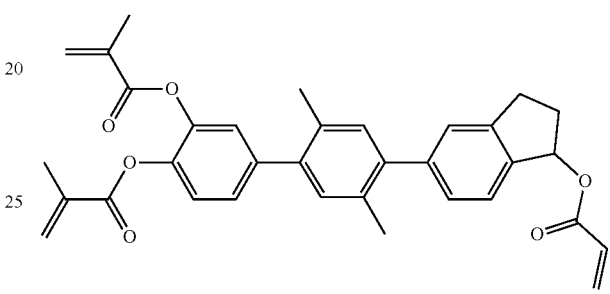
I-9-8
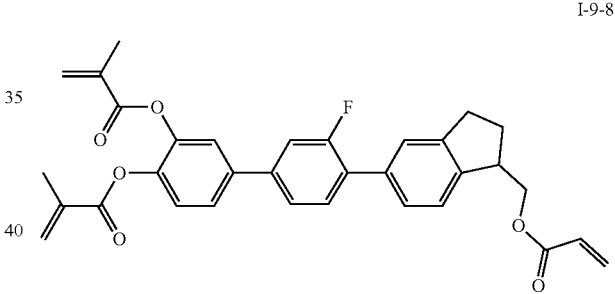
I-9-9
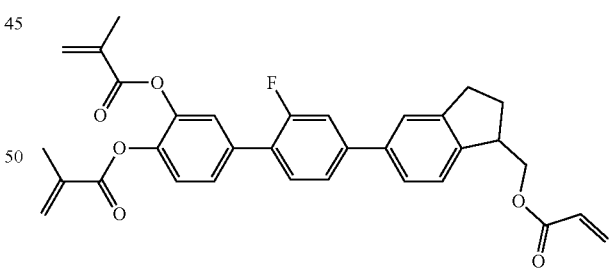
I-9-10
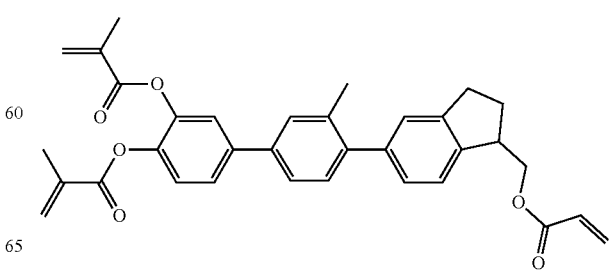

-continued
I-9-11
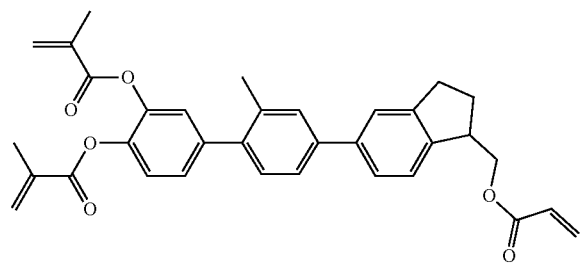
I-9-12
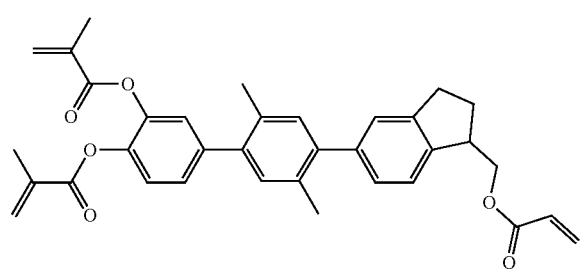
I-9-13
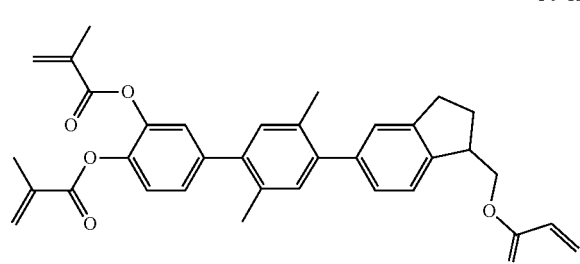
I-9-14
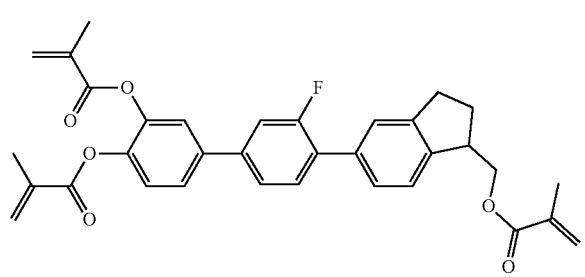
I-9-15
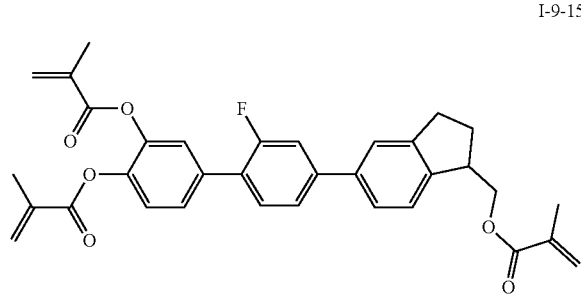
-continued
I-9-16
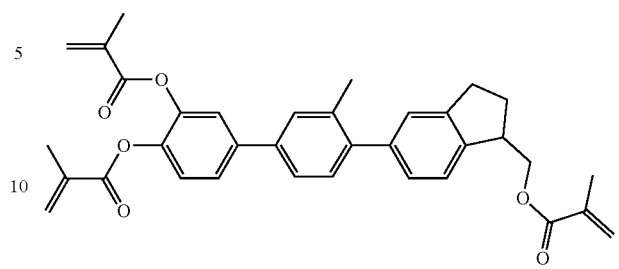
I-9-17
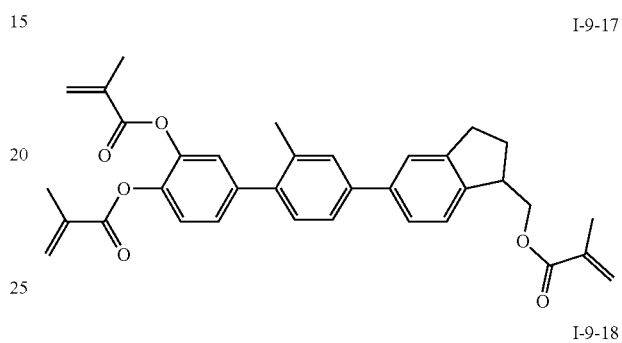
I-9-18
I-9-19
I-10-1
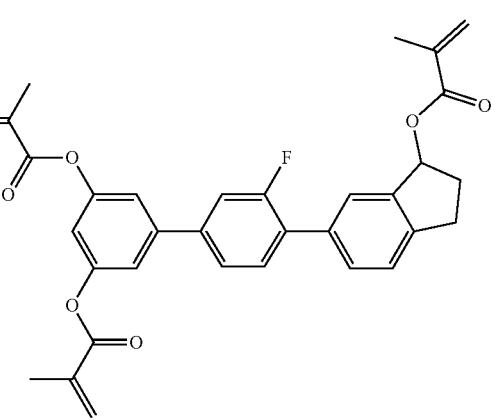

I-10-2
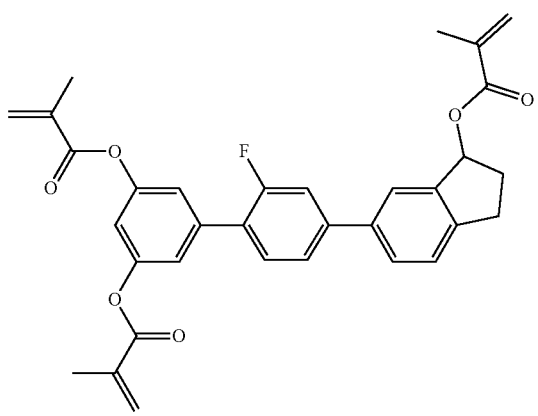
I-10-5
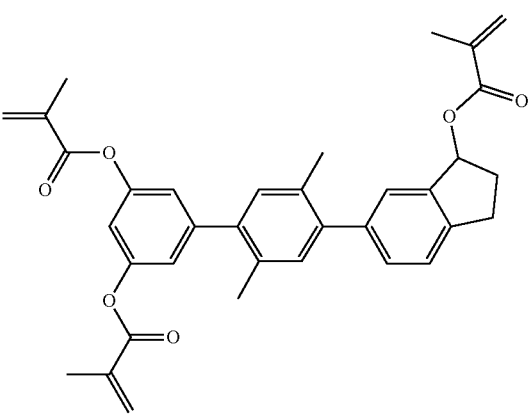
I-10-3
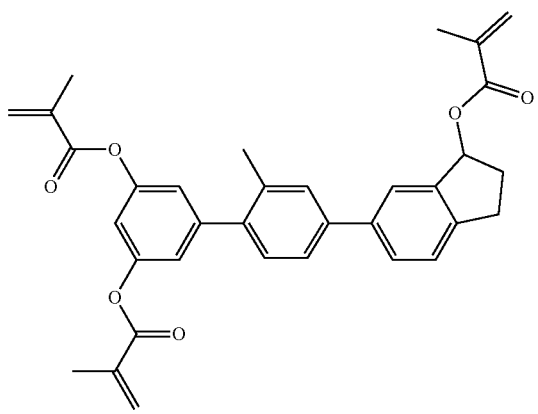
I-10-6
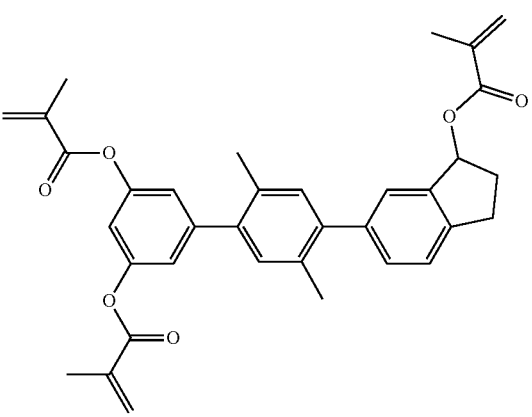
I-10-4
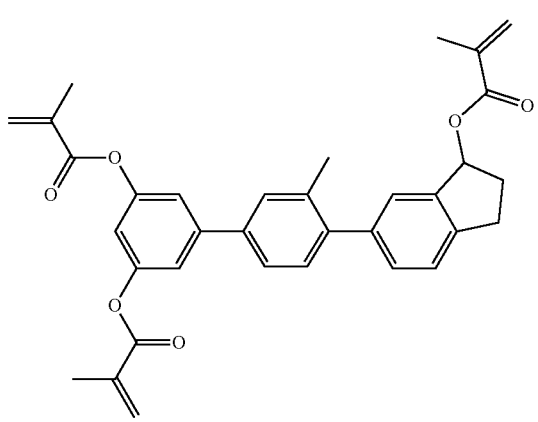
I-10-7
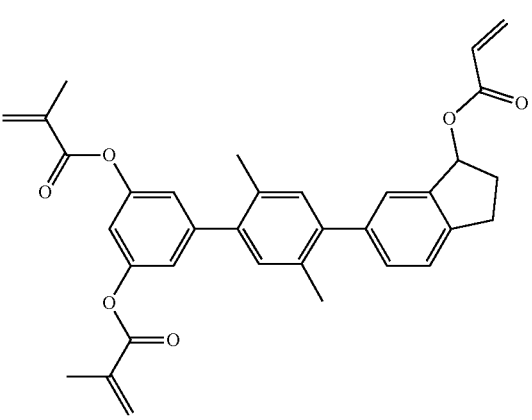

-continued
I-10-8
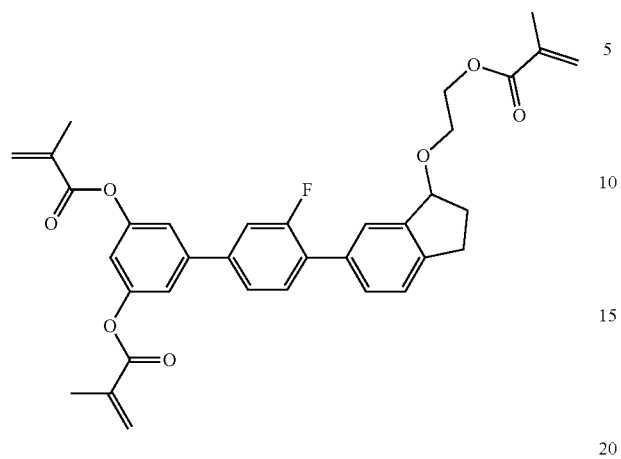
I-10-9
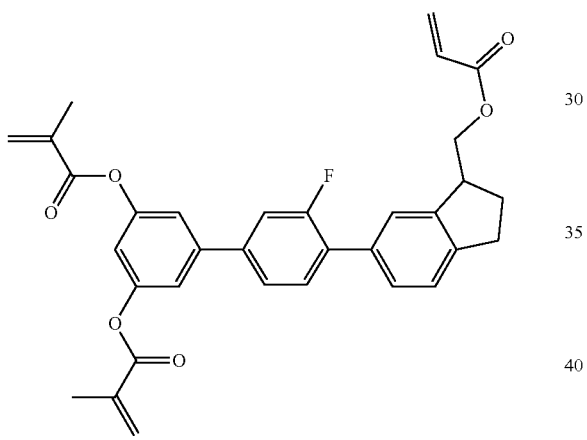
I-10-10
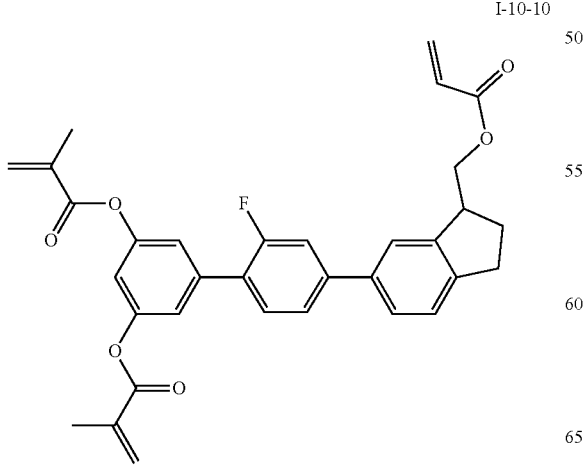
-continued
I-10-11
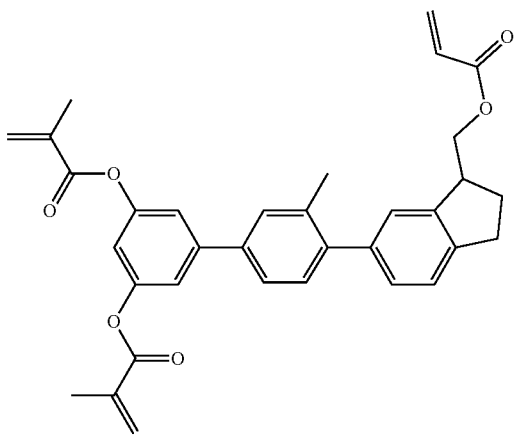
I-10-12
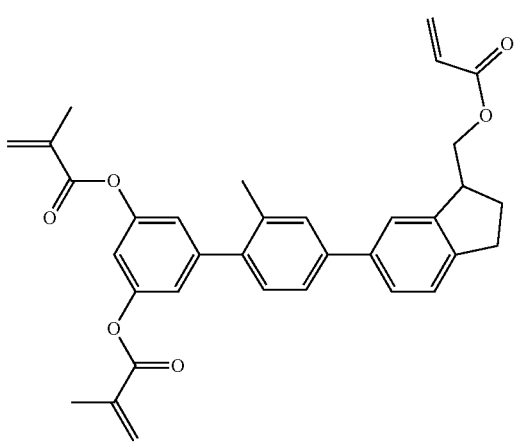
I-10-13
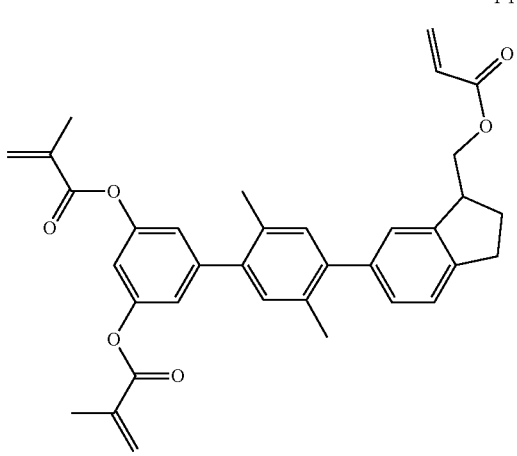

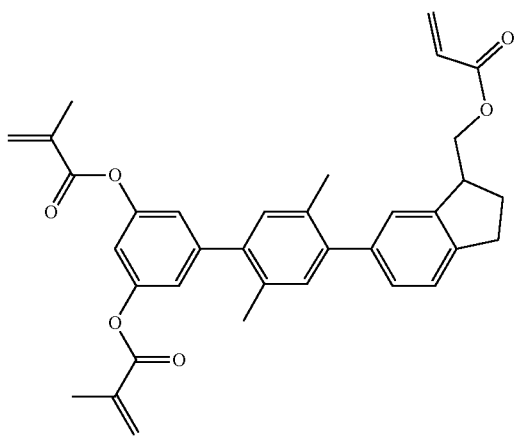
I-10-14
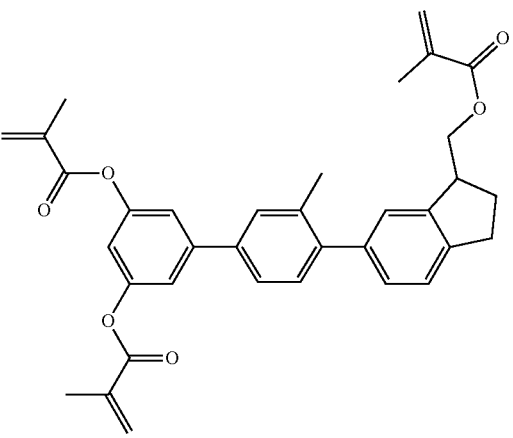
I-10-17
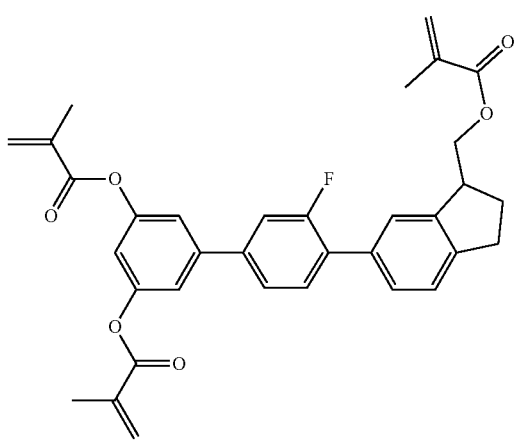
I-10-15
I-10-18
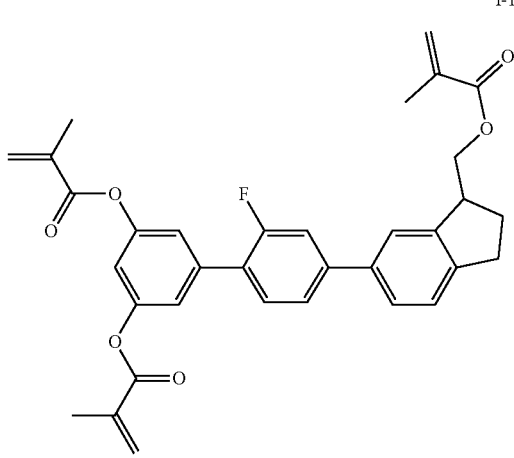
I-10-16
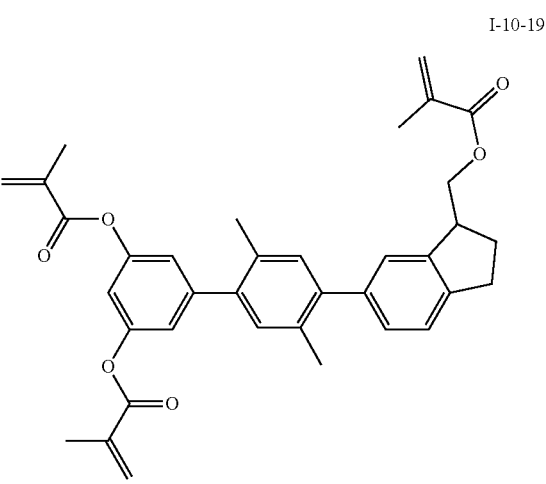
I-10-19

I-10-20
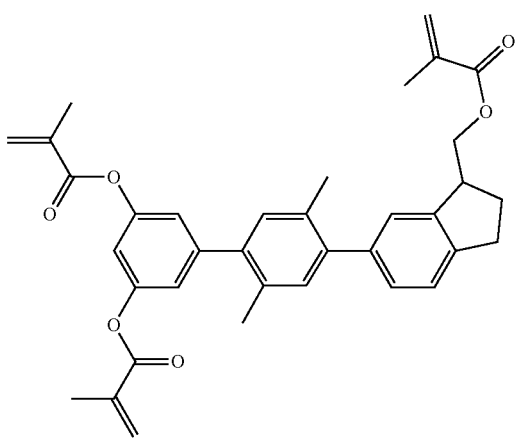
I-11-1
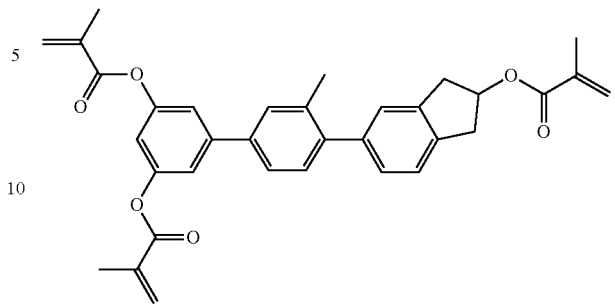
I-11-4
I-11-5
I-11-2
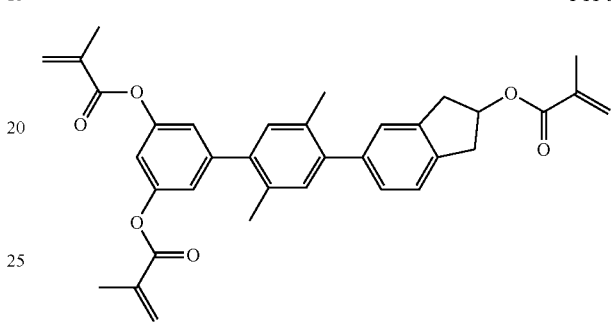
I-11-6
I-11-3
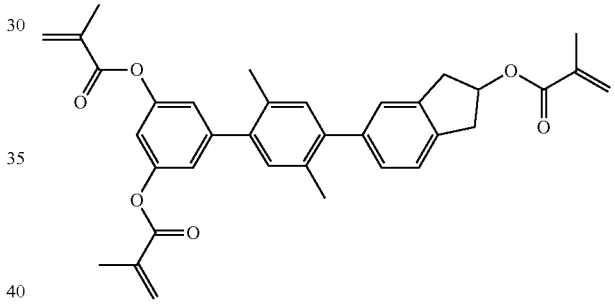
I-11-7
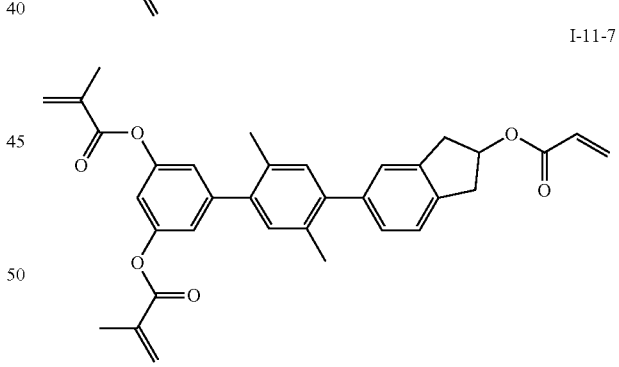
I-11-8
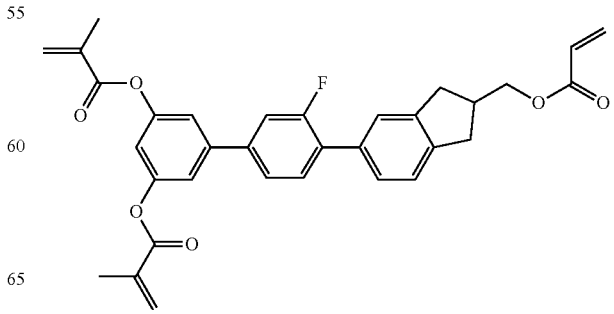

I-11-9
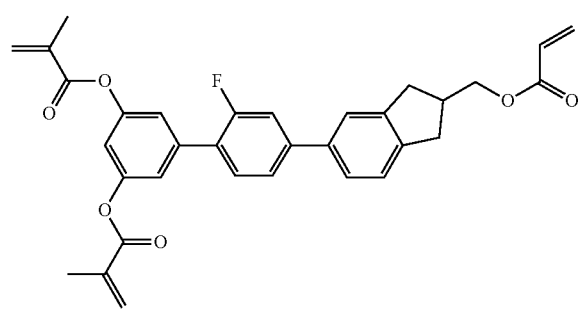
I-11-10
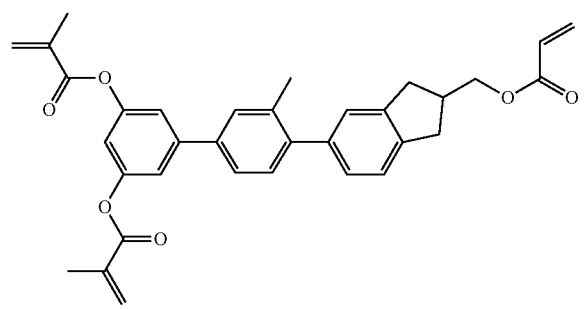
I-11-11
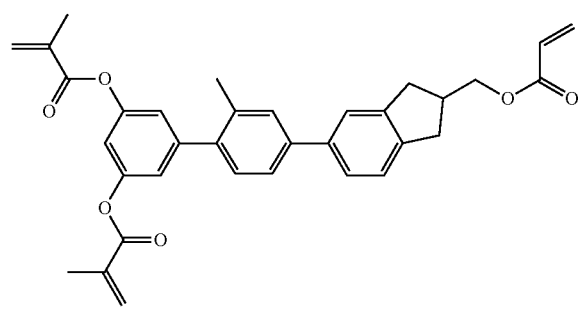
I-11-12
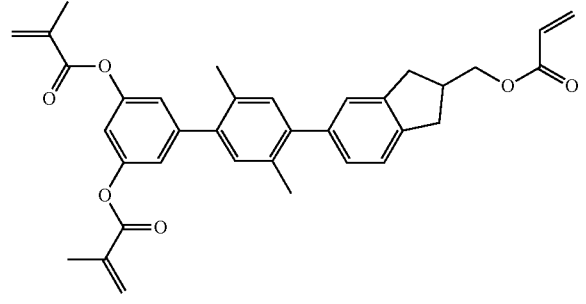
I-11-13
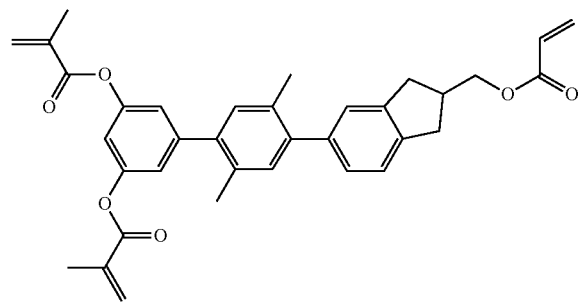
I-11-14
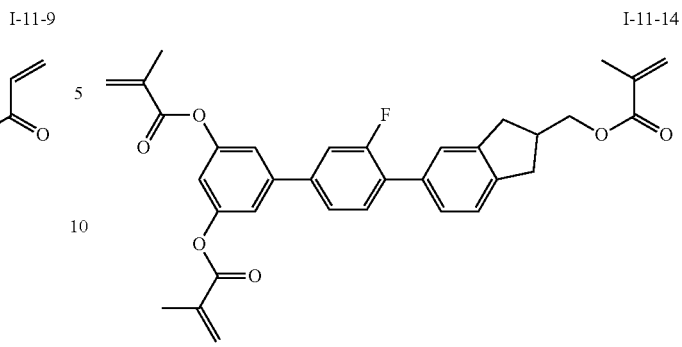
I-11-15
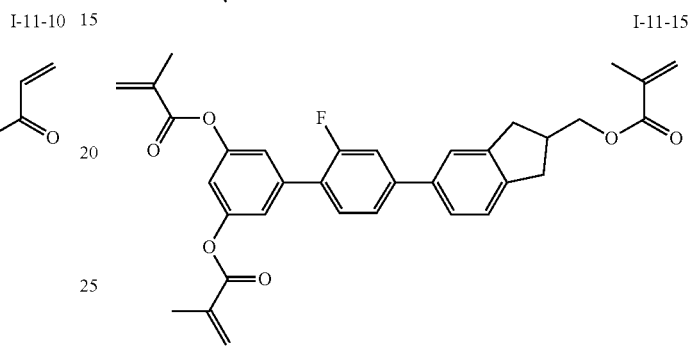
I-11-16
I-11-17
I-11-18

I-11-19
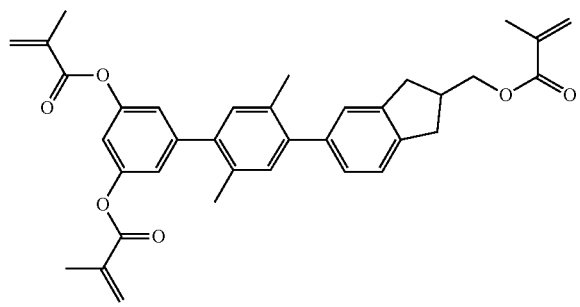
I-12-4
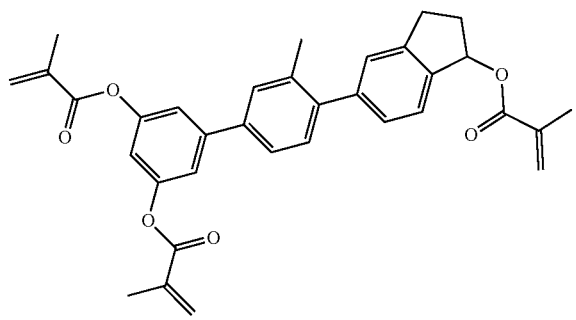
I-12-1
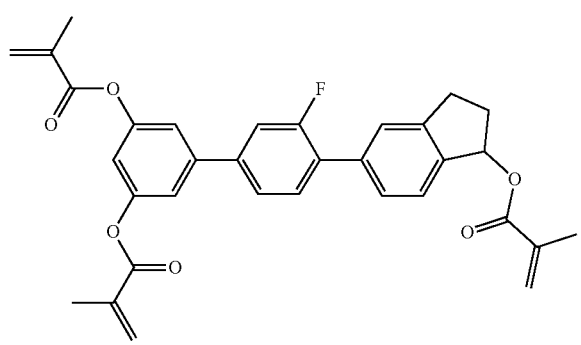
I-12-5
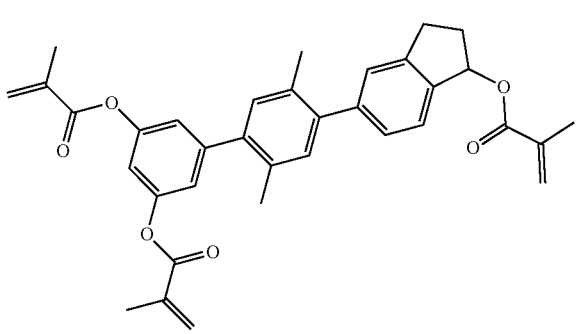
I-12-2
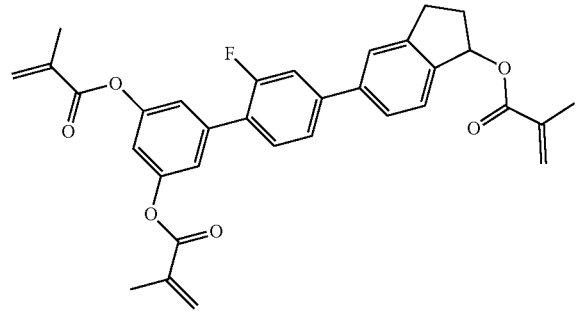
I-12-6
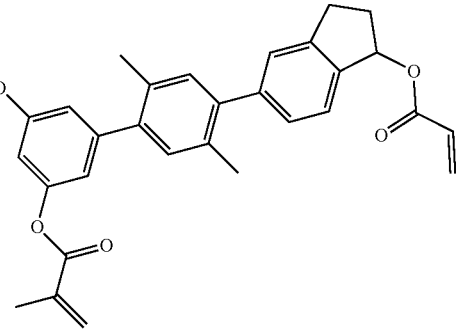
I-12-3
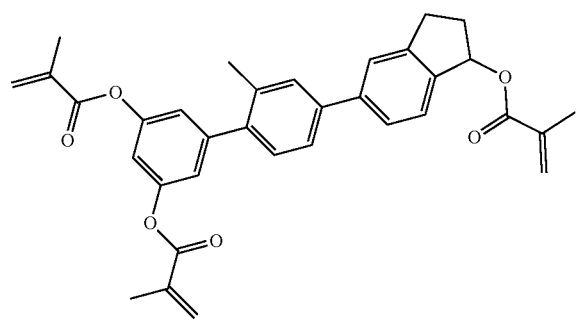
I-12-7

I-12-8
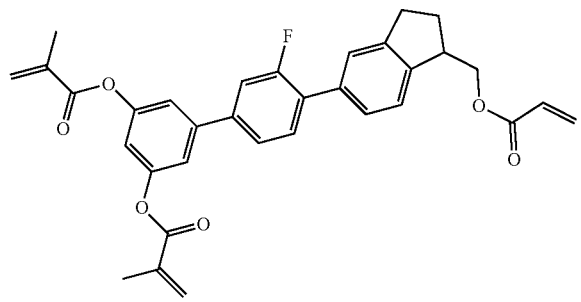
I-12-9
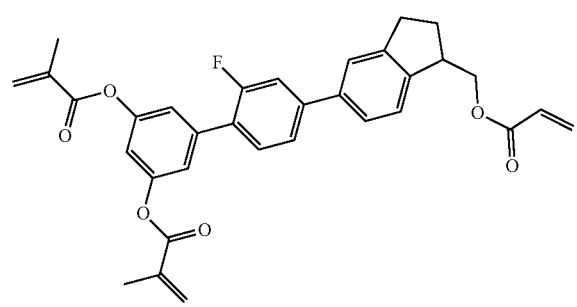
I-12-10
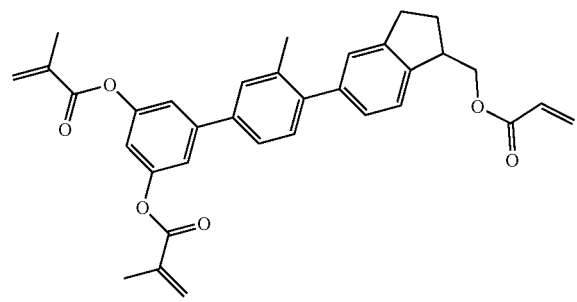
I-12-11
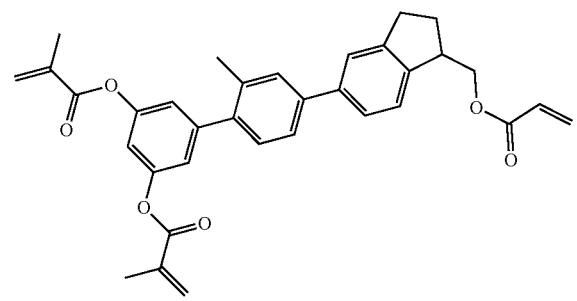
I-12-12
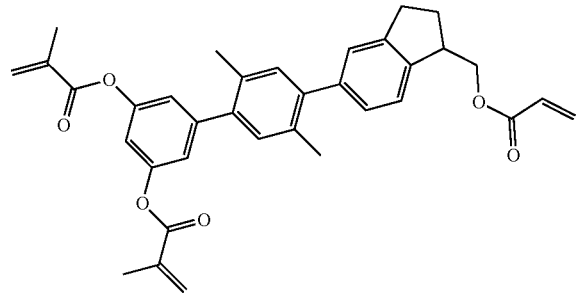
I-12-13
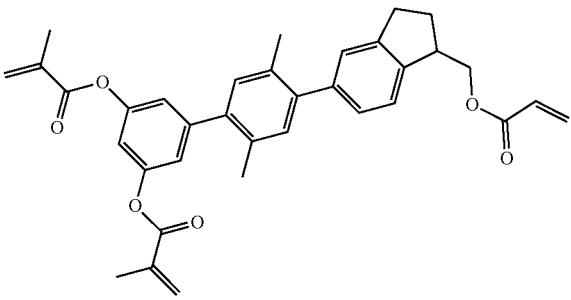
I-12-14
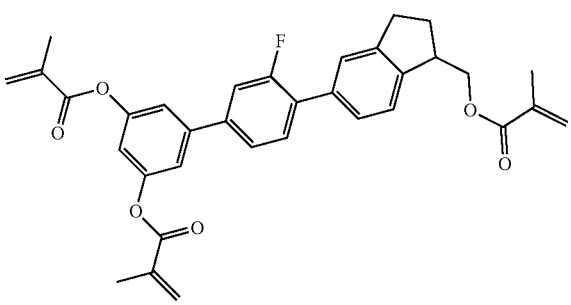
I-12-15
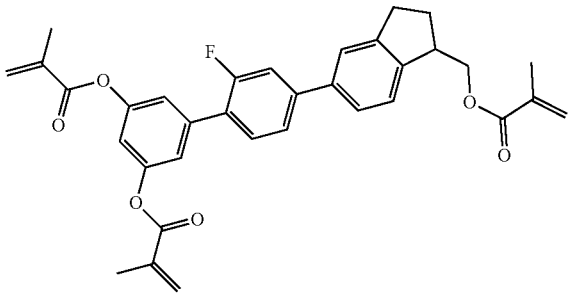
I-12-16
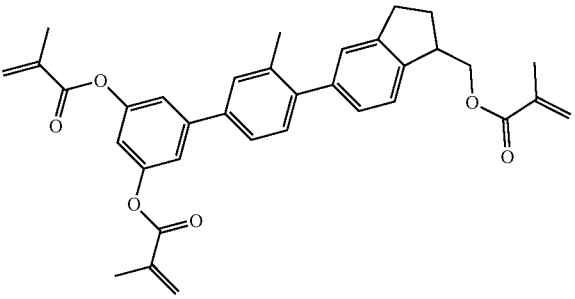
I-12-17
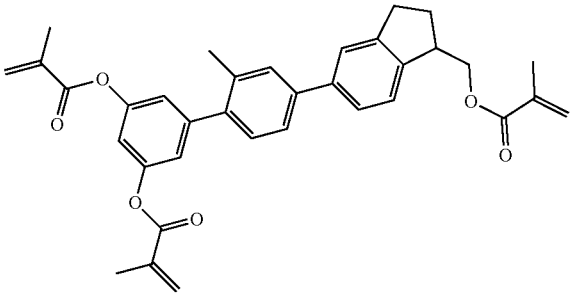

I-12-18
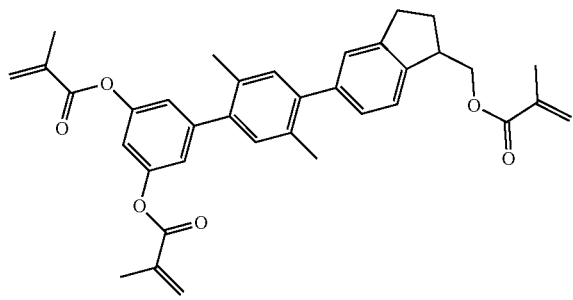
I-12-19
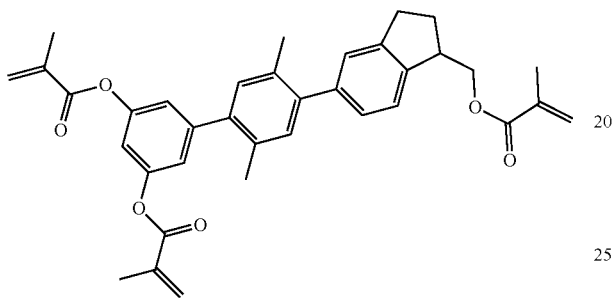
I-13-1
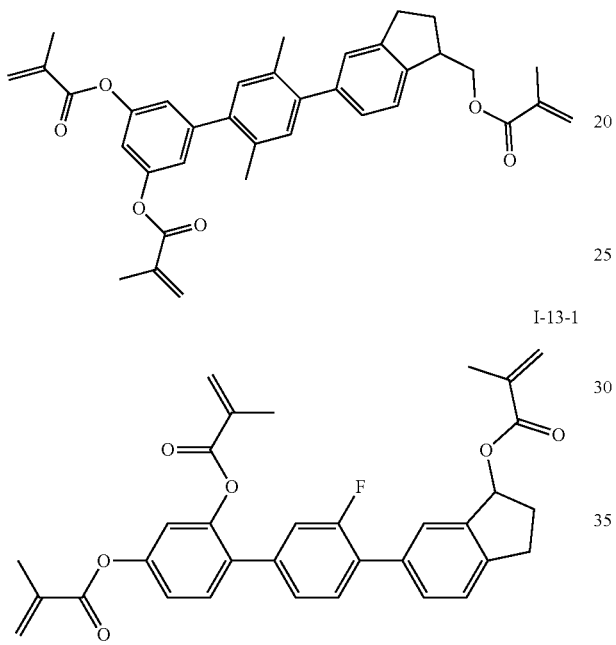
I-13-2
I-13-3
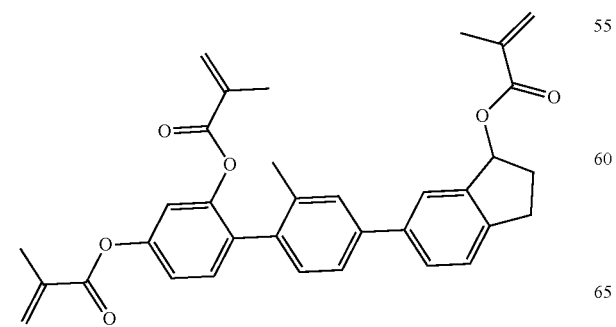
I-13-4
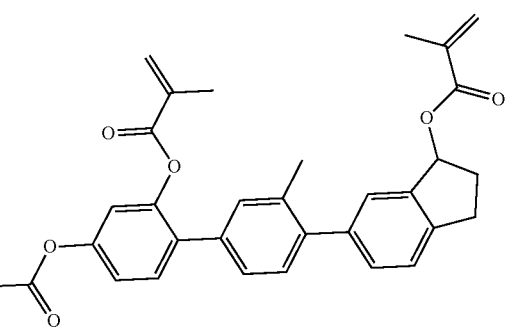
I-13-5
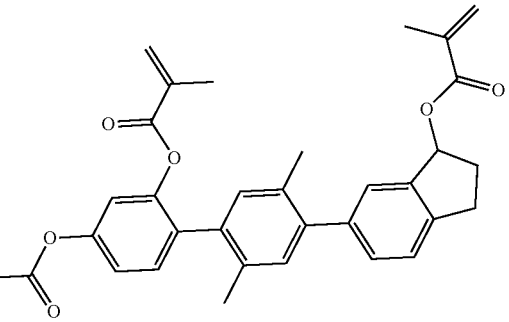
I-13-6
I-13-7
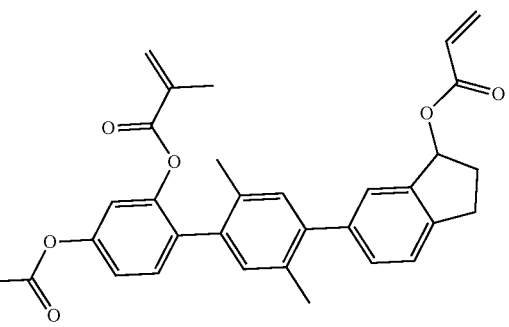

I-13-8
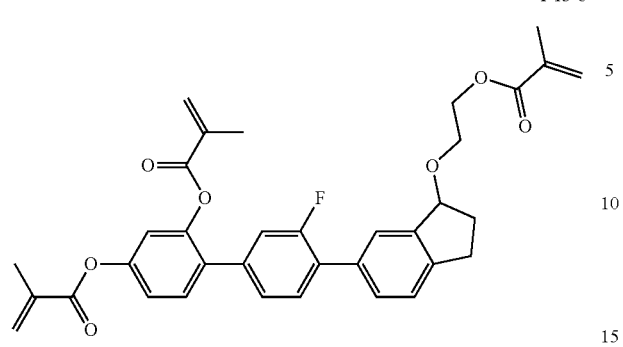
I-13-12
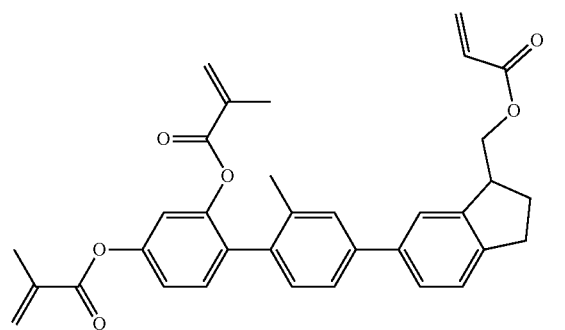
I-13-9
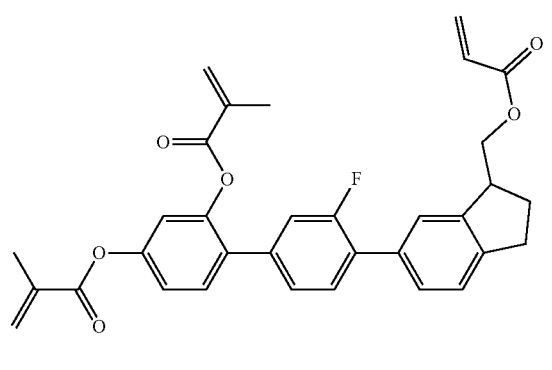
I-13-13
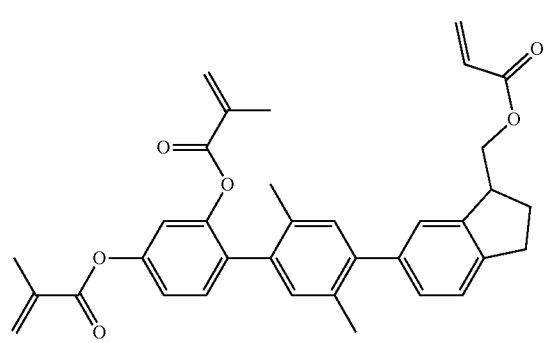
I-13-10
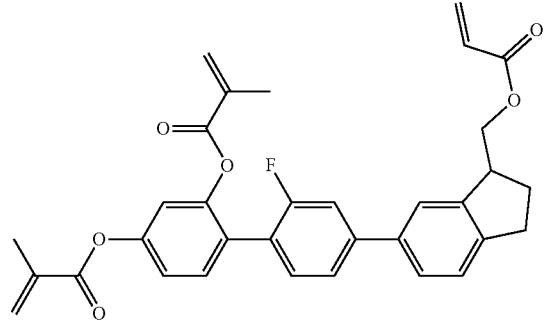
I-13-14
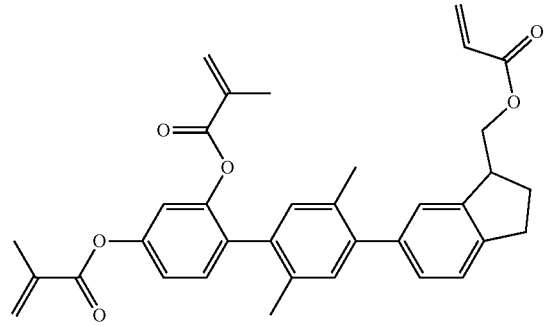
I-13-11
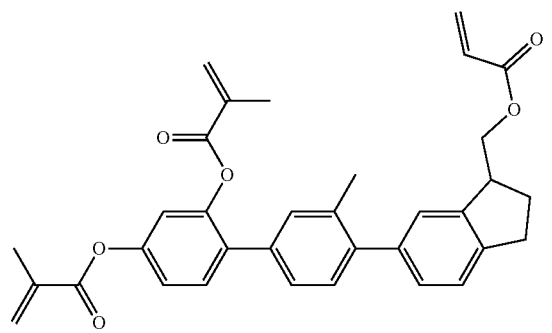
I-13-15
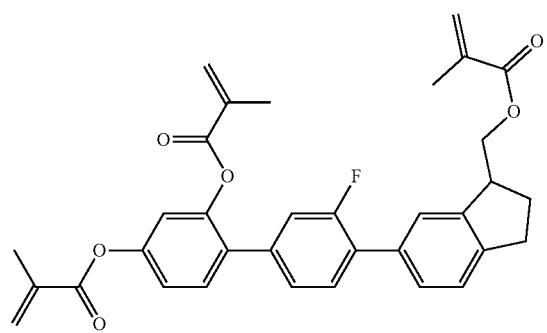

I-13-16
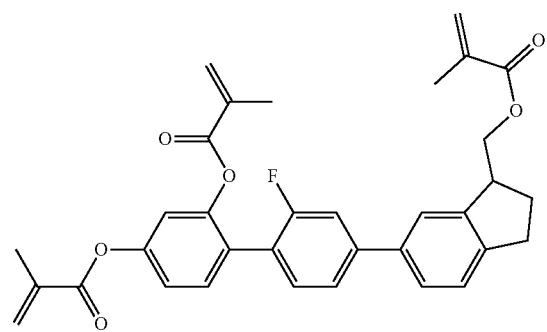
I-13-20
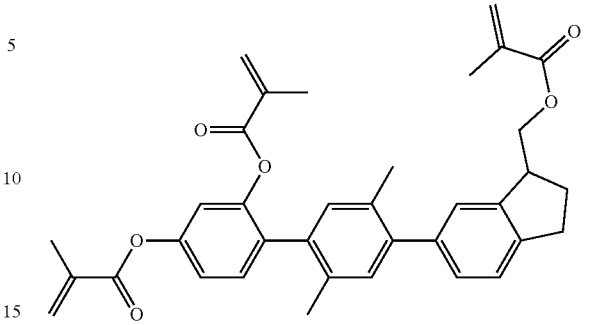
I-13-17
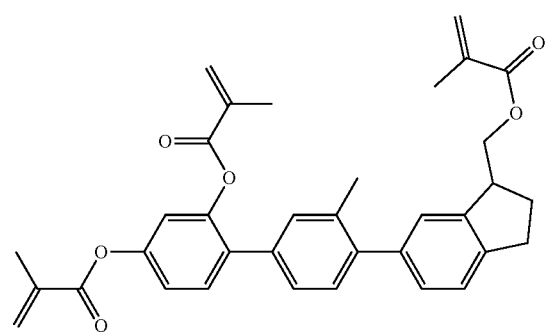
I-14-1
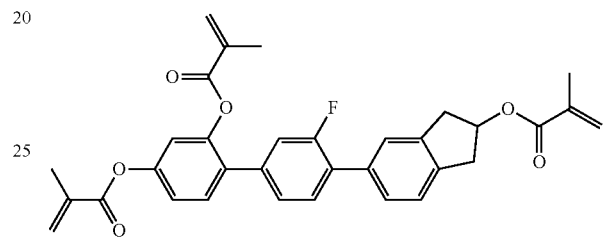
I-13-18
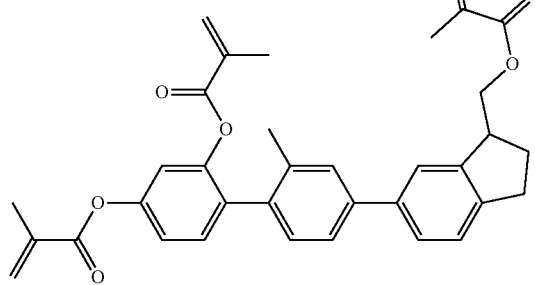
I-14-2
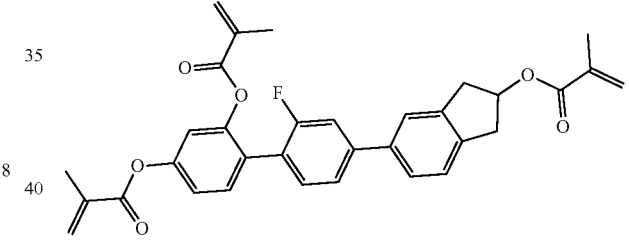
I-13-19
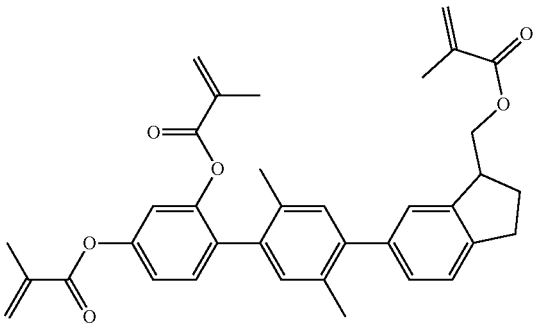
I-14-3
I-14-4
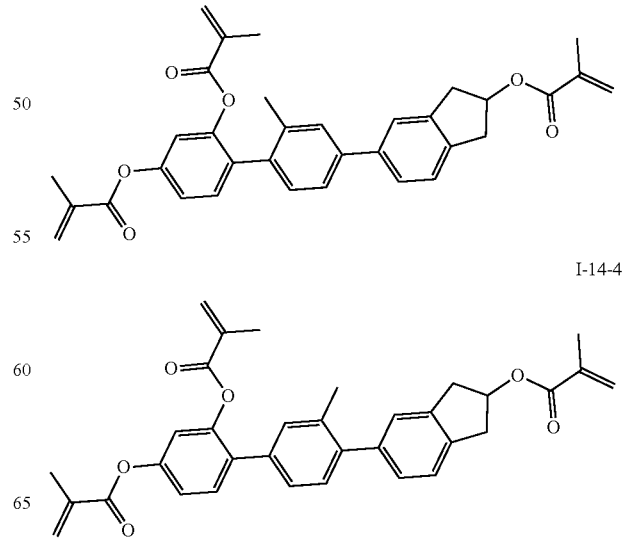

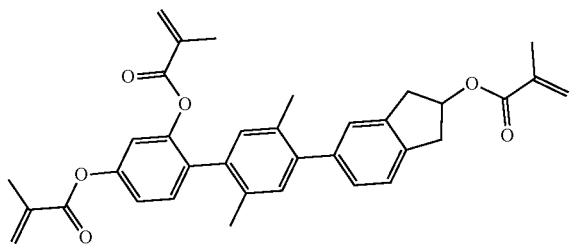
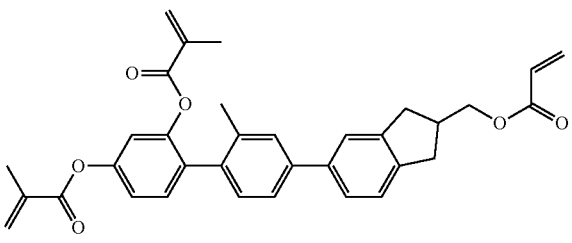
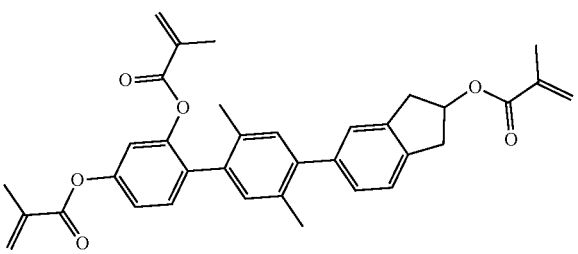

I-14-17
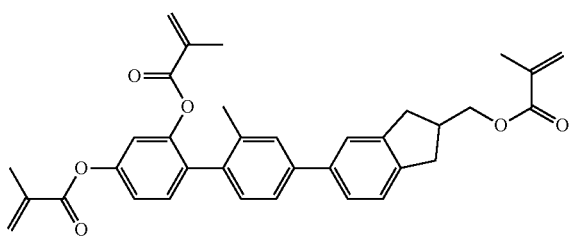
I-14-18
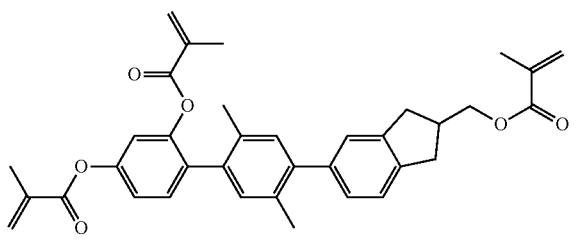
I-14-19
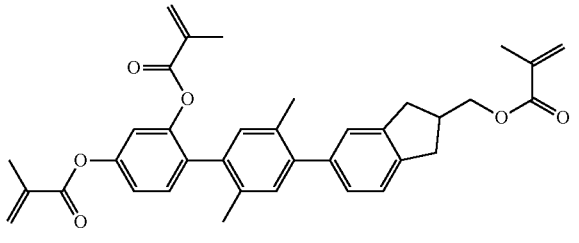
I-15-1
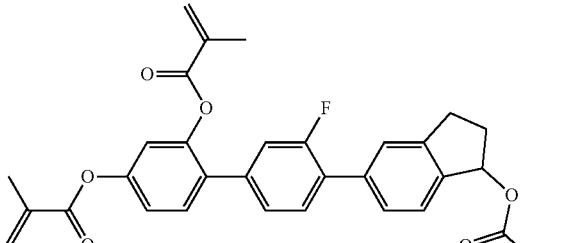
I-15-2
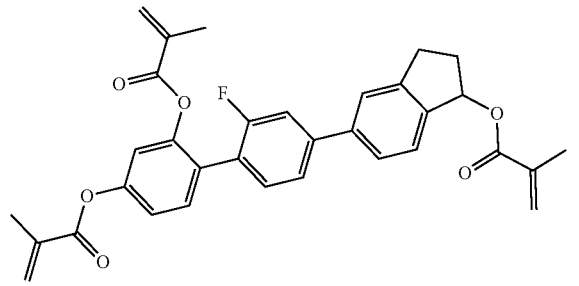
I-15-3
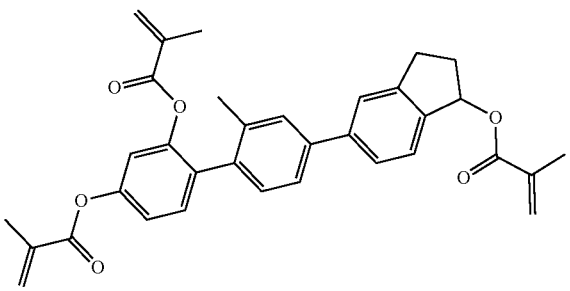
I-15-4
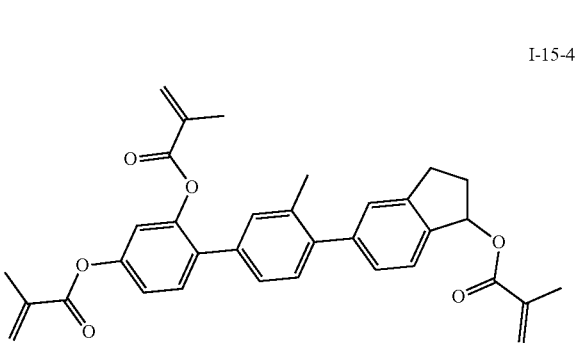
I-15-5
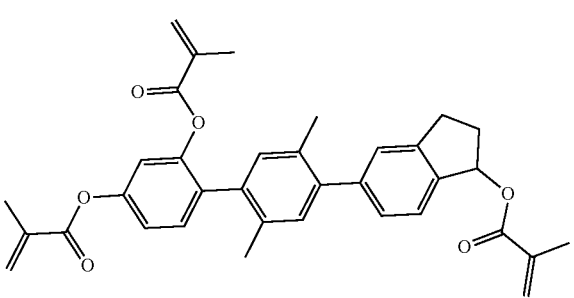
I-15-6
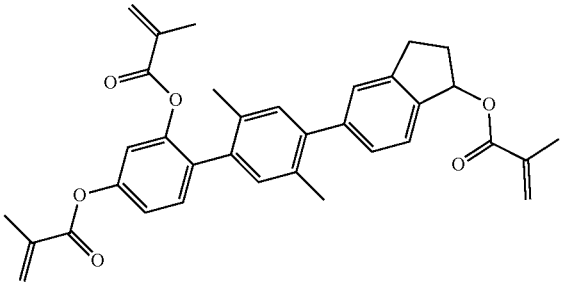
I-15-7
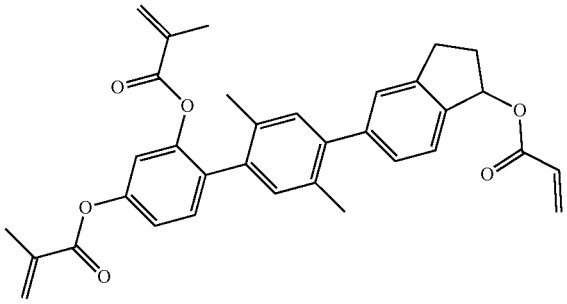

I-15-8
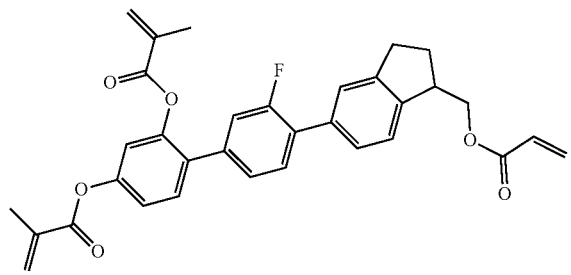
I-15-9
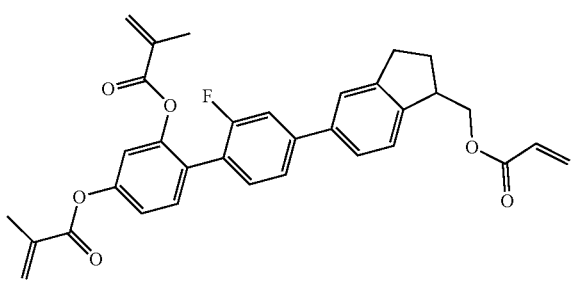
I-15-10
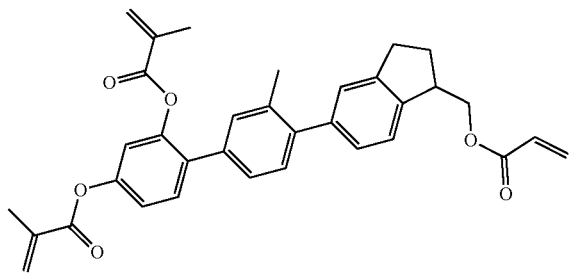
I-15-11
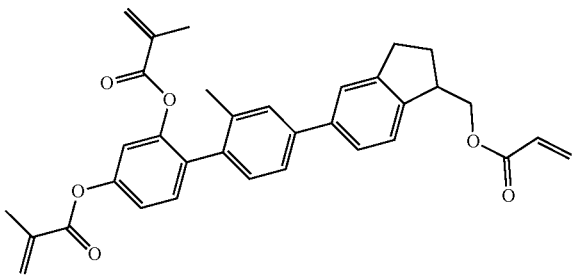
I-15-12
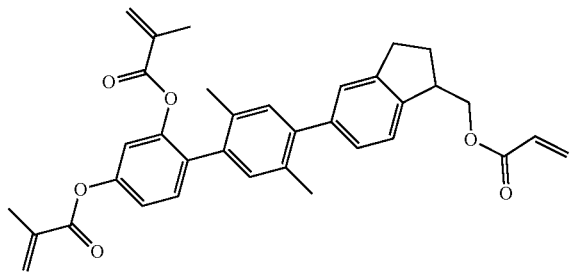
I-15-13
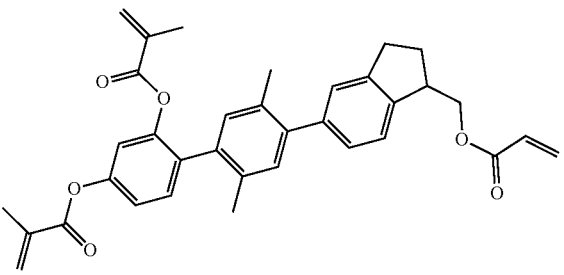
I-15-14
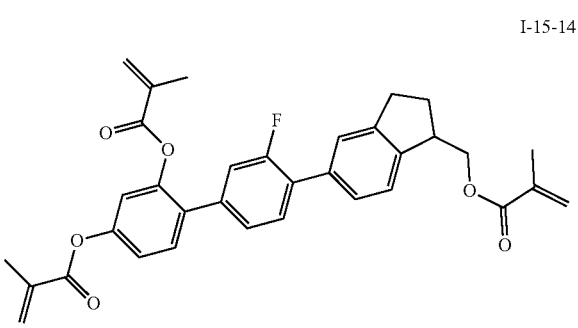
I-15-15
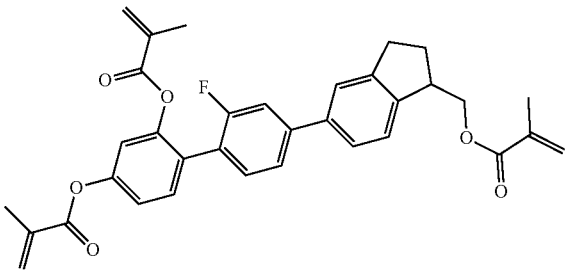
I-15-16
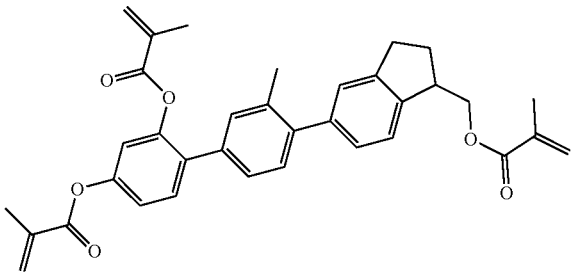
I-15-17
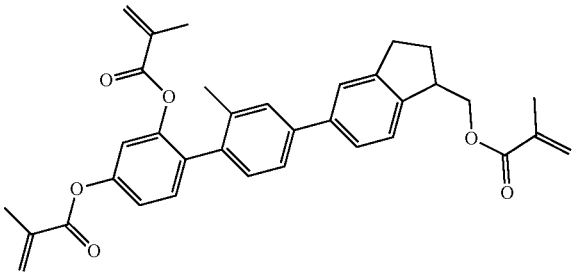

I-15-18
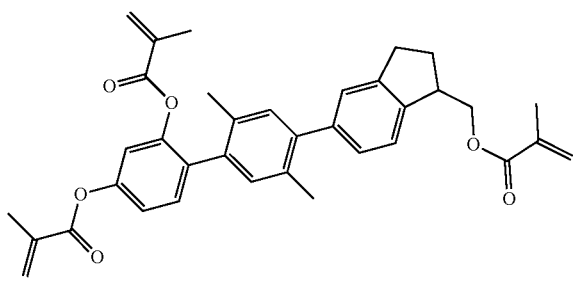
I-15-19
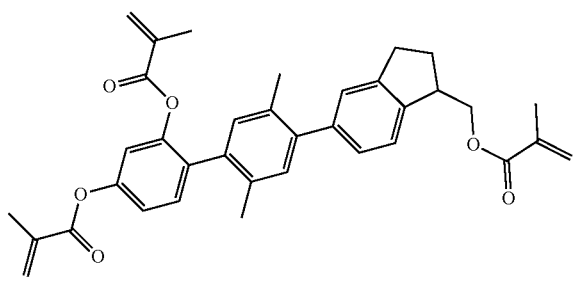
I-16-1
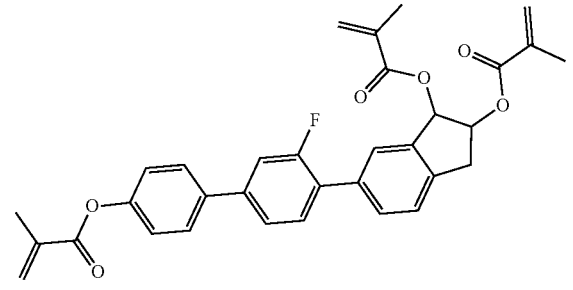
I-16-2
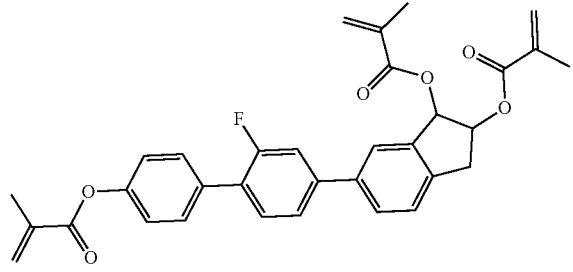
I-16-3
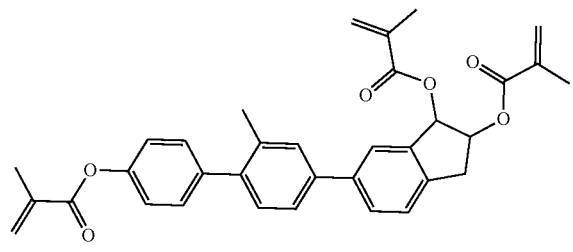
I-16-4
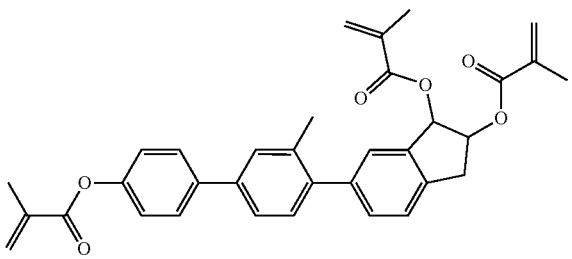
I-16-5
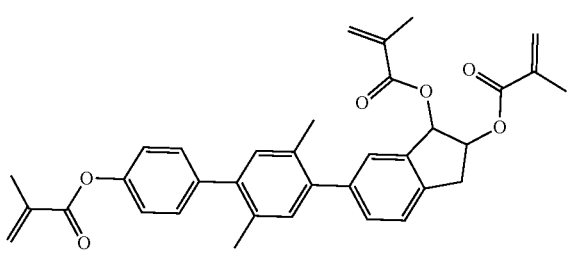
I-16-6
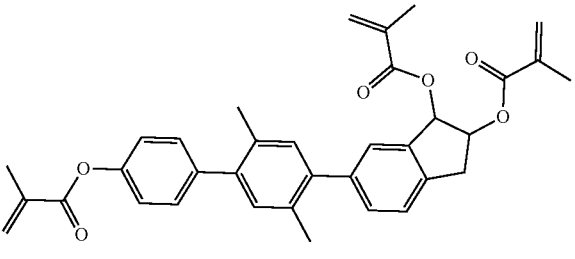
I-17-1
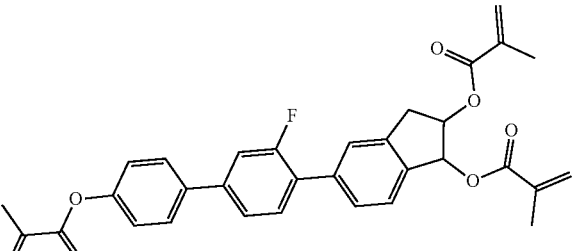
I-17-2
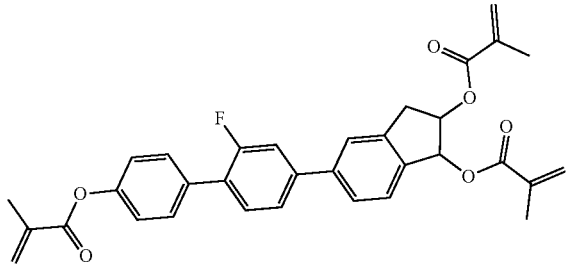

-continued
I-17-3
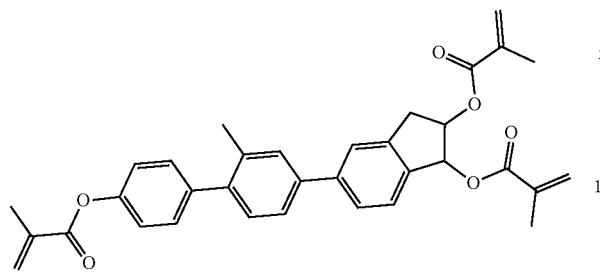
I-17-4
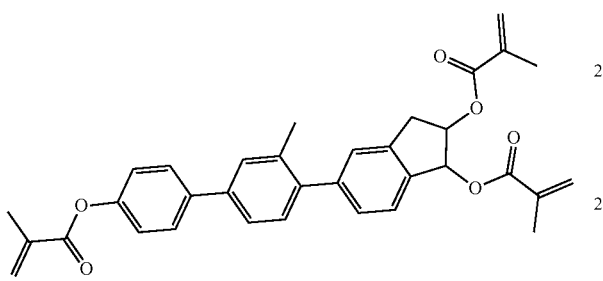
I-17-5
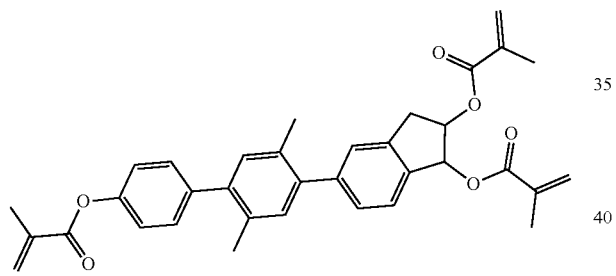
I-17-6
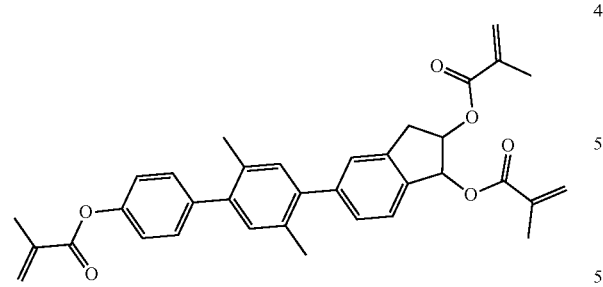
I-18-1
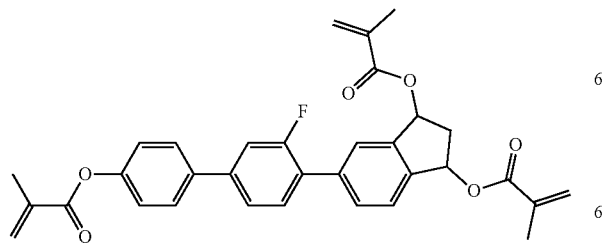
-continued
I-18-2
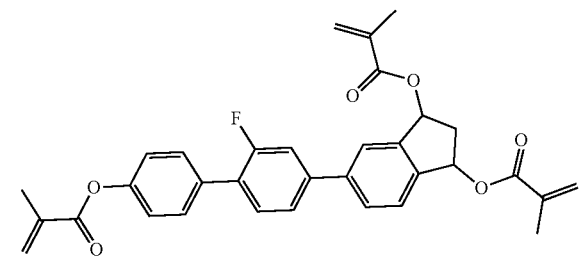
I-18-3
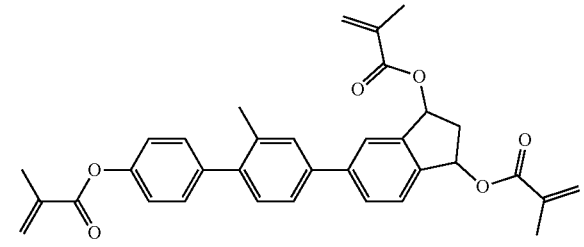
I-18-4
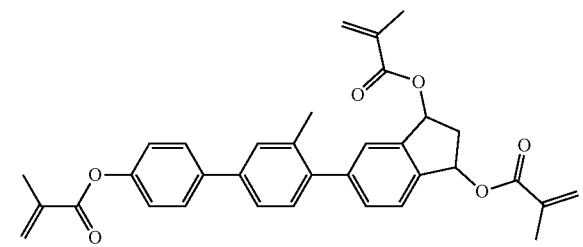
I-18-5
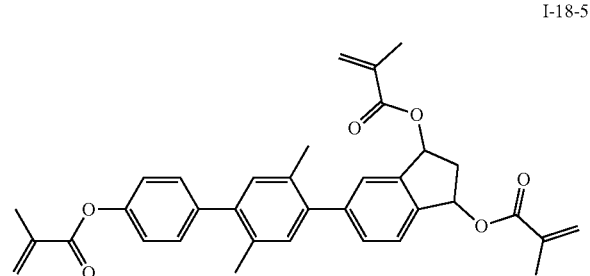
I-18-6
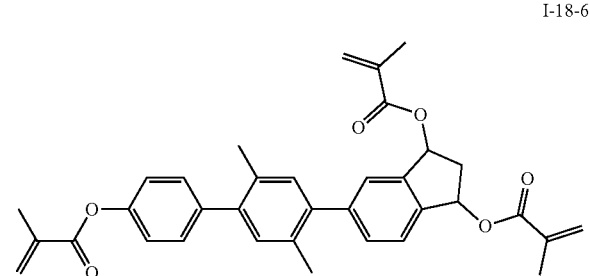
I-19-1
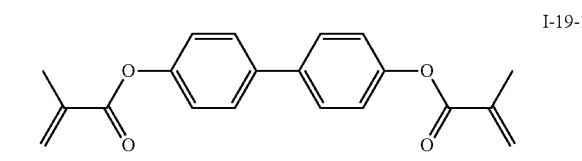

I-19-2
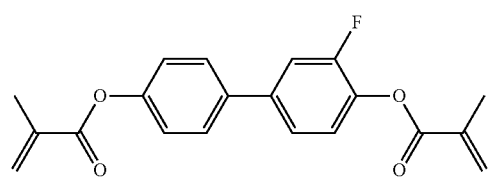
I-19-3
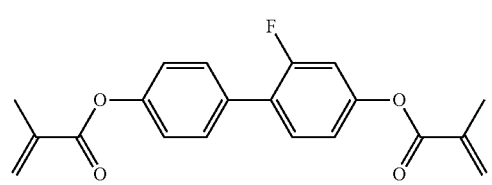
I-19-4
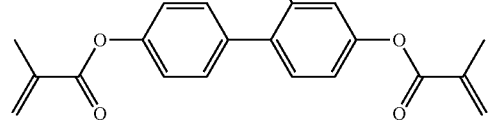
I-19-5
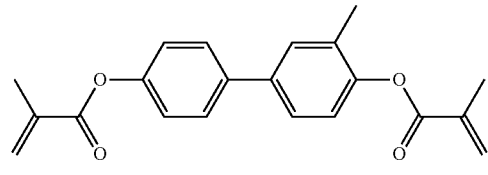
I-19-6
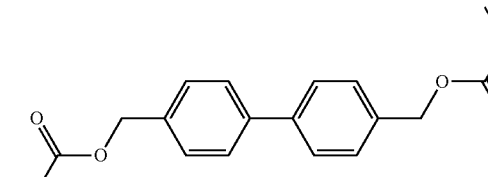
I-19-7
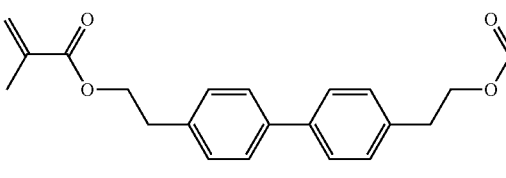
I-19-8
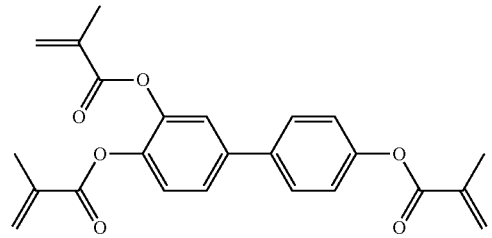
I-19-9
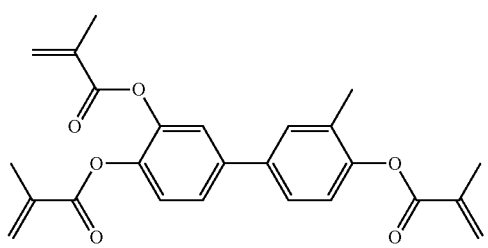
I-19-10
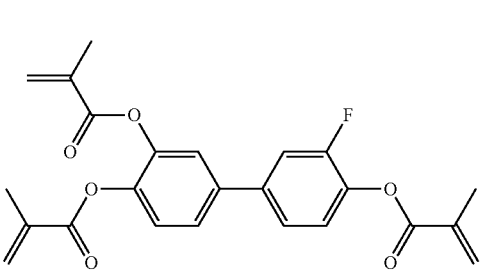
I-19-11
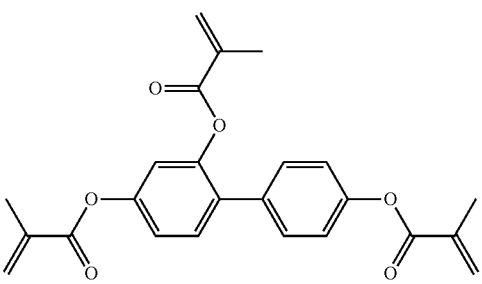
I-19-12
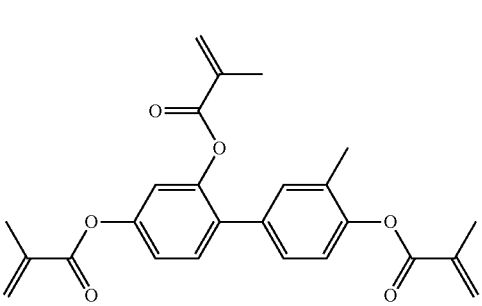
I-19-13
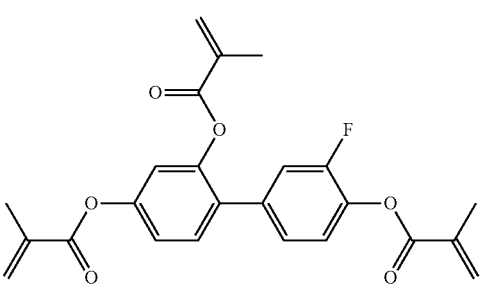

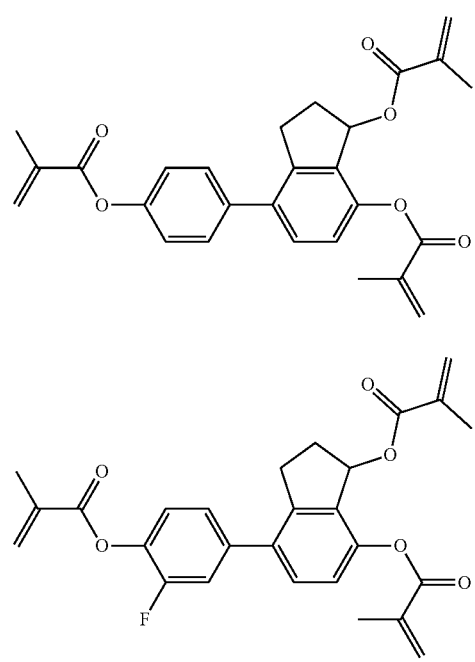
I-19-14
I-19-15
I-19-16
I-19-17
I-20-1
I-20-2
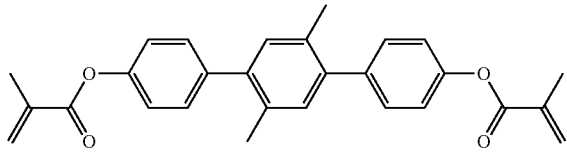
I-20-3
I-20-4
I-20-5
I-20-7
I-20-8
I-20-9
I-20-10
I-20-11

I-20-12
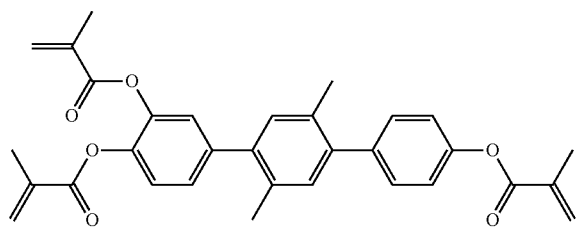
I-20-13
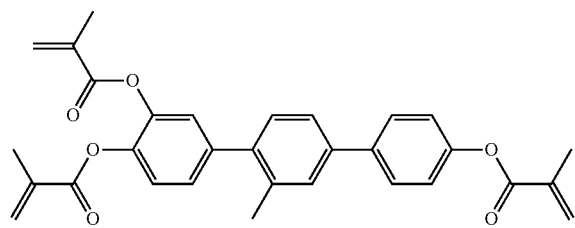
I-20-14
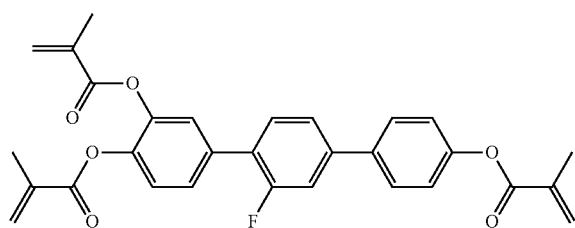
I-20-15
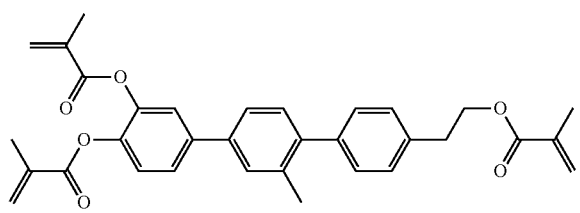
I-20-16
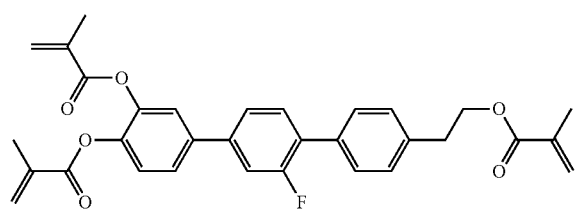
I-20-17
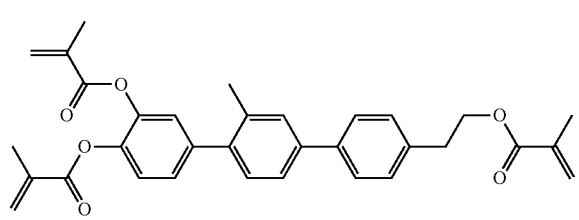
I-20-18
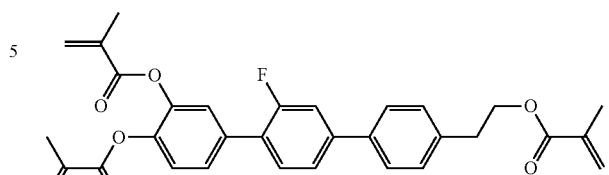
I-20-19
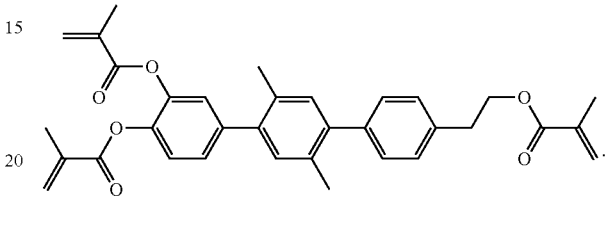
II-1-1
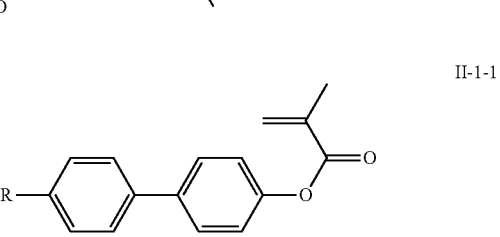
II-1-2
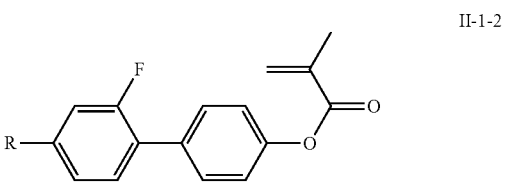
II-1-3
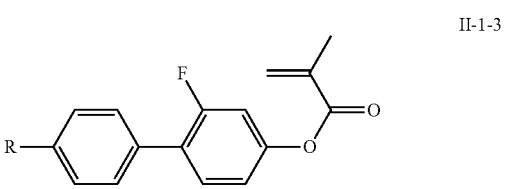
II-1-4
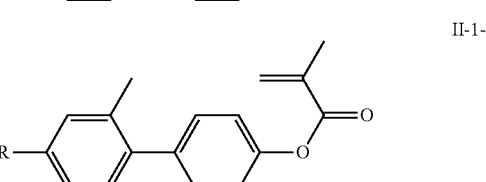
II-1-5
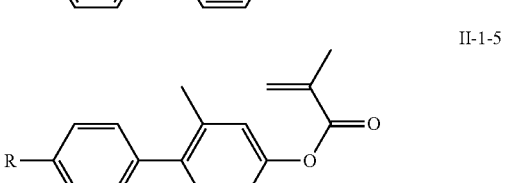
II-1-6
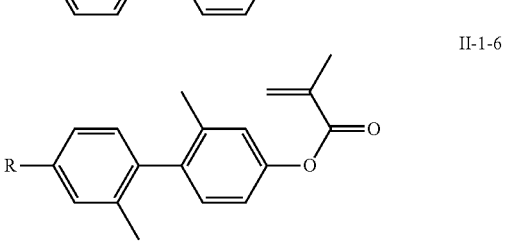

-continued
II-1-7
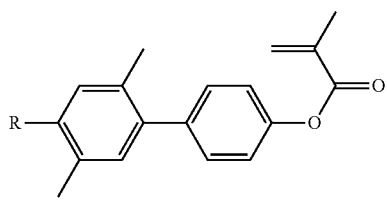
II-2-1
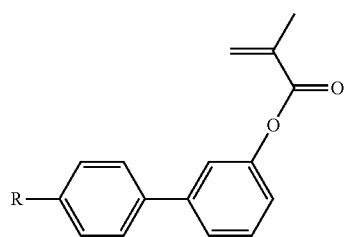
II-2-2
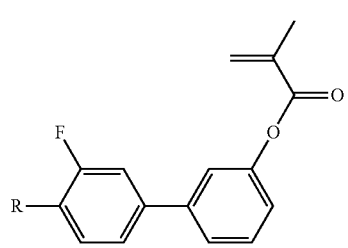
II-2-3
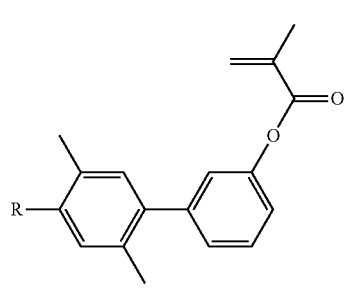
II-2-4
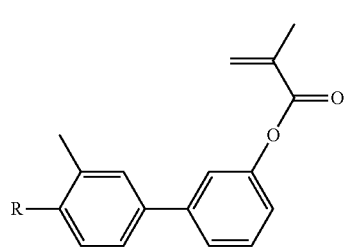
II-3-1
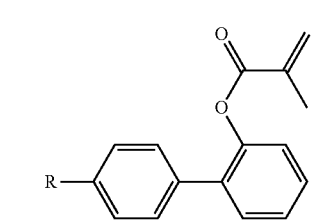
II-3-2
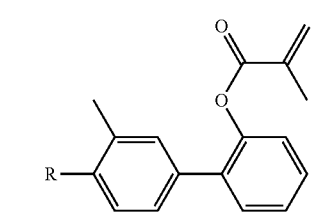
II-3-3
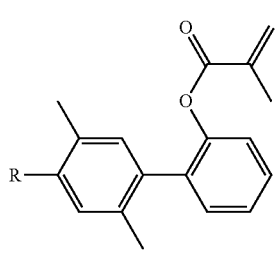
II-3-4
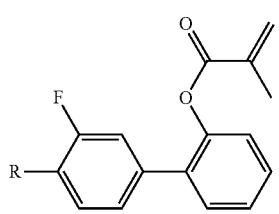
II-4-1
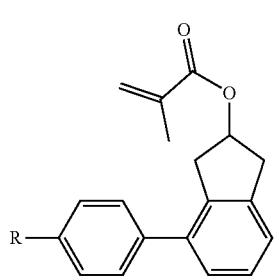
II-4-2
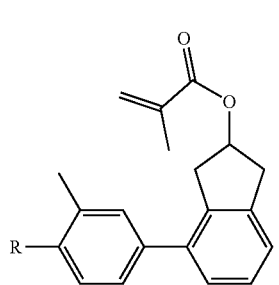
II-4-3
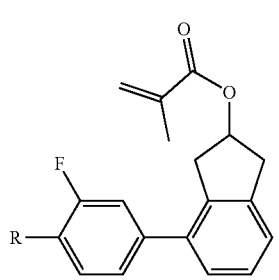
II-4-4
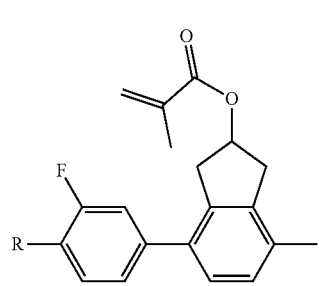

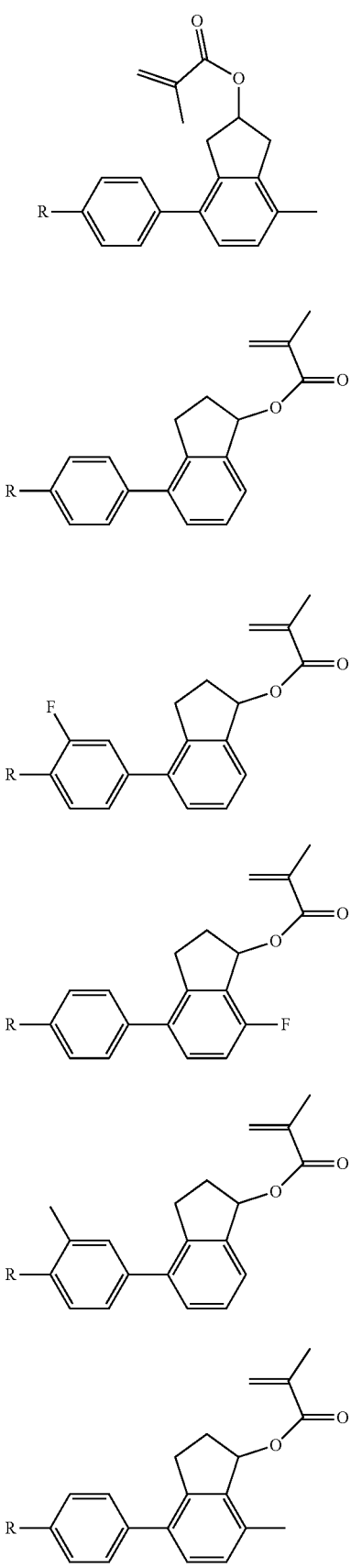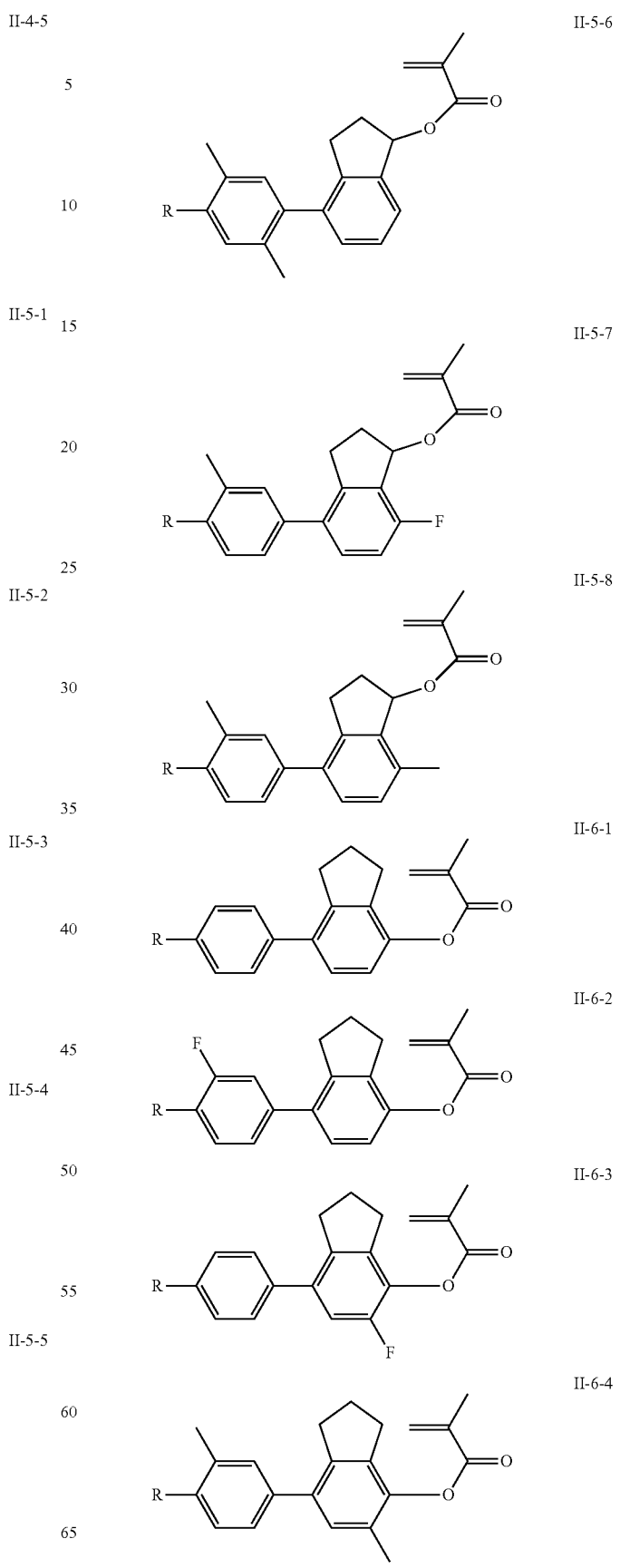

II-6-5
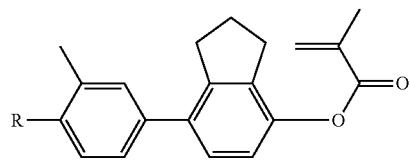
II-6-6
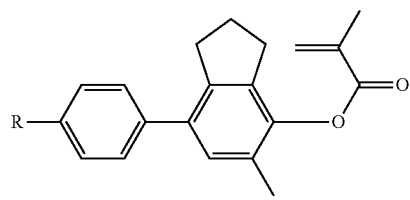
II-6-7
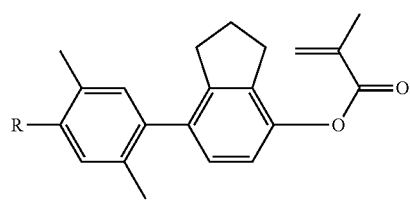
II-6-8
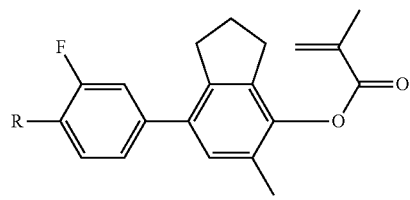
II-7-1
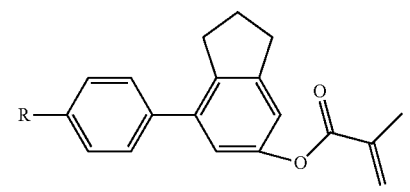
II-7-2
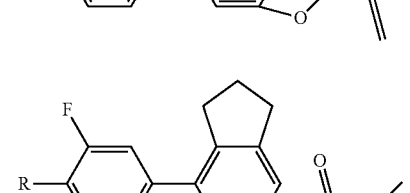
II-7-3
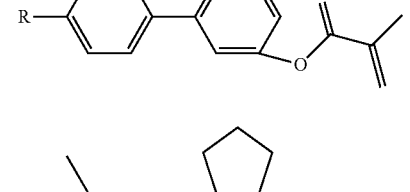
II-7-4
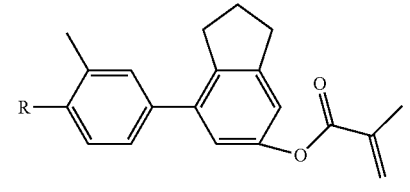
II-7-5
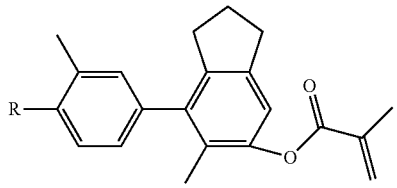
II-7-6
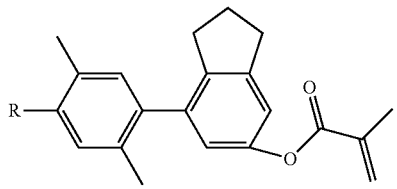
II-8-1
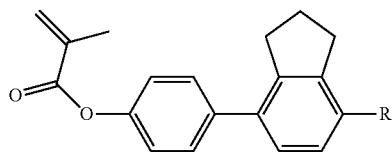
II-8-2
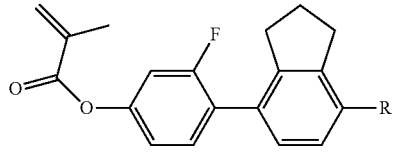
II-8-3
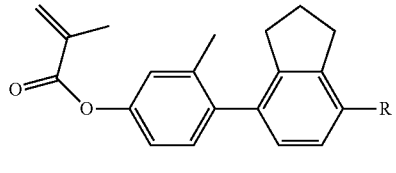
II-8-4
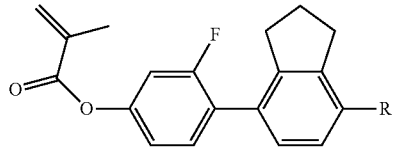
II-8-5
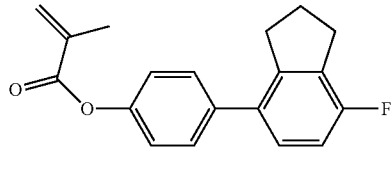
II-9-1
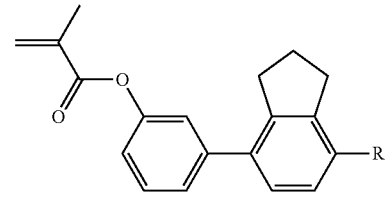

II-9-2
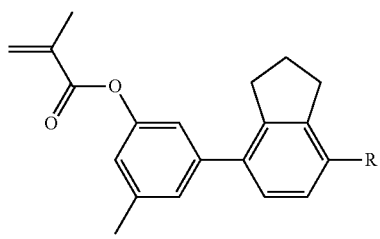
II-9-3
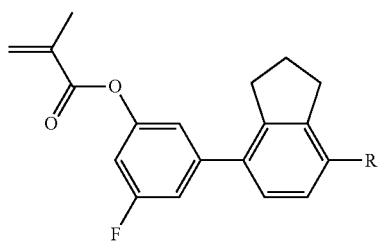
II-9-4
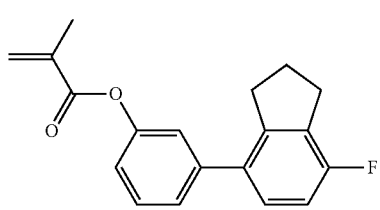
II-10-1
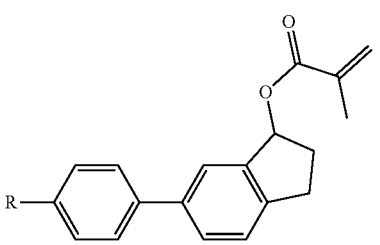
II-10-2
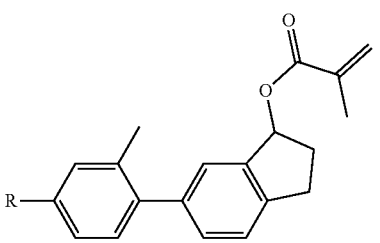
II-10-3
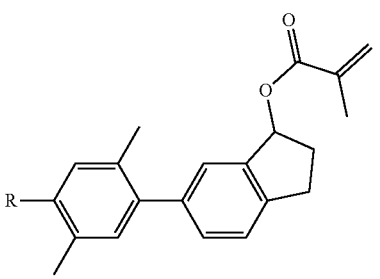
II-10-4
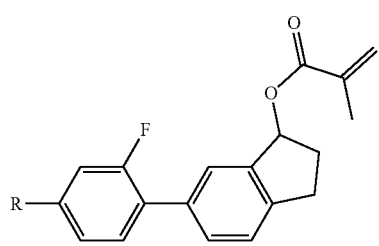
II-10-5
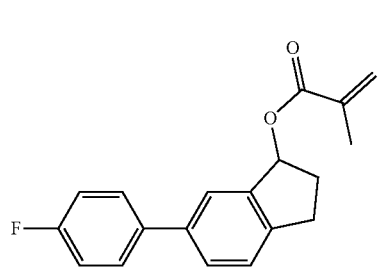
II-11-1
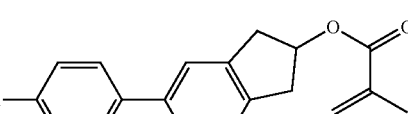
II-11-2
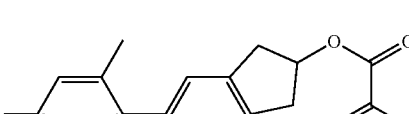
II-11-3
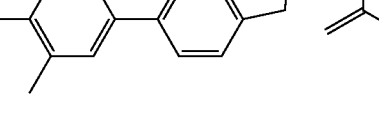
II-11-4
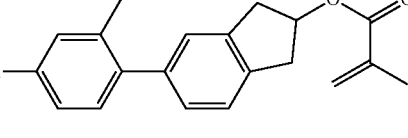
II-11-5
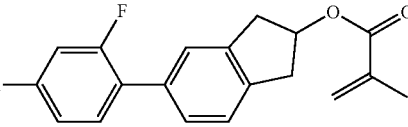
II-11-6
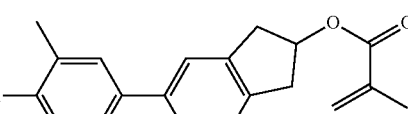
II-11-7
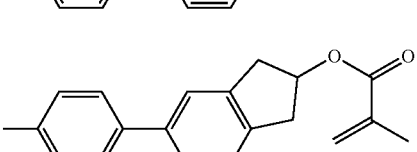

-continued
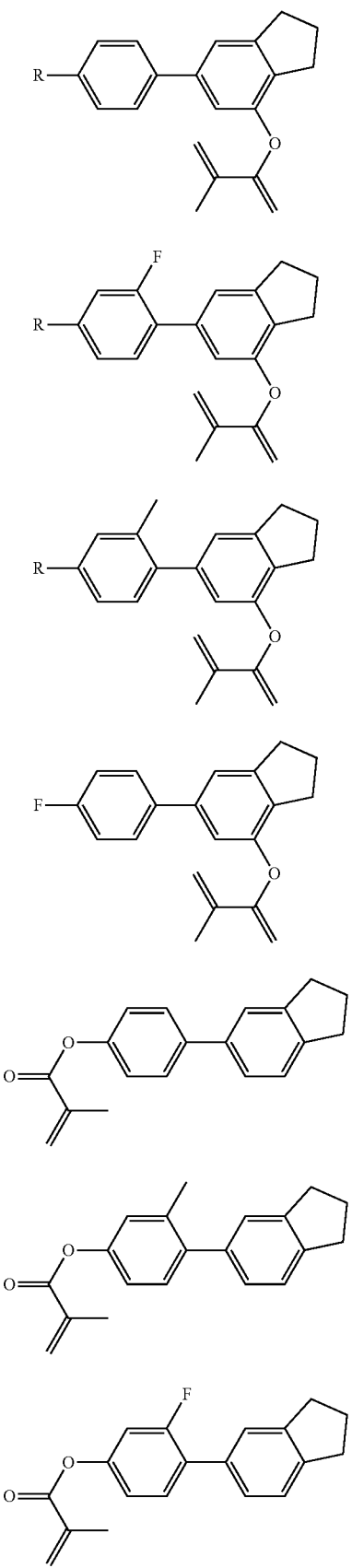
II-12-1
II-12-2
II-12-3
II-12-4
II-13-1
II-13-2
II-13-3
-continued
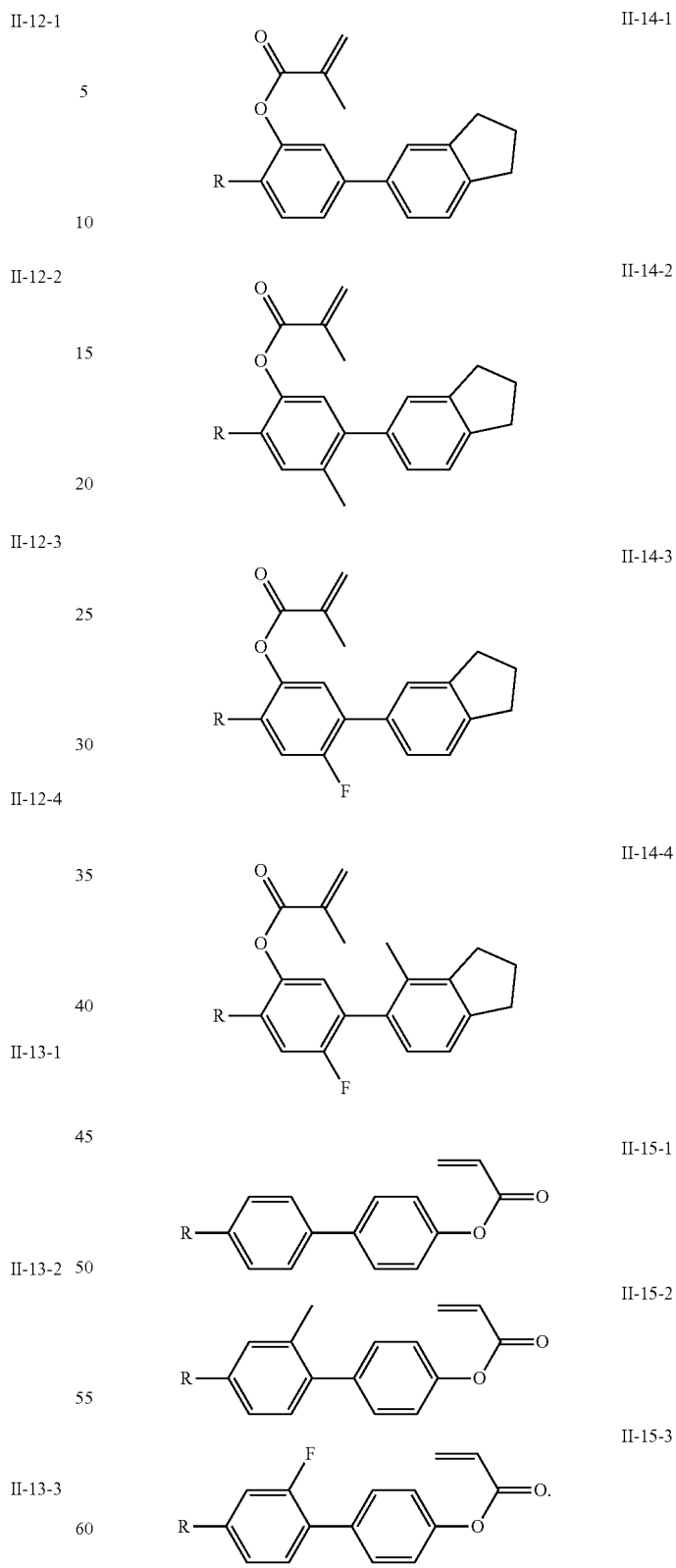
II-14-1
II-14-2
II-14-3
II-14-4
II-15-1
II-15-2
II-15-3
The compound represented by formula IV is preferably from compounds represented by formulas IV-1 to IV-15; and the compound represented by formula V is preferably from compounds represented by formulas V-1 to V-12:

-continued
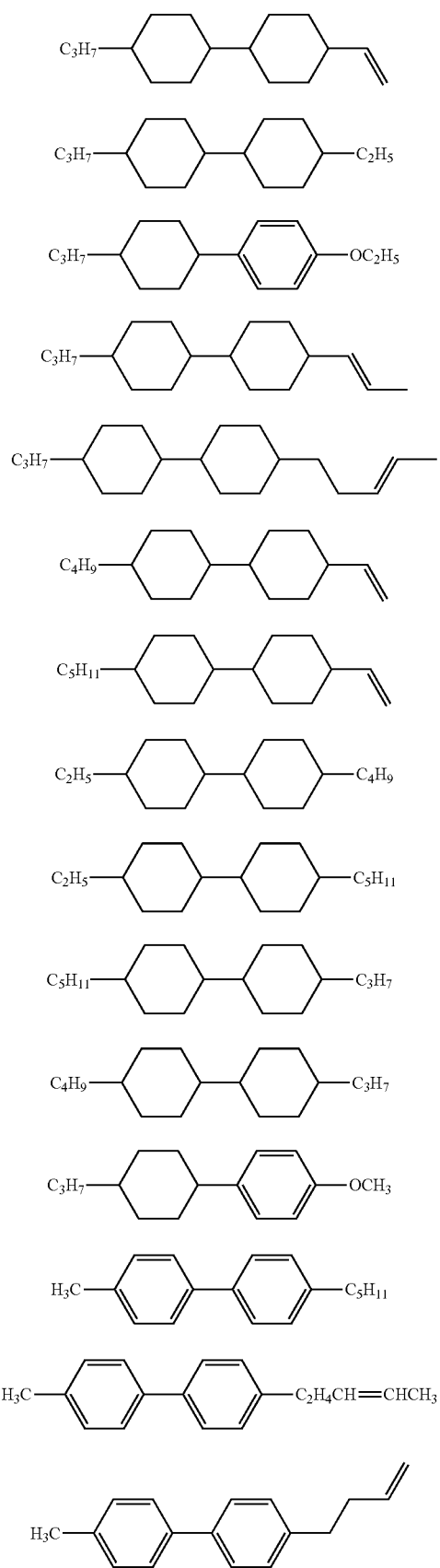
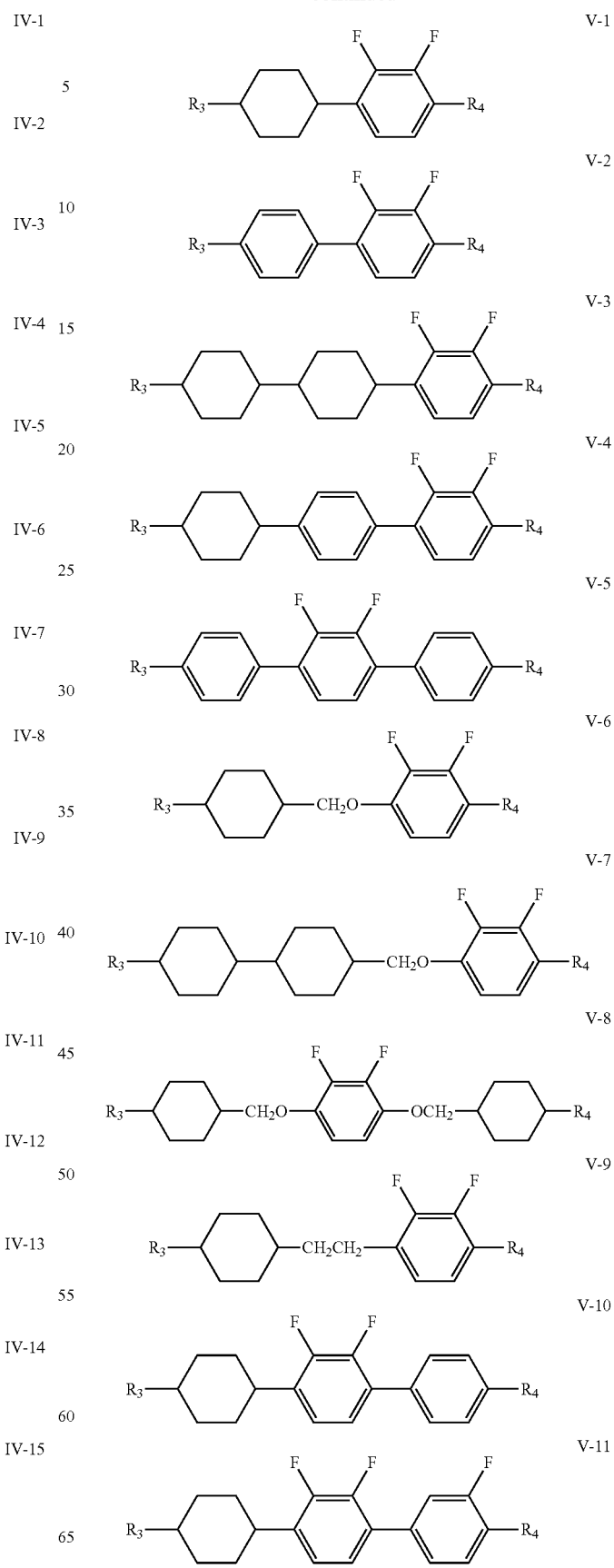

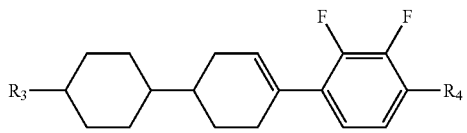

wherein

R$_3$ and R$_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more unconnected CH$_2$ in the groups represented by R$_3$ and R$_4$ may be substituted with cyclopentyl, cyclobutyl or cyclopropyl.

For displays using these liquid crystal compositions, after a polymerizable liquid crystal compound is added to an LC medium and the LC medium is introduced into an LC cell, pre-tilting of liquid crystal molecules can be formed by means of UV photopolymerization or crosslinking under the application of a voltage between electrodes. This is advantageous for simplifying the LCD manufacturing process, increasing the response speed, and reducing the threshold voltage.

The polymerizable liquid crystal compound provided by the present invention has the advantages of an adjustable rate of polymerization, a good mutual solubility with other monomers, a good ultraviolet resistance, etc. As a reactive mesogen (RM), it has the advantages of a good intermiscibility, a high charge holding ratio (VHR), a high polymerization activity (less monomer residue), etc., and is very suitable for use as an RM for PSA (polymer supported alignment) and PS (polymer stabilized) mode liquid crystal mixtures, especially in the case of PSA-VA and PSA-IPS.

The amount (in mass percentage) of the polymerizable liquid crystal composition added to the PSA-VA liquid crystal composition is preferably between 0.01% and 1%, further preferably between 0.03% and 0.5%.

The amount (in mass percentage) of the polymerizable liquid crystal composition added to the PSA-IPS liquid crystal composition is preferably between 0.001% and 1%, further preferably between 0.005% and 0.1%.

The amount (in mass percentage) of the compound represented by formula IV added to the liquid crystal composition is preferably between 20% and 80%, further preferably between 20% and 40%.

The amount (in mass percentage) of the compound represented by formula V added to the liquid crystal composition is preferably between 20% and 60%, further preferably between 30% and 50%.

Said liquid crystal composition may be a negative liquid crystal composition, and may further comprise one or more compounds represented by formula VI:

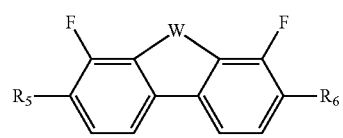

wherein

R$_5$ and R$_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more CH$_2$ in the groups represented by R$_5$ and R$_6$ may be replaced by cyclopentyl, cyclobutyl or cyclopropyl; and W represents O, S or —CH$_2$O—.

Said liquid crystal composition may further comprise one or more compounds represented by formula VII

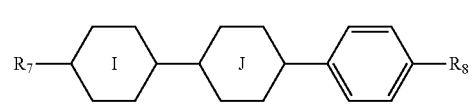

wherein

R$_7$ and R$_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; and

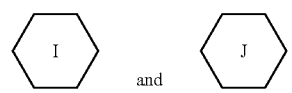

each independently represent 1,4-phenylene, 1,4-cyclohexylene or 1,4-cyclohexenylene.

The compound represented by formula VII is preferably:

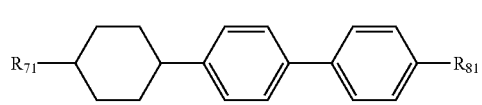

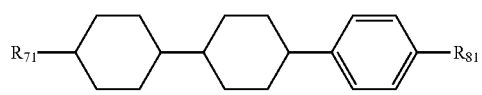

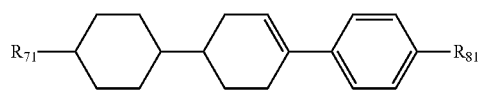

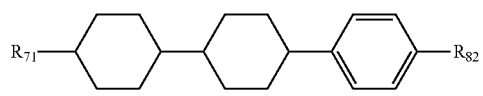

wherein R$_{71}$ and R$_{81}$ each independently represent an alkyl group having a carbon atom number of 2-6 or an alkenyl group having an atom number of 2-6;

$R_{82}$ represents an alkoxy group having a carbon atom number of 1-5; and $R_{71}$ and $R_{81}$ are more preferably vinyl, 2-propenyl or 3-pentenyl.

To the liquid crystal compounds provided by the present invention, at least one functional additive may be further added, and such functional additives mainly include antioxidants and ultraviolet absorbers, selected from functional additives of formulas VII and IX:

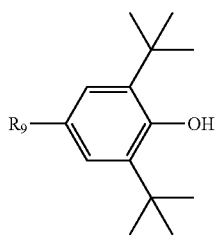

formula VII

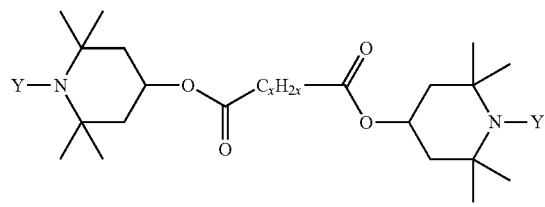

formula IX wherein $R_9$ represents an alkyl group having a carbon atom number of 1-10 or an alkoxy group having a carbon atom number of 1-10, and one or more methylene groups in the group represented by $R_9$ may be substituted with 1,4-cyclohexylene, 2,4-dioxane, cyclopentyl and/or cyclopropyl;

each Y independently represents H or methyl; and

X represents 8, 10 or 12.

The present invention further relates to a liquid crystal display element or liquid crystal display comprising any liquid crystal composition as mentioned above; and said display element or display is an active matrix display element or display or a passive matrix display element or display.

Said liquid crystal display element or liquid crystal display is preferably an active matrix addressing liquid crystal display element or liquid crystal display.

Said active matrix display element or display is specifically a PSVA-TFT or IPS-TFT liquid crystal display element or display.

DETAILED DESCRIPTION OF EMBODIMENTS

The present invention is further described in conjunction with particular examples below, but is not limited to the following examples. Said methods are all conventional methods, unless otherwise specified. Said raw materials are all commercially available, unless otherwise specified.

In the present specification, the percentages are mass percentages, the temperatures are in degree Celsius (° C.), and the specific meanings of other symbols and the test conditions are as follows:

Cp represents the clearing point (° C.) of a liquid crystal as measured by means of a DSC quantitative method;

S—N represents the melting point (° C.) for the transformation of a liquid crystal from a crystal state to a nematic phase;

Δn represents optical anisotropy, $n_o$ is the refractive index of an ordinary light, $n_e$ is the refractive index of an extraordinary light, with the test conditions being: 25±2° C., 589 nm and using an abbe refractometer for testing;

Δε represents dielectric anisotropy, with $\Delta\varepsilon=\varepsilon_{//}-\varepsilon_{\perp}$, in which $\varepsilon_{//}$ is a dielectric constant parallel to a molecular axis, and $\varepsilon_{\perp}$ is a dielectric constant perpendicular to the molecular axis, with the test conditions being 25±0.5° C., a 20 micron parallel cell, and INSTEC: ALCT-IR1 for testing;

γ1 represents a rotary viscosity (mPa·s), with the test conditions being 25±0.5° C., a 20 micron parallel cell, and INSTEC: ALCT-IR1 for testing; and ρ represents electrical resistivity (Ω·cm), with the test conditions being: 25±2° C., and the test instruments being a TOYO SR6517 high resistance instrument and an LE-21 liquid electrode.

VHR represents a voltage holding ratio (%), with the test conditions being: 20±2° C., a voltage of ±5 V, a pulse width of 10 ms, and a voltage holding time of 16.7 ms. The test equipment is a TOYO Model 6254 liquid crystal performance comprehensive tester.

τ represents response time (ms), with the test instrument being DMS-501 and the test conditions being: 25±0.5° C., a test cell that is a 3.3 micron IPS test cell, an electrode spacing and an electrode width, both of which are 10 microns, and an included angle between the frictional direction and the electrode of 10°.

T (%) represents transmittance, with T (%)=100%*bright state (Vop) luminance/light source luminance, with the test instrument being DMS501, and the test conditions being: 25±0.5° C., a test cell that is a 3.3 micron IPS test cell, an electrode spacing and an electrode width, both of which are 10 microns, and an included angle between the frictional direction and the electrode of 10°.

The conditions for the ultraviolet photopolymerization of a polymerizable compound involve using ultraviolet light with a wavelength of 313 nm and an irradiation light intensity of 0.5 Mw/cm².

In the examples of the invention of the present application, liquid crystal monomer structures are represented by codes, and the codes for ring structures, end groups and linking groups of liquid crystals are represented as in Tables (I) and (II) below

TABLE (I)

Codes corresponding to ring structures

| Ring structure | Corresponding code |
|---|---|
|  | C |
|  | P |
|  | G |
|  | Gi |

TABLE (I)-continued

Codes corresponding to ring structures

| Ring structure | Corresponding code |
|---|---|
| | Y |
| | Sa |
| | Sb |
| | Sc |

TABLE (II)

Codes corresponding to end groups and linking groups

| End group and linking group | Corresponding code |
|---|---|
| $C_nH_{2n+1}$— | n- |
| $C_nH_{2n+1}O$— | nO— |
| —$OCF_3$ | —OT |
| —$CF_2O$— | —Q— |
| —$CH_2O$— | —O— |
| —F | —F |
| —CN | —CN |
| —$CH_2CH_2$— | —E— |
| —CH=CH— | —V— |
| —C≡C— | —W— |
| —COO— | —COO— |
| —CH=CH—$C_nH_{2n+1}$ | Vn— |
| cyclopentyl | C(5)— |
| cyclopropyl | C(3)— |

EXAMPLES

RM-1

CC-C(5)-V1

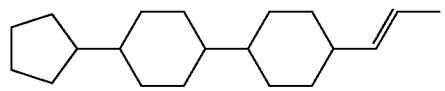

RM-2

I-7-10

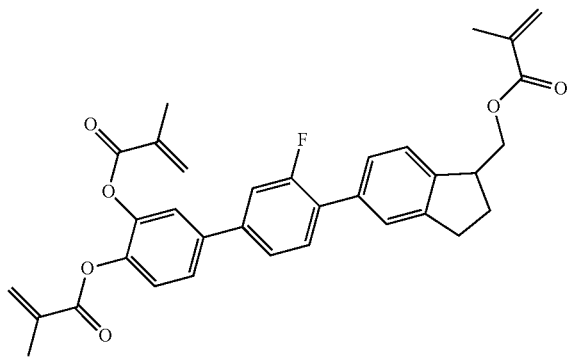

RM-3

I-12-7

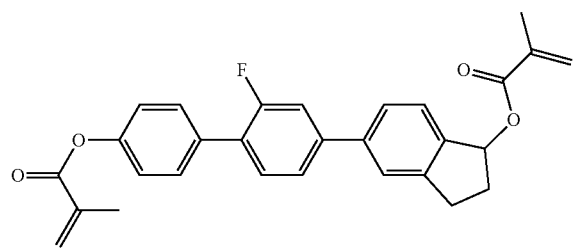

RM-4

I-19-1

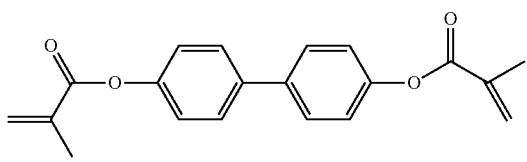

RM-5

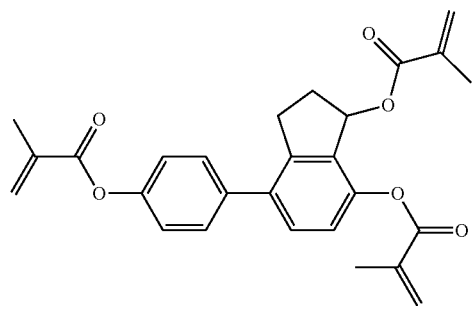

Additive-1

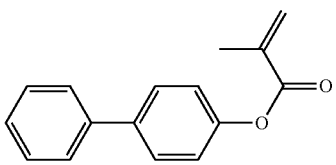
I-20-8

II-1-1

Additive-2

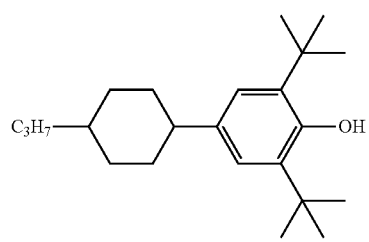

VII-1

IX-1

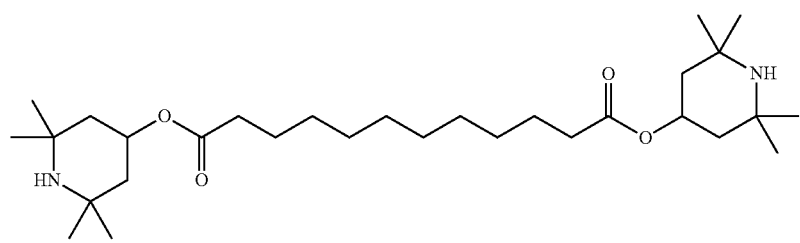

Sa-C(5)1O-O2

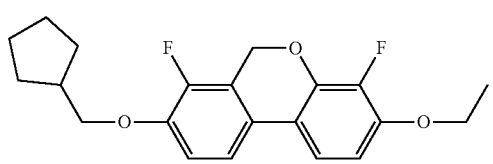

| Test parent 1: | | |
|---|---|---|
| Category | Liquid crystal monomer code | Content (%) |
| V | CY-C(5)-O4 | 11 |
| V | PY-C(5)-O2 | 9 |
| V | COY-3-O2 | 12 |
| V | CCOY-3-O2 | 8 |
| V | CY-5-O2 | 10 |
| IV | CC-3-V-1 | 5 |
| IV | CC-3-2 | 22 |
| IV | CC-2-5 | 8 |
| IV | CC-3-4 | 10 |
| VII | CCP-3-O1 | 5 |

| Test parent 2: | | |
|---|---|---|
| Category | Liquid crystal monomer code | Content (%) |
| V | CY-3-O2 | 11 |
| V | PY-3-O2 | 9 |

| Test parent 2: | | |
|---|---|---|
| Category | Liquid crystal monomer code | Content (%) |
| V | COY-3-O1 | 12 |
| V | CCOY-3-O2 | 8 |
| IV | PP-5-1 | 10 |
| IV | CC-3-2 | 20 |
| IV | CC-3-5 | 5 |
| VI | Sa-C(5)1O-O2 | 5 |
| VII | CCP-3-1 | 10 |
| VII | CPP-3-2 | 10 |

| Test parent 3: | | |
|---|---|---|
| Category | Liquid crystal monomer code | Content (%) |
| V | CCY-3-O2 | 11 |
| V | CPY-C(3)-O2 | 9 |
| V | CCY-2-O2 | 12 |

-continued

Test parent 3:

| Category | Liquid crystal monomer code | Content (%) |
|---|---|---|
| VI | Sa-C(3)1O-O4 | 8 |
| IV | PP-1-5 | 10 |
| IV | CC-3-2 | 24 |
| IV | CP-3-O2 | 11 |
| IV | CCP-3-1 | 10 |
| VII | CPP-3-O2 | 5 |

Test parent 4:

| Category | Liquid crystal monomer code | Content (%) |
|---|---|---|
| V | CCY-3-O2 | 11 |
| V | PY-3-O2 | 9 |
| V | CPY-3-O2 | 12 |
| V | CCOY-3-O2 | 8 |
| V | CY-3-O4 | 12 |
| IV | CC-3-2 | 22 |
| IV | CC-3-5 | 10 |
| IV | CC-3-4 | 8 |
| IV | PP-5-O2 | 5 |
| VII | CCP-3-O1 | 3 |

Experiment 1. Investigation of Solubility of Polymerizable Liquid Crystal Compositions Determination of low-temperature reliability of polymerizable liquid crystal compositions added to different liquid crystal parents 1% of single component polymerizable compound RM1-5 is added to test parents 1-4, respectively; and for comparison, a polymerizable liquid crystal composition is added in equal quantity to test parents 1-4, respectively, and the storage performance thereof at −30° C. in sample bottles are investigated.

| Experiment number | | Sample composition | −30° C. (5 d) |
|---|---|---|---|
| Comparative Example 1-1 | Parent 1 | RM-1 (1%) | NG |
| Comparative Example 1-2 | | RM-3 (1%) | NG |
| Comparative Example 1-3 | | RM-5 (1%) | NG |
| Example 1-1 | | RM-1 (0.5%) + RM-5 (0.1%) | OK |
| Example 1-2 | | RM-3 (0.5%) + RM-5 (0.5%) | OK |
| Comparative Example 1-4 | Parent 2 | RM-2 (1%) | NG |
| Comparative Example 1-5 | | RM-4 (1%) | NG |
| Comparative Example 1-6 | | RM-5 (1%) | NG |
| Example 1-3 | | RM-2 (0.5%) + RM-5 (0.1%) | OK |
| Example 1-4 | | RM-4 (0.5%) + RM-5 (0.5%) | OK |
| Comparative Example 1-7 | Parent 3 | RM-1 (1%) | NG |
| Comparative Example 1-8 | | RM-3 (1%) | NG |
| Comparative Example 1-9 | | RM-5 (1%) | NG |
| Example 1-5 | | RM-1 (0.5%) + RM-5 (0.5%) | OK |
| Example 1-6 | | RM-3 (0.5%) + RM-5 (0.5%) | OK |
| Example 1-7 | | RM-1 (0.4%) + RM-3 (0.4%) + RM-5 (0.2%) | OK |
| Comparative Example 1-10 | Parent 4 | RM-2 (1%) | NG |
| Comparative Example 1-11 | | RM-2 (1%) | NG |
| Comparative Example 1-12 | | RM-4 (1%) | NG |
| Comparative Example 1-13 | | RM-5 (1%) | NG |
| Example 1-8 | | RM-2 (0.5%) + RM-5 (0.5%) | OK |
| Example 1-9 | | RM-3 (0.5%) + RM-5 (0.5%) | OK |
| Example 1-10 | | RM-4 (0.5%) + RM-5 (0.5%) | OK |

As can be seen from the above table, comparing Comparative Examples 1-1 to 1-13 with Examples 1-1 to 1-10, none of the low-temperature reliabilities of the compositions in which the monomer of formula I or the monomer of formula II is used alone can achieve criteria, whereas the low-temperature reliabilities of the compositions in which the monomer of formula II and the monomer of formula I are used can achieve the criteria.

The non-benzene ring structures in formula I and formula II can increase the solubilities of the polymerizable monomers. It is an essential component in the polymerizable liquid crystal composition.

Experiment 2. Evaluation of Conversion Rate of Polymerizable Liquid Crystal Compositions Determination of rate of polymerization of polymerizable liquid crystal compositions added to different liquid crystal parents 4000 ppm of single component polymerizable compound RM1-6 is added to test parents 1-4, respectively; and for comparison, a polymerizable liquid crystal composition is added in equal quantity to test parents 1-4, respectively; liquid crystal media are prepared by the liquid crystal medium preparation method mentioned above, the liquid crystal media are filled into liquid crystal cells, a PSA panel process 1 is simulated, and the rates of polymerization thereof are determined, with the specific conditions being: UV1: 72 mW/cm$^2$@365 nm, 100 s; furthermore, the liquid crystal cells are cut open for HPLC analysis, and the results of the rate of polymerization under UV1 conditions are compared and as shown in the following table.

| Experiment number | | Sample composition | UV1 conversion rate (%) |
|---|---|---|---|
| Comparative Example 2-1 | Parent 1 | RM-1 (0.4%) | 87 |
| Comparative Example 2-2 | | RM-3 (0.4%) | 55 |
| Comparative Example 2-3 | | RM-5 (0.4%) | 31 |
| Example 2-1 | | RM-1 (0.3%) + RM-5 (0.1%) | 80 |
| Example 2-2 | | RM-3 (0.3%) + RM-1 (0.1%) | 49 |
| Comparative Example 2-4 | Parent 2 | RM-2 (0.4%) | 85 |
| Comparative Example 2-5 | | RM-4 (0.4%) | 64 |
| Comparative Example 2-6 | | RM-5 (0.4%) | 33 |
| Example 2-3 | | RM-2 (0.2%) + RM-5 (0.2%) | 62 |
| Example 2-4 | | RM-4 (0.2%) + RM-5 (0.2%) | 49 |
| Comparative Example 2-7 | Parent 3 | RM-1 (0.4%) | 90 |
| Comparative Example 2-8 | | RM-3 (0.4%) | 59 |
| Comparative Example 2-9 | | RM-5 (0.4%) | 33 |
| Example 2-5 | | RM-1 (0.3%) + RM-5 (0.1%) | 78 |
| Example 2-6 | | RM-3 (0.3%) + RM-1 (0.1%) | 53 |

| Experiment number | Sample composition | UV1 conversion rate (%) |
|---|---|---|
| Example 2-7 | RM-1 (0.2%) + RM-3 (0.1%) + RM-5 (0.1%) | 74 |
| Comparative Example 2-10 | Parent 4 RM-3 (0.4%) | 62 |
| Comparative Example 2-11 | RM-4 (0.4%) | 68 |
| Comparative Example 2-12 | RM-5 (0.4%) | 35 |
| Example 2-8 | RM-3 (0.36%) + RM-5 (0.04%) | 60 |
| Example 2-9 | RM-4 (0.36%) + RM-5 (0.04%) | 66 |

As can be seen from the above table, comparing Comparative Examples 2-1 to 2-12 with Examples 2-1 to 2-9, the rates of polymerization of those having the same RM in different parents are different, which is in line with general industry knowledge, and also brings challenges in terms of the types and quantities of polymers added to the LCDs to different LCD manufacturers when carrying out liquid crystal formulation. Overall, the conversion rate of the polymerizable compound of formula I is higher than that of the polymerizable compound of formula II, and the conversion rate of the polymerizable compound of formula I is too fast, resulting in a risk of forming broken bright spots, so that it is not suitable for use alone. By means of the polymerizable composition provided by the present invention formed by the adjustment of the polymerizable compounds of formula I and formula II, the effects of different rates of polymerization can be achieved.

Furthermore, it can be found that after the polymerization and mixing of different components, the rate of polymerization thereof does not lie in a simple weighted average relationship, wherein among the components, some tend towards the fast components after being promoted by each other, some have no effect, some tend towards the slow components, and some may tend to be slower than the slowest component due to being diluted with each other; therefore, it is very important to carry out the adjustment of the polymerizable liquid crystal composition.

Experiment 3. Evaluation of Reliability and Pretilt Angle of Polymerizable Liquid Crystal Compositions The same liquid crystal compositions as in Experiment 2 are used, wherein the small number liquid crystal components in the samples of Example 3 are the same as the small number liquid crystal components in Example 2, e.g., the liquid crystal component in Example 3-2 is equivalent to that in Example 2-2.

PSA panel process 2 is completed on the basis of Experiment 2, with the specific conditions being: UV2: 5 mW/cm²@365 nm, and 100 min, and the final conversion rate, voltage holding ratio (VHR), and pretilt angle thereof are tested, wherein due to the PSVA mode, the pretilt angle is actually evaluated by using a 90-measured value during the evaluation.

| Experiment number | UV1 conversion rate (%) | UV2 conversion rate (%) | Pretilt angle (°) | VHR |
|---|---|---|---|---|
| Comparative Example 3-1 | 87 | 99 | 87.8 | 99.1 |
| Comparative Example 3-2 | 55 | 90 | 88.9 | 99.0 |
| Comparative Example 3-3 | 31 | 76 | 89.0 | 99.3 |
| Example 3-1 | 80 | 98 | 88.8 | 99.5 |
| Example 3-2 | 49 | 87 | 88.9 | 99.7 |
| Comparative Example 3-4 | 85 | 99 | 87.6 | 99.0 |
| Comparative Example 3-5 | 64 | 93 | 88.1 | 99.3 |
| Comparative Example 3-6 | 33 | 77 | 89.3 | 99.1 |
| Example 3-3 | 62 | 92 | 88.7 | 99.4 |
| Example 3-4 | 49 | 87 | 88.3 | 99.5 |
| Comparative Example 3-7 | 90 | 99 | 87.3 | 99.1 |
| Comparative Example 3-8 | 59 | 90 | 88.1 | 99.3 |
| Comparative Example 3-9 | 33 | 77 | 88.9 | 99.2 |
| Example 3-5 | 78 | 96 | 88.4 | 99.5 |
| Example 3-6 | 53 | 88 | 88.6 | 99.6 |
| Example 3-7 | 74 | 94 | 88.6 | 99.5 |
| Comparative Example 3-10 | 62 | 97 | 87.8 | 99.1 |
| Comparative Example 3-11 | 68 | 94 | 87.9 | 99.4 |
| Comparative Example 3-12 | 35 | 76 | 88.3 | 99.2 |
| Example 3-8 | 60 | 97 | 88.6 | 99.5 |
| Example 3-9 | 66 | 82 | 88.6 | 99.6 |

As can be seen from Comparative Examples 3-1 to 3-12 and Examples 3-1 to 3-9, although the difference in conversion rate after UV1 is relatively large, the difference in conversion rate after UV2 is decreased; furthermore, the final pretilt angles of samples with similar conversion rates are also different; the conversion rates of some of the single component samples of formula I are too fast, and uneven sample particles may cause the pretilt angle thereof to be too large, thereby forming a large Bump, easily causing light leakage; however, the mixed samples to which formula II is added have a relatively stable pretilt angle, can suppress the generation of larger particles, contributing to the stability of the pretilt angle. Therefore, under the premise of satisfying the processes of LCD manufacturers, the polymer particles are uniform, and the pretilt angle is appropriate, which are the characteristics of the adjustment of the polymerizable liquid crystal mixture. The voltage holding ratio (VHR) data obtained by the tested samples are all excellent, and the data of the examples in which polymerizable liquid crystal compositions of components of formula I and formula II are added to the same parent for comparison (for different parents, direct comparison is impossible) are significantly preferred.

Experiment 4. Evaluation of Reliability of Functional Additives on Polymerizable Liquid Crystal Compositions On the basis of Experiment 3, the same liquid crystal compositions as those in Comparative Example 3-12, Example 3-5 and Example 3-7 are selected for an aging test; polymerizable compounds are polymerized by means of ultraviolet irradiation, and tested under the conditions of ultraviolet light, a high temperature, etc. for the voltage holding ratios (VHR) thereof; in addition, by adding functional additives to Example 3-5 and Example 3-7, the voltage holding ratios (VHR) of Examples 4-1 to 4-6 are further investigated under the conditions of ultraviolet light, a high temperature, etc.

| Experiment number | Composition | VHR (initial) | VHR (ultra-violet) | VHR (high temperature) |
|---|---|---|---|---|
| Comparative Example 4-1 | Comparative Example 3-12 | 99.2 | 95.2 | 93.7 |
| Comparative Example 4-2 | Example 3-5 | 99.5 | 97.2 | 97.1 |
| Example 4-1 | Example 3-5 + 200 ppm of Additive-1 | 99.2 | 97.6 | 99.0 |
| Example 4-2 | Example 3-5 + 100 ppm of Additive-2 | 99.3 | 99.0 | 97.8 |
| Example 4-3 | Example 3-5 + 100 ppm of Additive-1 + 100 ppm of Additive-2 | 99.1 | 98.5 | 98.7 |
| Comparative Example 4-3 | Example 3-7 | 99.5 | 97.4 | 97.6 |
| Example 4-4 | Example 3-7 + 200 ppm of Additive-1 | 99.2 | 97.7 | 98.9 |
| Example 4-5 | Example 3-7 + 100 ppm of Additive-2 | 99.2 | 99.1 | 98.1 |
| Example 4-6 | Example 3-7 + 200 ppm of Additive-1 + 100 ppm of Additive-2 | 99.1 | 98.7 | 99.0 |

As can be seen from Comparative Examples 4-1 to 4-3, the VHR after ultraviolet irradiation and the VHR after high temperature of the samples are significantly reduced as compared with the initial VHR thereof; and the reductions in the VHRs after ultraviolet irradiation and high temperature of Comparative Example 4-2 and Comparative Example 4-3 manufactured from Example 3-5 and Example 3-7 are smaller than those of Comparative Example 4-1, indicating that the VHRs after ultraviolet irradiation and high temperature thereof can be improved after being mixed with RM;

in addition, as can be seen from Examples 4-1 to 4-6, the VHR after high temperature and the VHR after ultraviolet irradiation are both improved after the addition of additive-1 and additive-2 in the liquid crystal composition, and the effects of improvement of additive-1 and additive-2 are not the same, wherein additive-1 focuses on improving the VHR after high temperature, and improves the VHR after ultraviolet irradiation, but the amplitude of the improvement is not as good as the effect after high temperature; and additive-2 focuses on improving the VHR after ultraviolet irradiation, and improves the VHR after high temperature, but the amplitude of the improvement is not as good as the effect after ultraviolet irradiation; however, using additive-1 and additive-2 in combination can achieve more ideal results; of course, the addition of the additives will cause the initial value to decrease, and the addition amount and type thereof should be used according to specific circumstances.

The invention claimed is:

1. A polymerizable liquid crystal composition, comprising one or more polymerizable liquid crystal compounds represented by formula I-1, I-2, I-4, I-5, I-7 to I-15, I-19 to I-20 and one or more polymerizable liquid crystal compounds represented by formula II-1 to II-3:

I-1

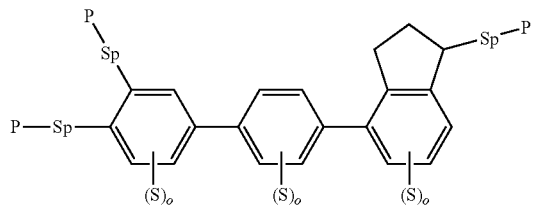

I-2

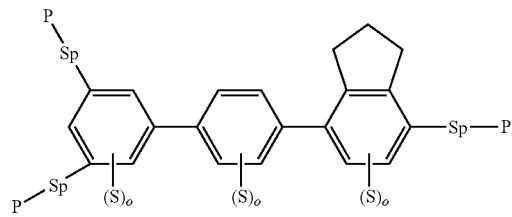

I-4

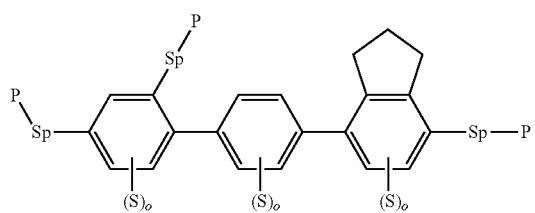

I-5

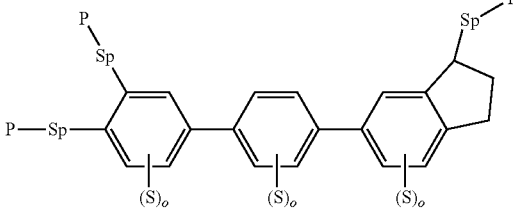

I-7

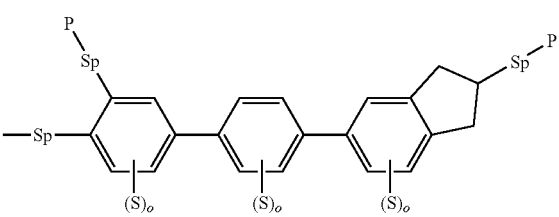

I-8

I-9

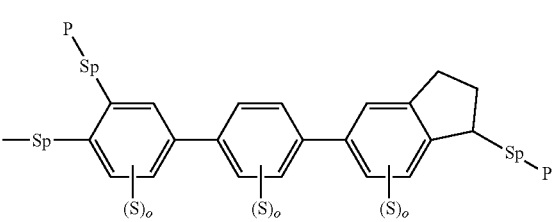

I-10

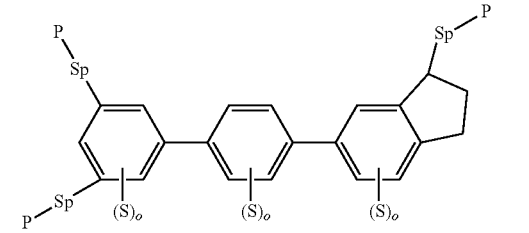

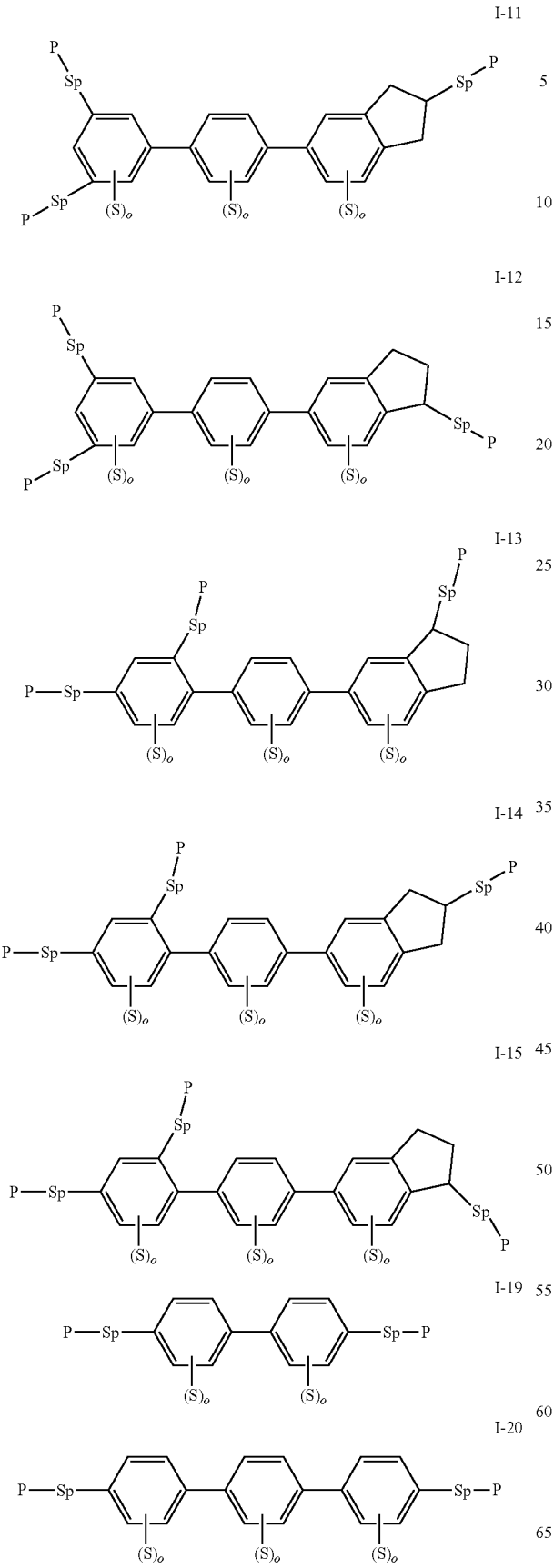

I-11

I-12

I-13

I-14

I-15

I-19

I-20

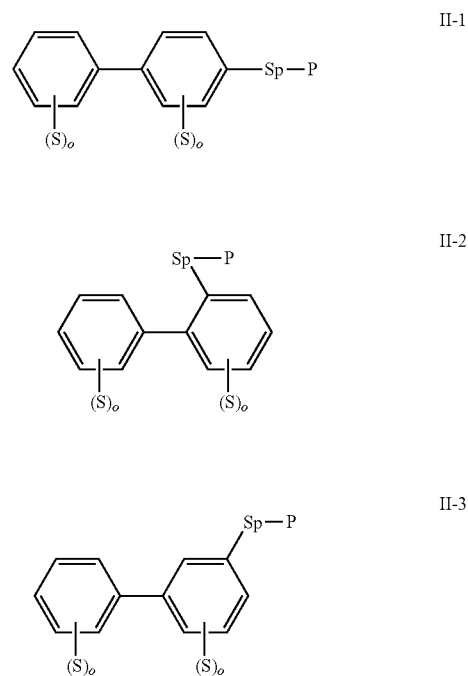

II-1

II-2

II-3 wherein
each P independently represents a polymerizable group

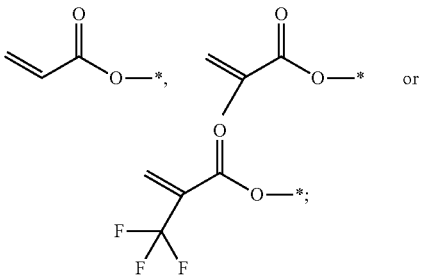

each Sp independently represents a single bond, a C1-C5 alkyl group, a C2-C5 alkenyl group, or a group formed by replacing any one CH$_2$ or several CH$_2$ that are not adjacent in a C1-C5 alkyl group or a C2-C5 alkenyl group by —O—, —S—, —CO—, —CH$_2$O—, —OCH$_2$—, —COO—, —OOC— or an acrylate group;

each S independently represents H, a C1-C5 alkyl group, a C1-C5 alkoxy group, a fluorine-substituted C1-C5 alkyl group, a fluorine-substituted C1-C5 alkoxy group, F or Cl, wherein any one or more unconnected CH$_2$ in the groups represented by S may be independently replaced by —O—, —S—, —CO—, —CH$_2$O—, —OCH$_2$—, —COO—, —OOC— or an acrylate group or a methacrylate group;

each o independently represents 0, 1, 2 or 3.

2. The polymerizable liquid crystal composition according to claim 1, wherein the compound represented by formula I-1, I-2, I-4, I-5, I-7 to I-15, I-19 to I-20 is selected from compounds represented by formulas I-1-1 to I-2-9, I-4-1 to I-5-10, I-7-1 to I-15-19, I-19-1 to I-20-19, I-1-1
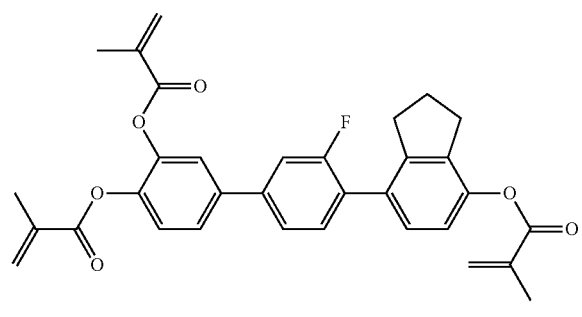
I-1-6
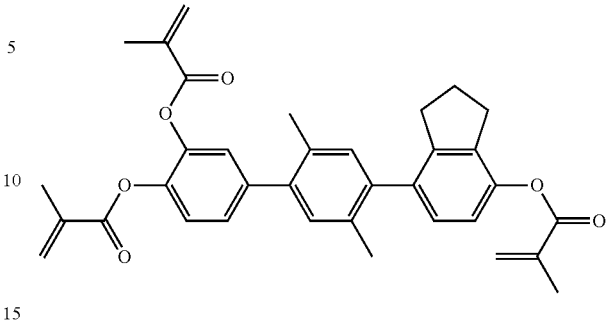
I-1-2
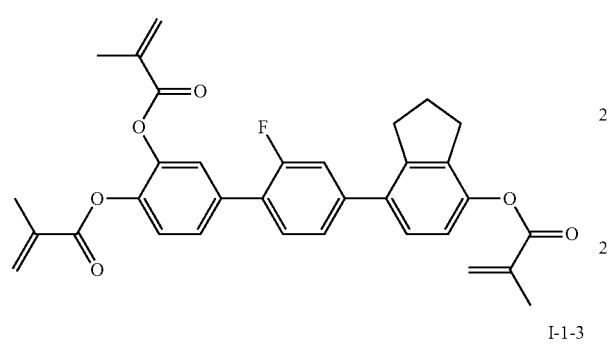
I-1-7
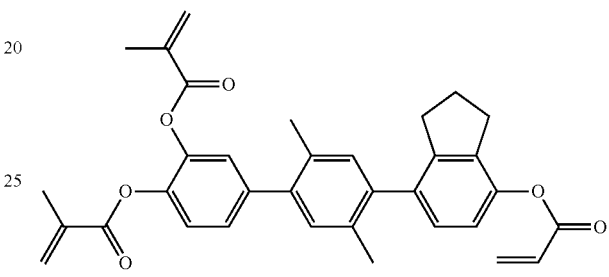
I-1-3
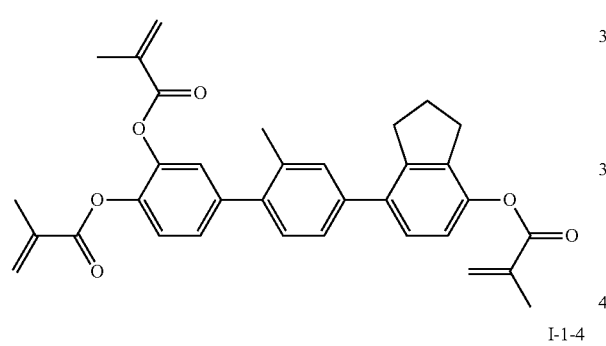
I-1-8
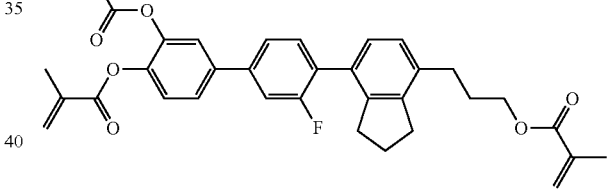
I-1-4
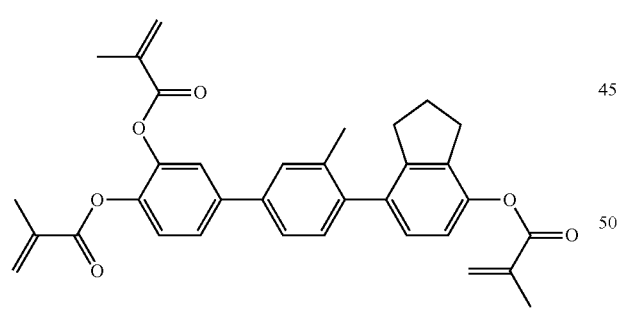
I-1-9
I-1-5
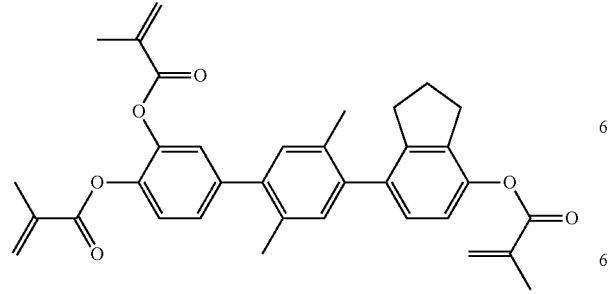
I-1-10
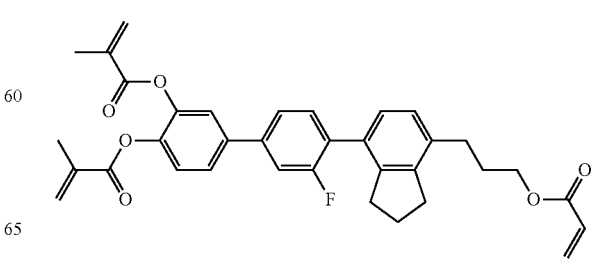

-continued
I-2-1
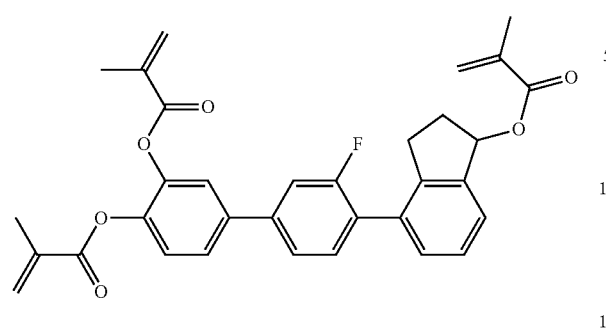
I-2-2
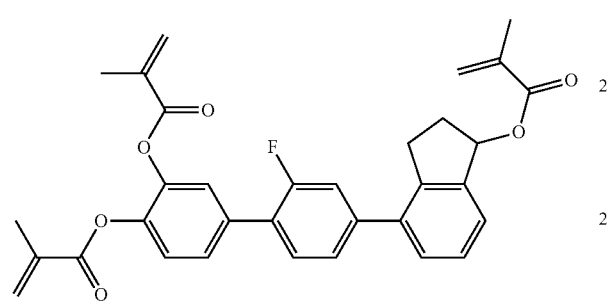
I-2-3
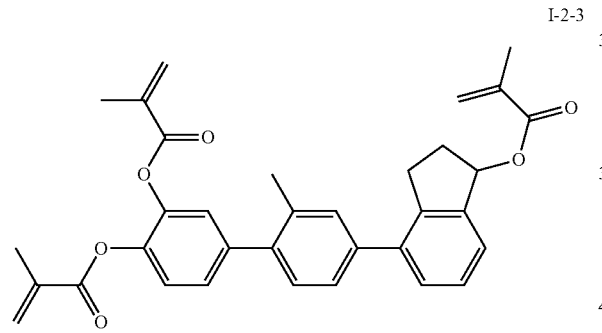
I-2-4
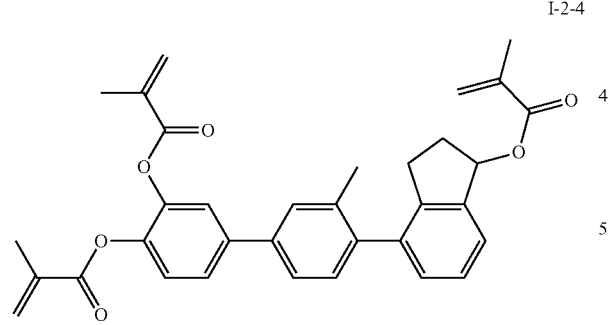
I-2-5
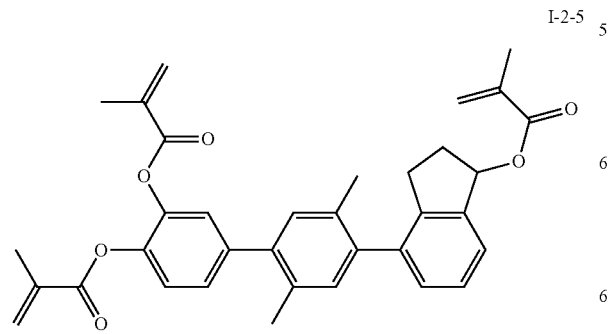
-continued
I-2-6
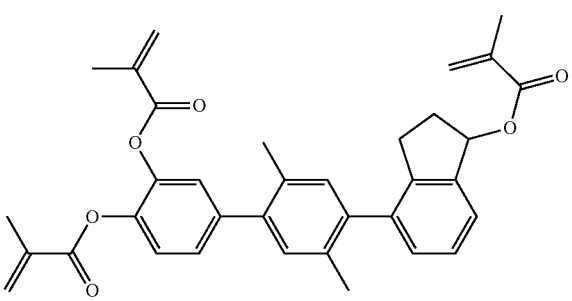
I-2-7
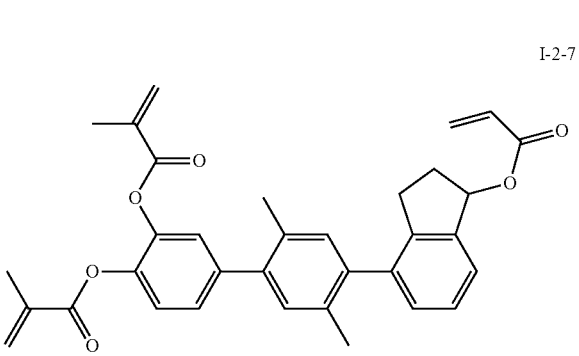
I-2-8
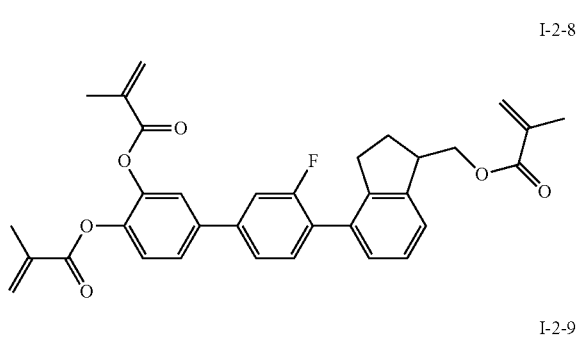
I-2-9
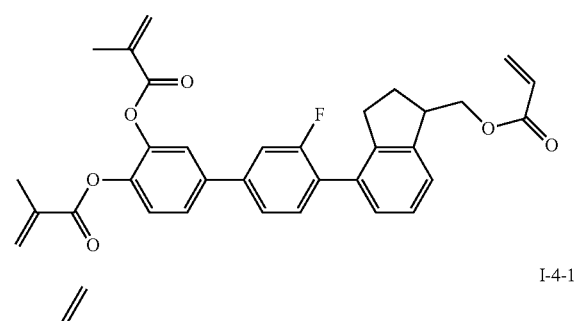
I-4-1
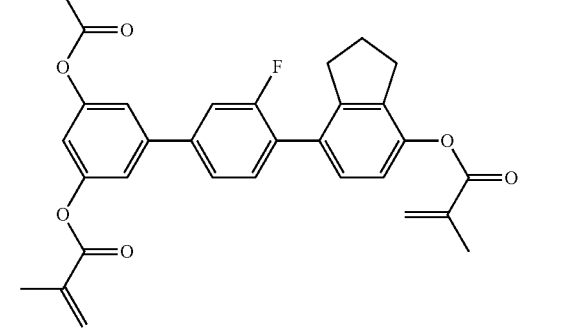

I-4-2
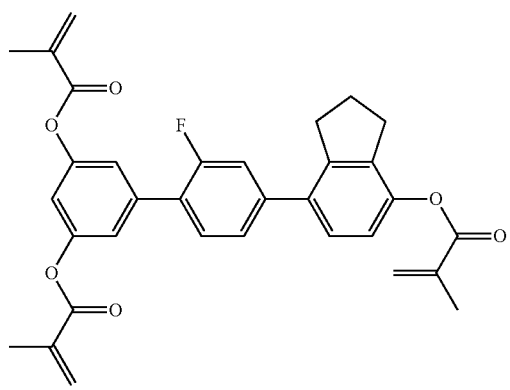
I-4-3
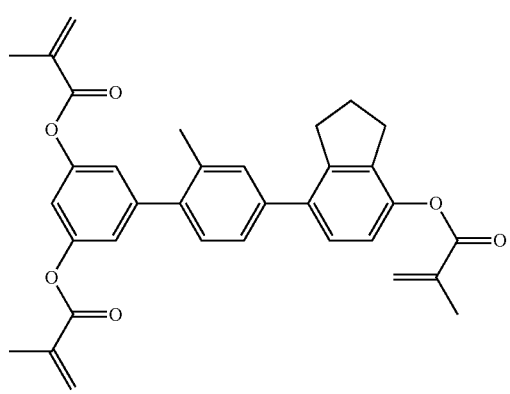
I-4-4
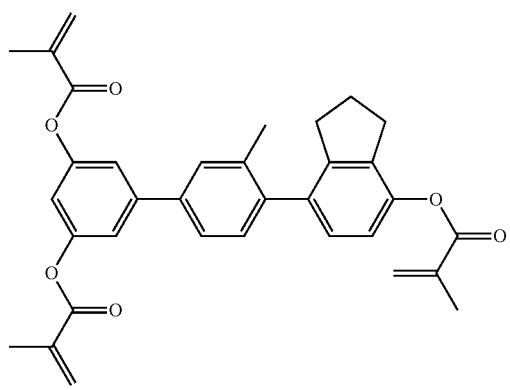
I-4-5
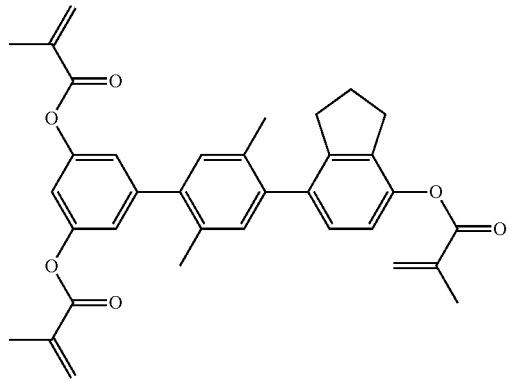
I-4-6
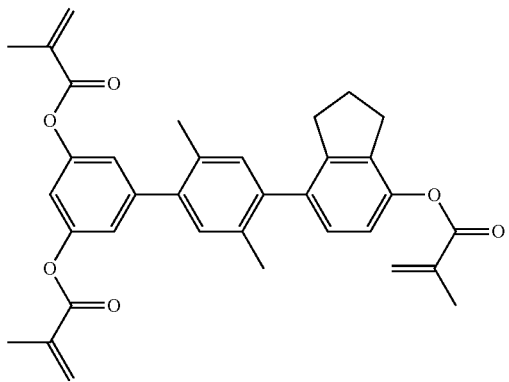
I-4-7
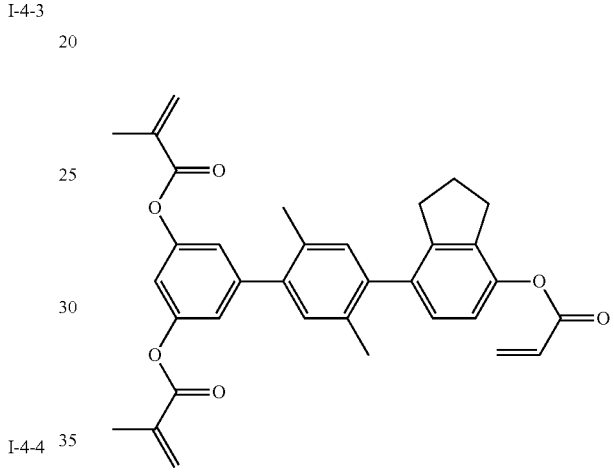
I-4-8
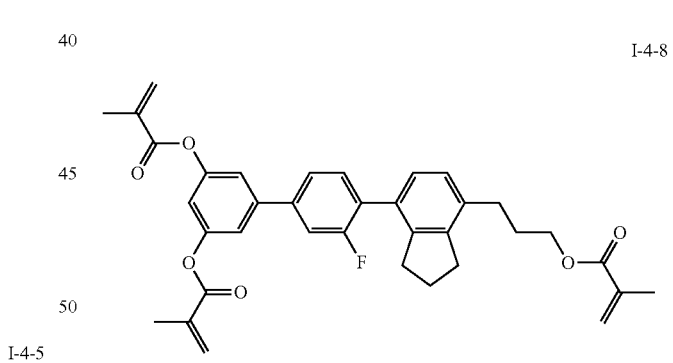
I-4-9
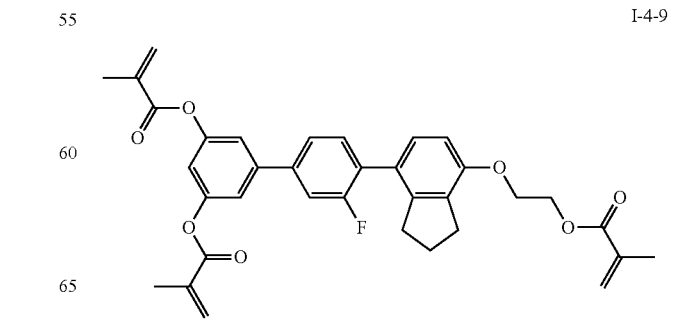

I-4-10
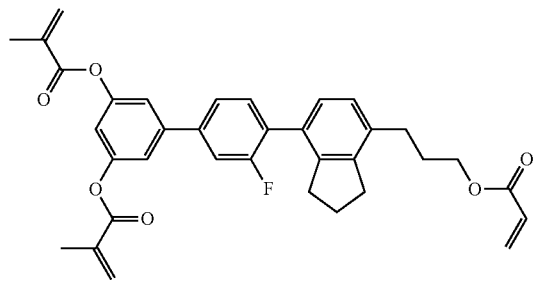
I-5-1
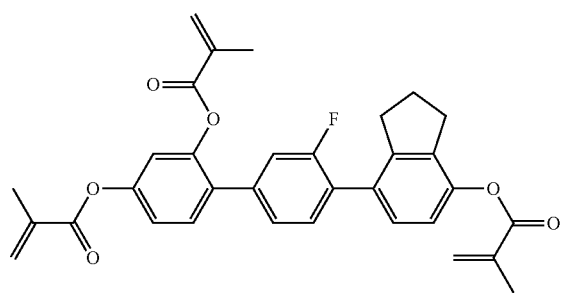
I-5-2
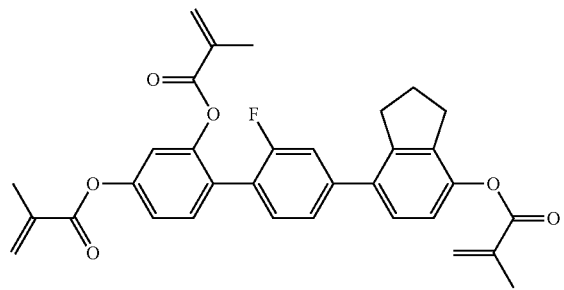
I-5-3
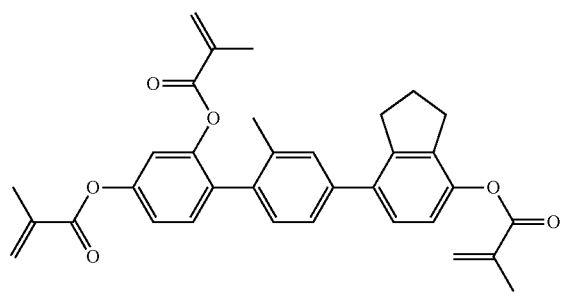
I-5-4
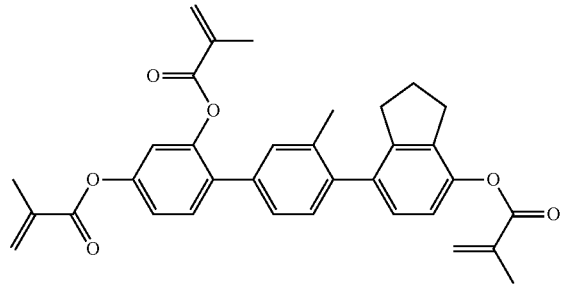
I-5-5
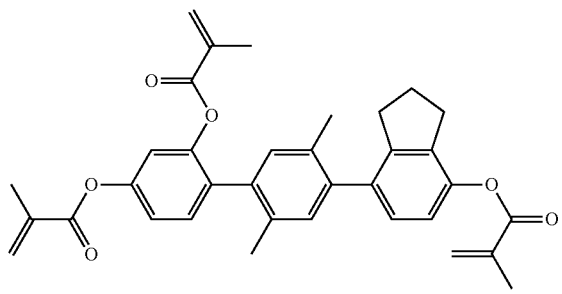
I-5-6
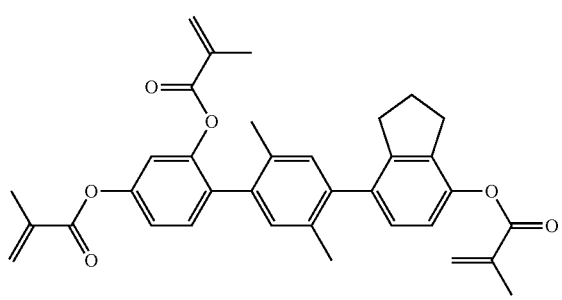
I-5-7
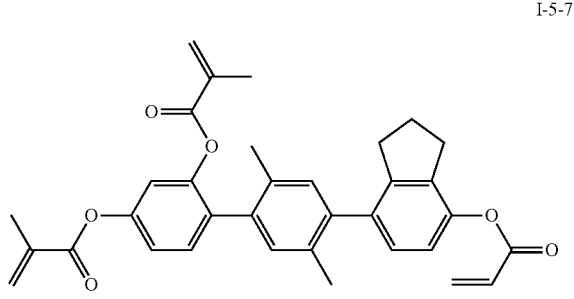
I-5-8
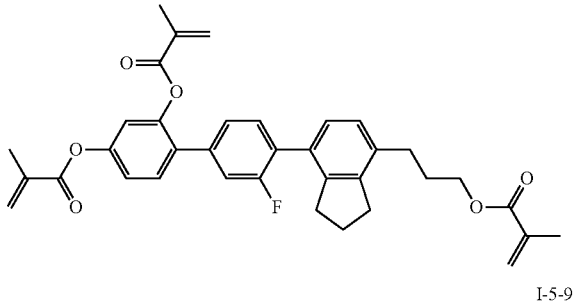
I-5-9

-continued
I-5-10
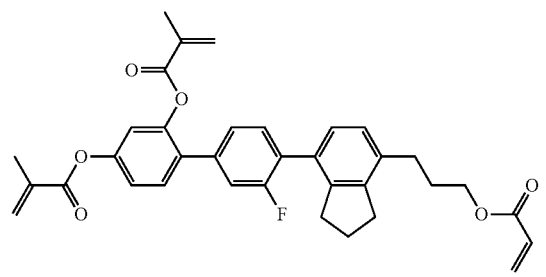
I-7-1
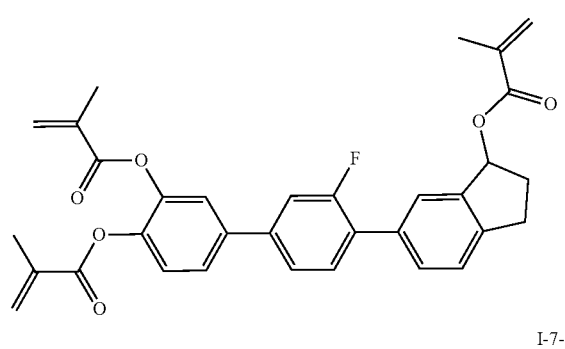
I-7-2
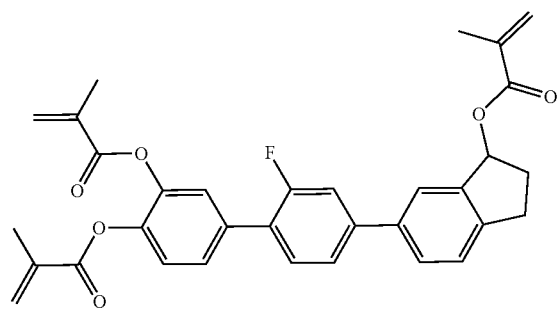
I-7-3
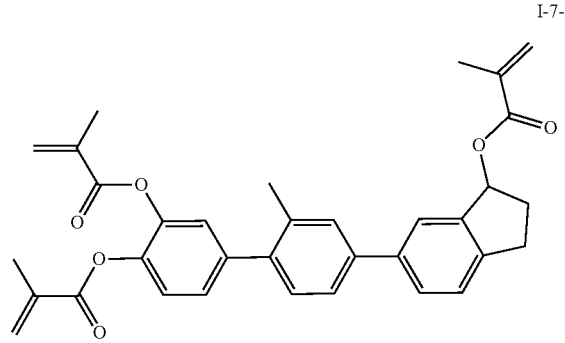
I-7-4
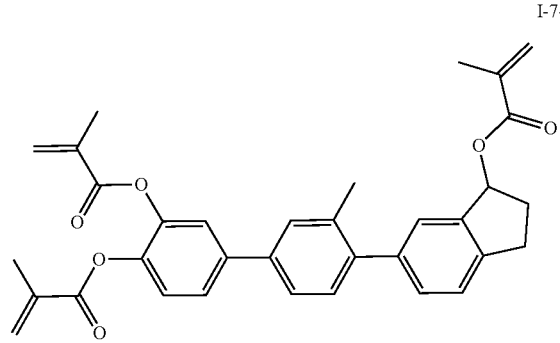
-continued
I-7-5
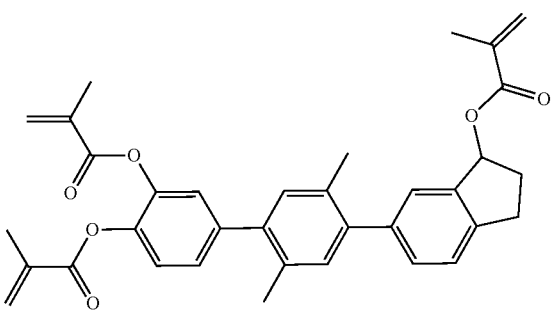
I-7-6
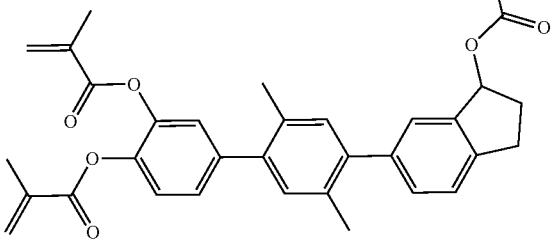
I-7-7
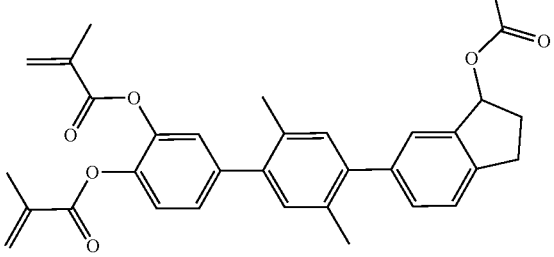
I-7-8

I-7-9
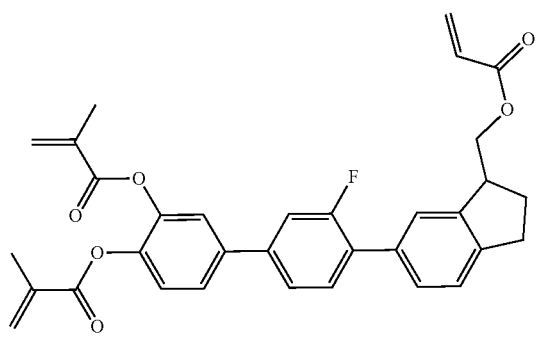
I-7-13
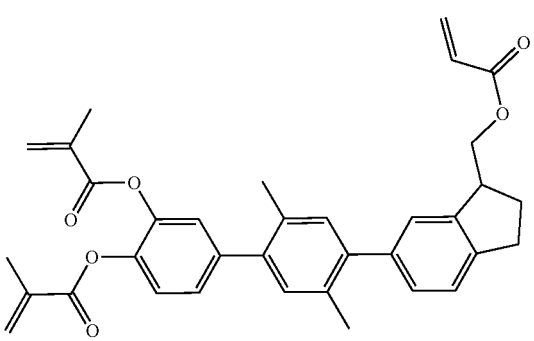
I-7-10
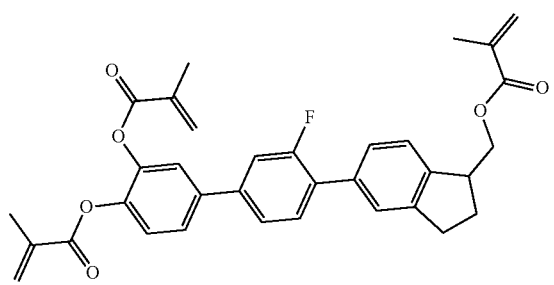
I-7-14
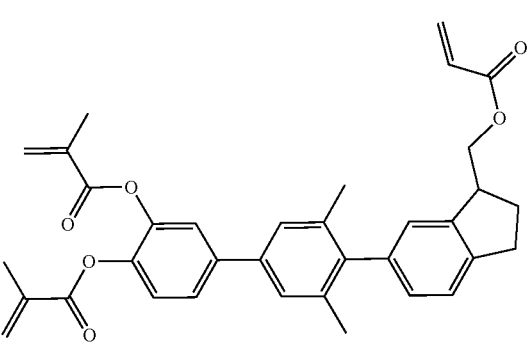
I-7-11
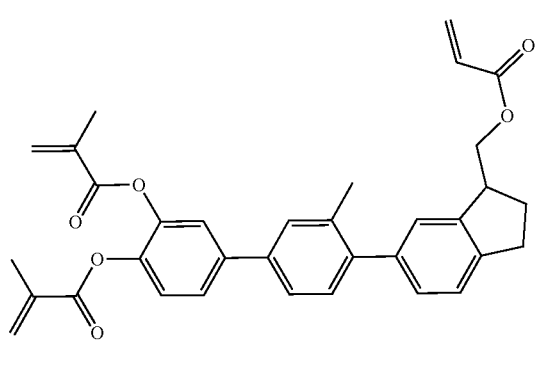
I-7-15
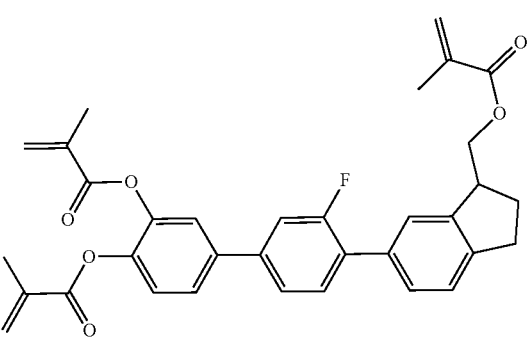
I-7-12
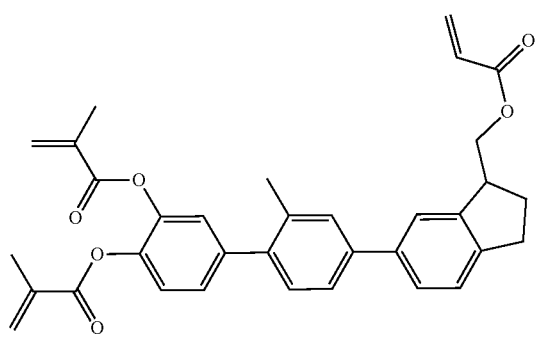
I-7-16
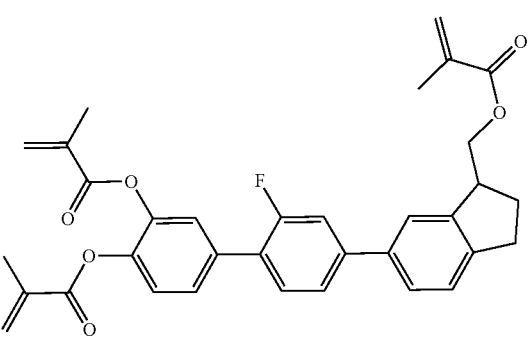

I-7-17
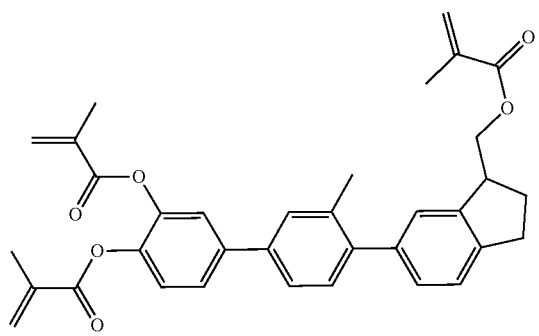
I-7-18
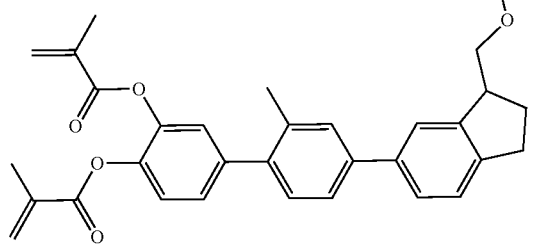
I-7-19
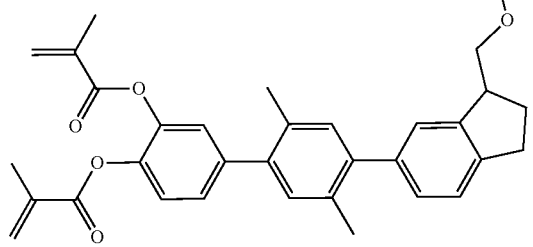
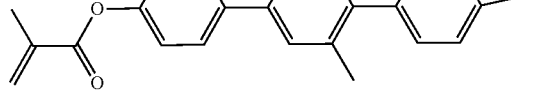
I-7-20
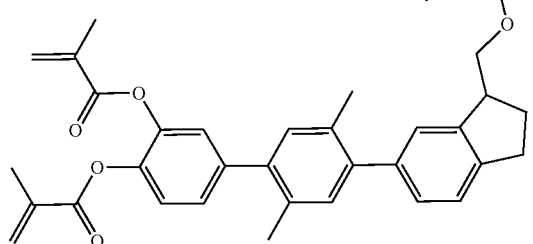
I-8-1
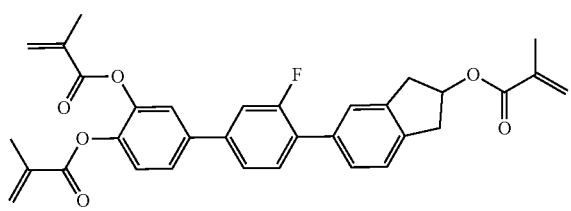
I-8-2
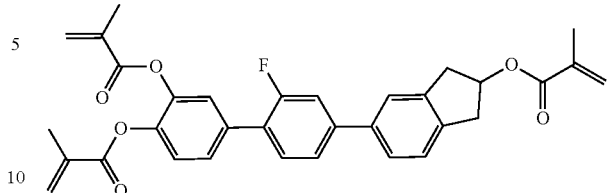
I-8-3
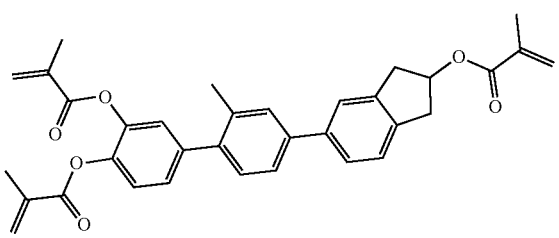
I-8-4
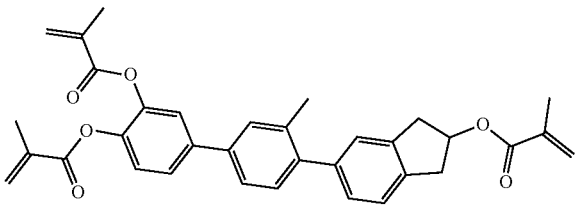
I-8-5
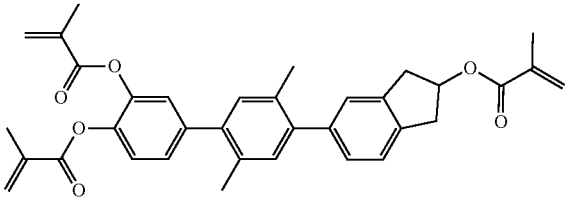
I-8-6
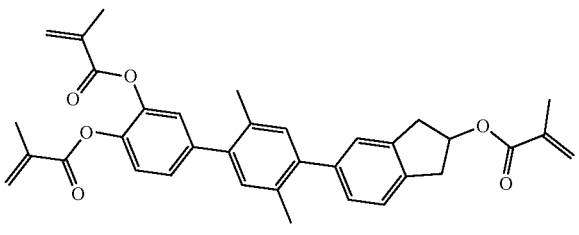
I-8-7
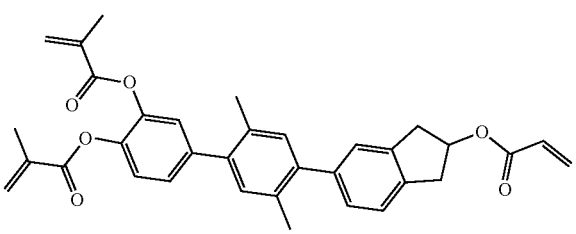

I-8-8
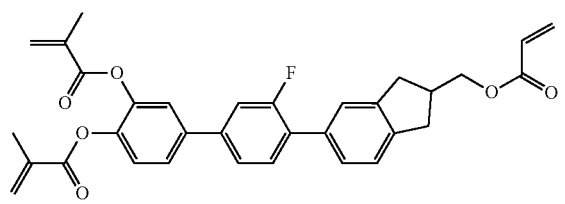
I-8-9
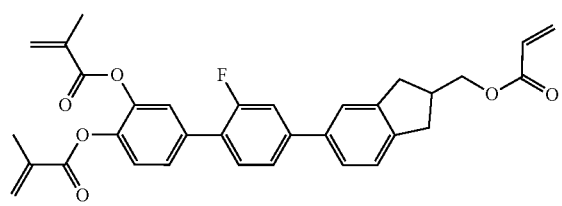
I-8-10
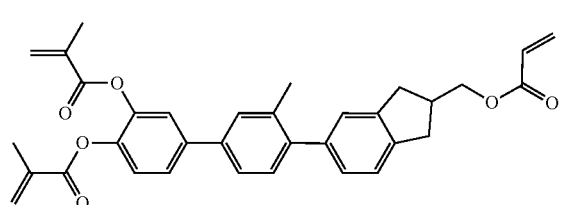
I-8-11
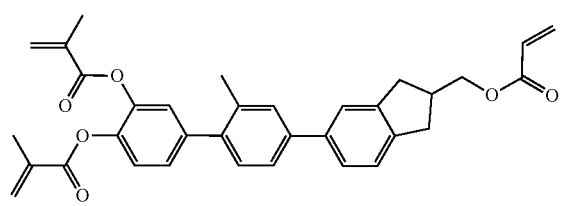
I-8-12
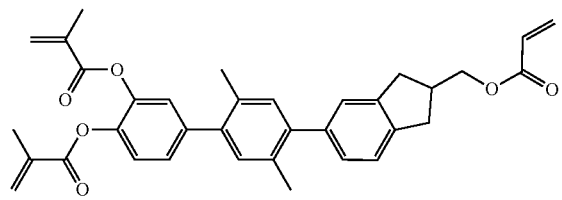
I-8-13
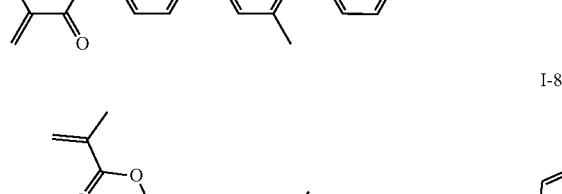
I-8-14
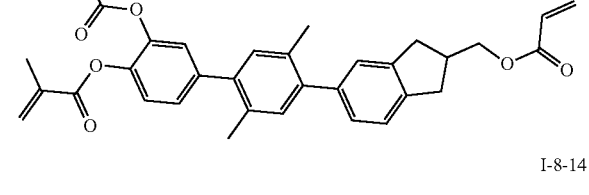
I-8-15
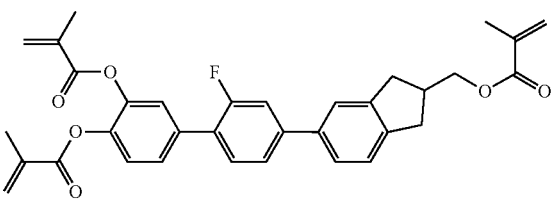
I-8-16
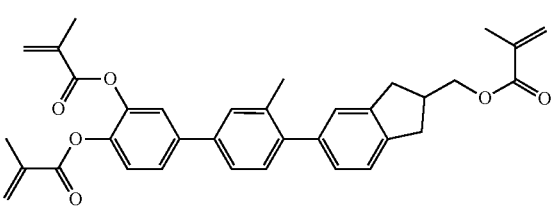
I-8-17
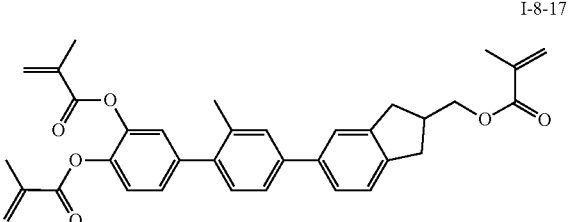
I-8-18
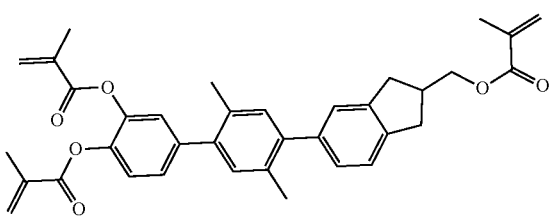
I-8-19
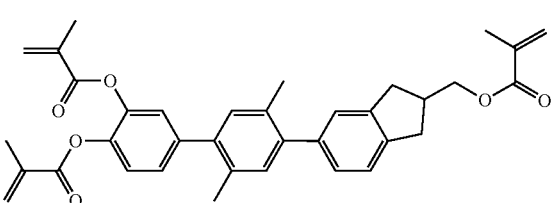
I-9-1
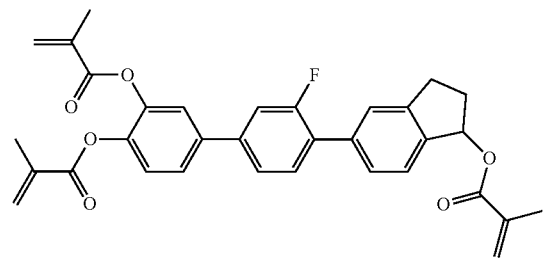

-continued
I-9-2
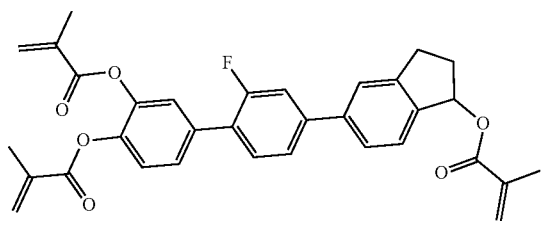
I-9-3
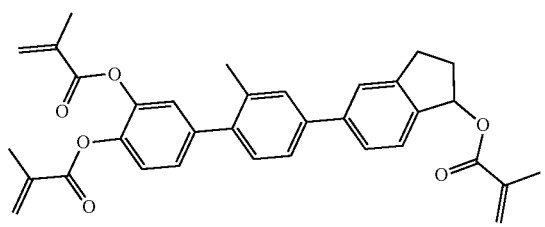
I-9-4
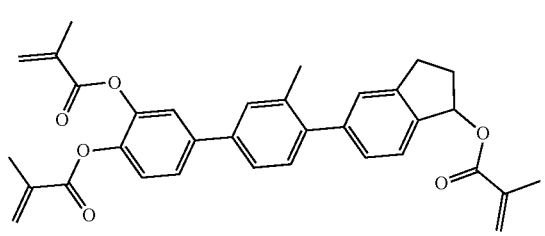
I-9-5
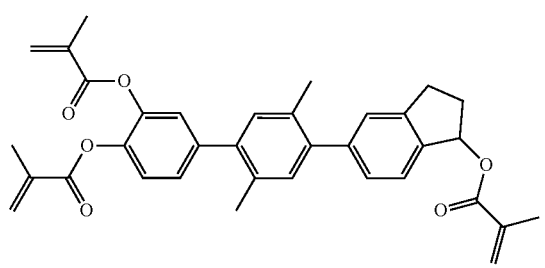
I-9-6
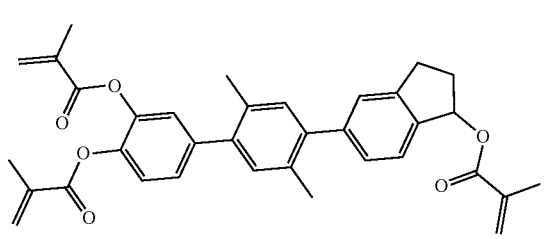
I-9-7
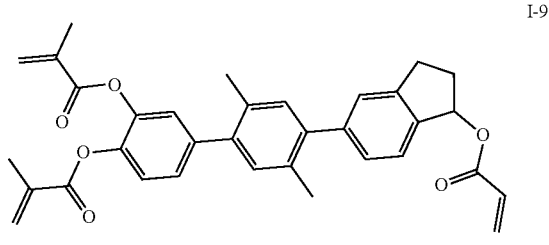
I-9-8
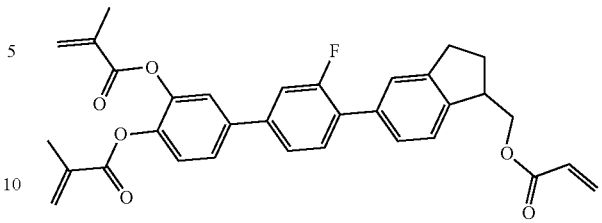
I-9-9
I-9-10
I-9-11
I-9-12
I-9-13

I-9-14
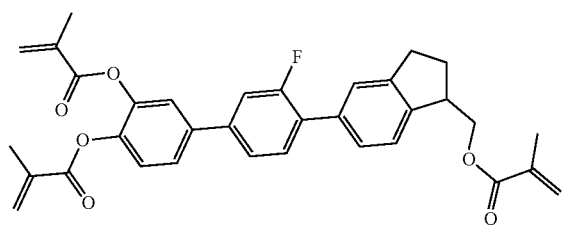
I-9-19
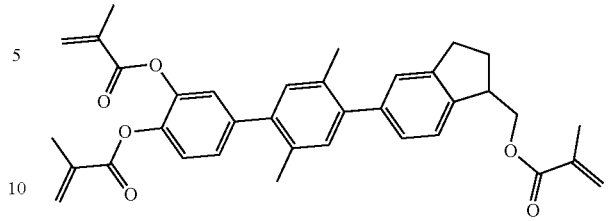
I-9-15
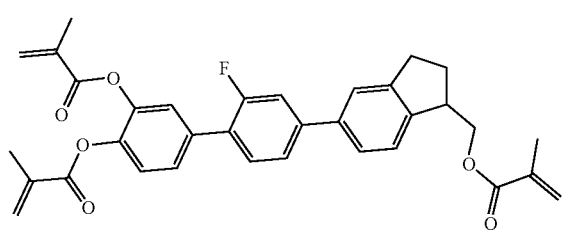
I-10-1
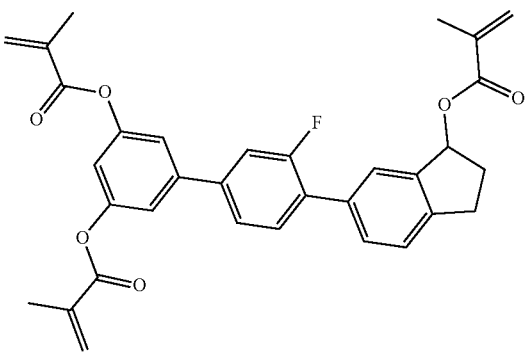
I-9-16
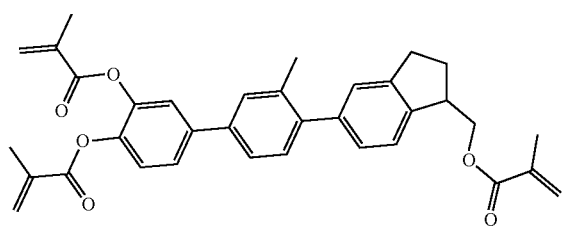
I-10-2
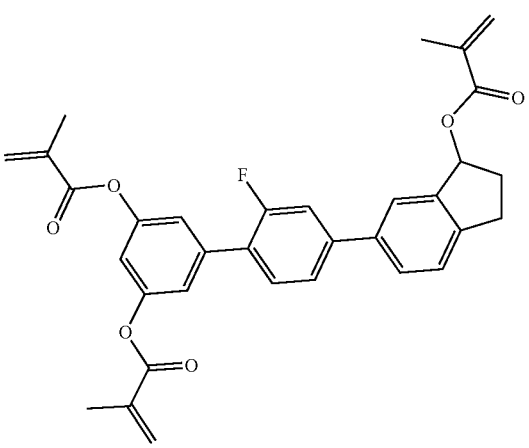
I-9-17
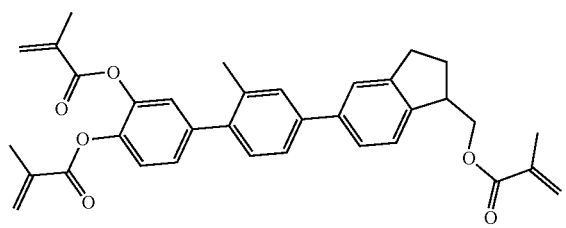
I-9-18
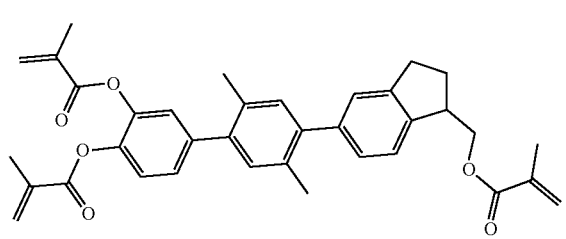
I-10-3
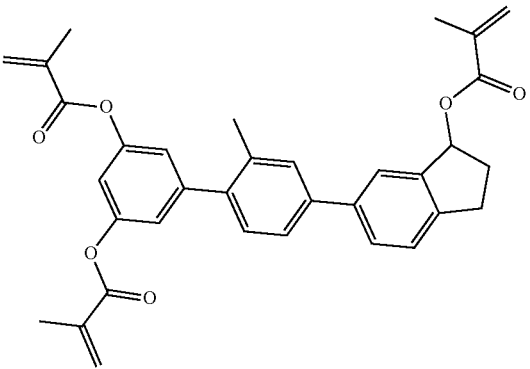

I-10-4
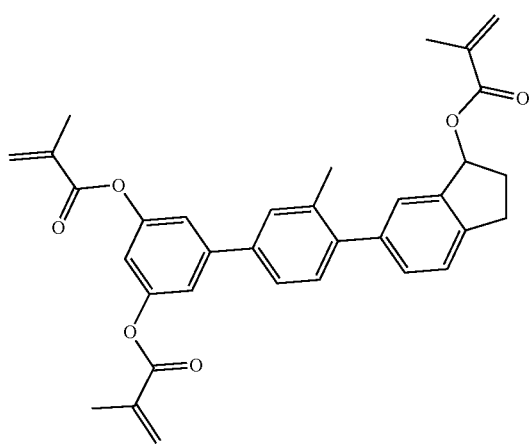
I-10-5
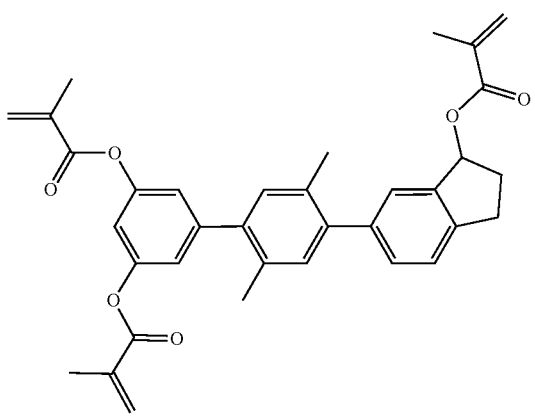
I-10-6
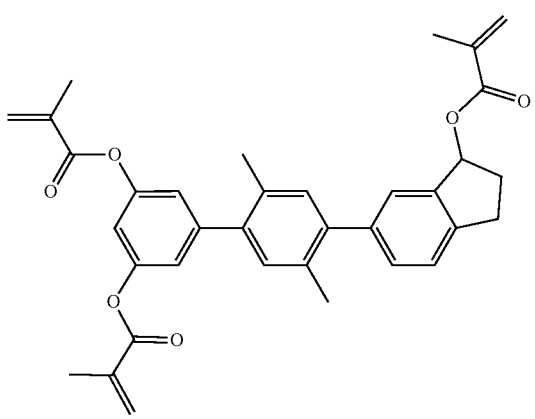
I-10-7
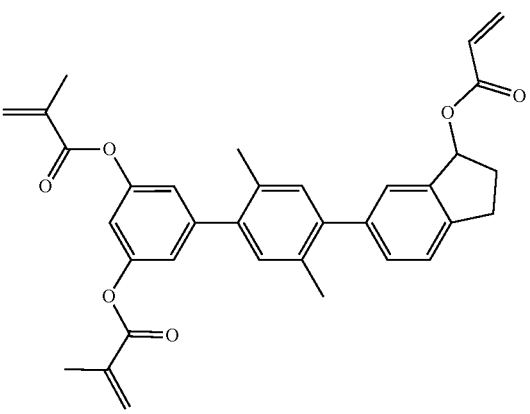
I-10-8
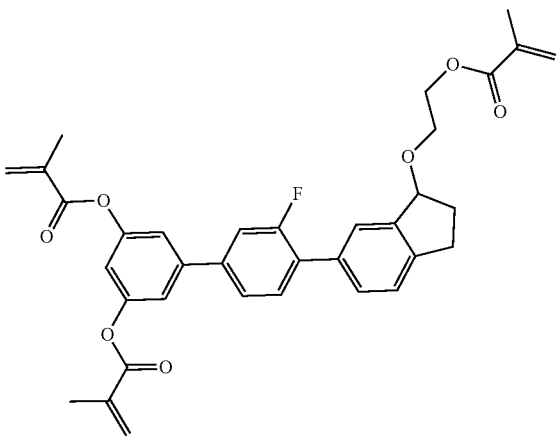
I-10-9
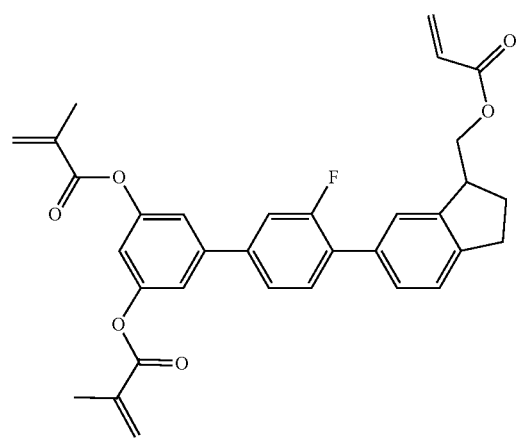

I-10-10
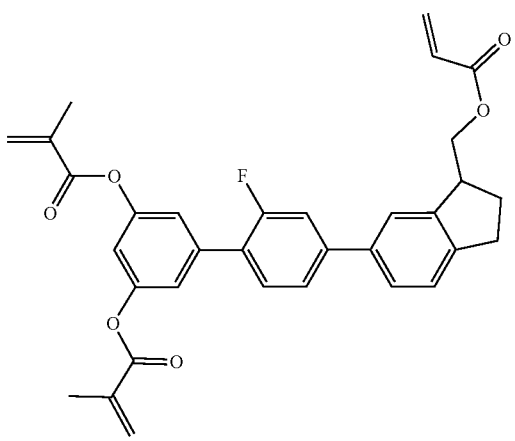
I-10-13
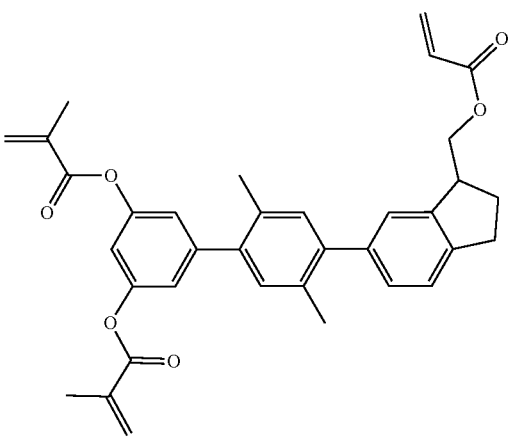
I-10-11
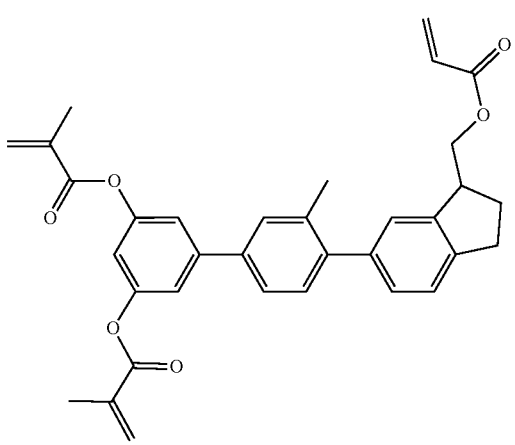
I-10-14
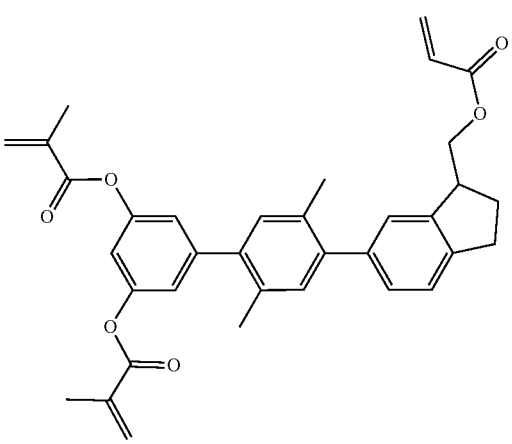
I-10-12
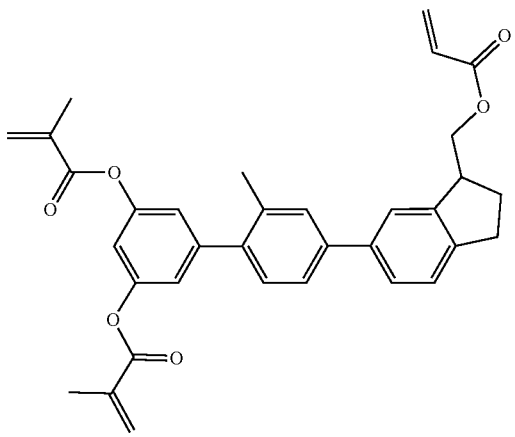
I-10-15
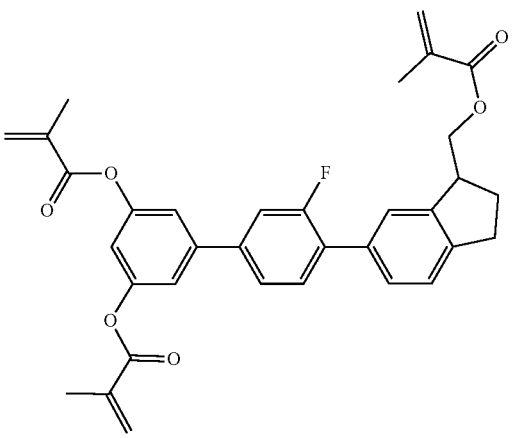

I-10-16
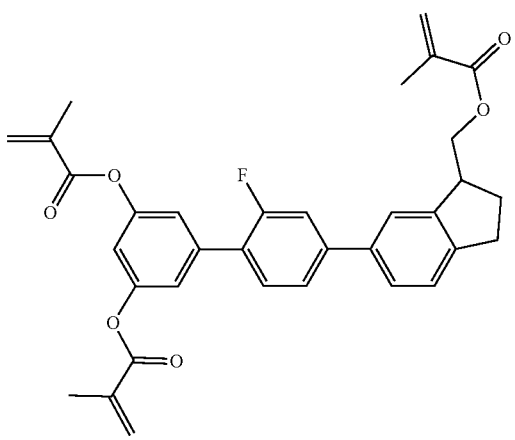
I-10-17
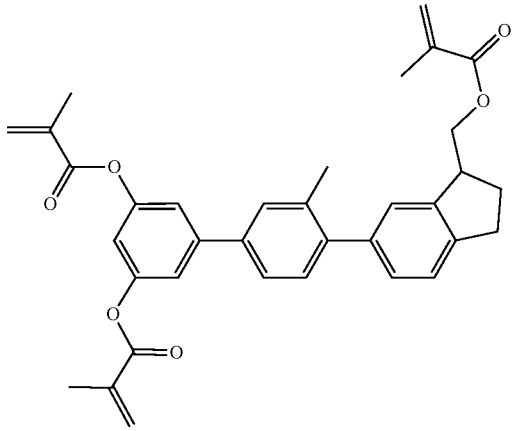
I-10-18
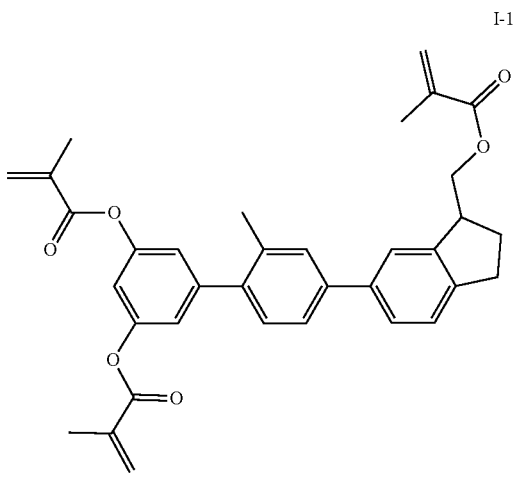
I-10-19
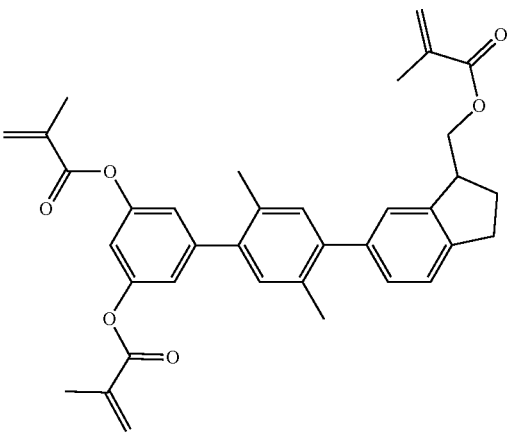
I-10-20
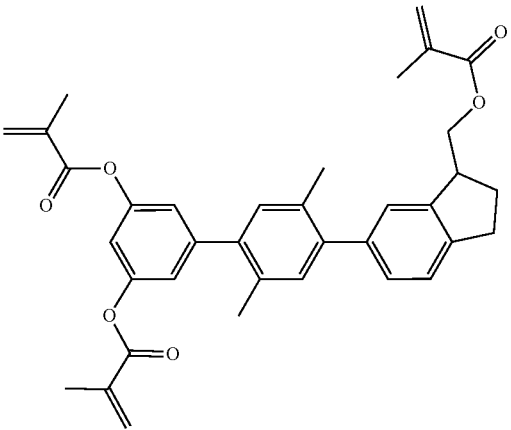
I-11-1
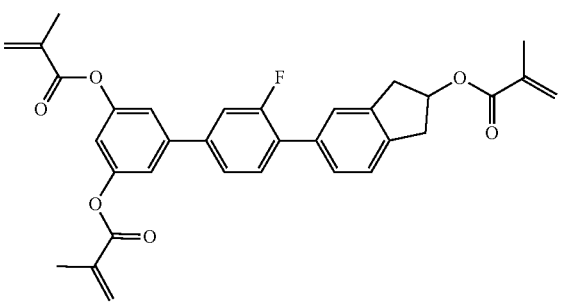
I-11-2
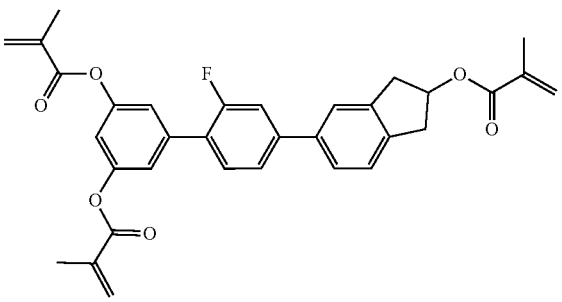

I-11-3
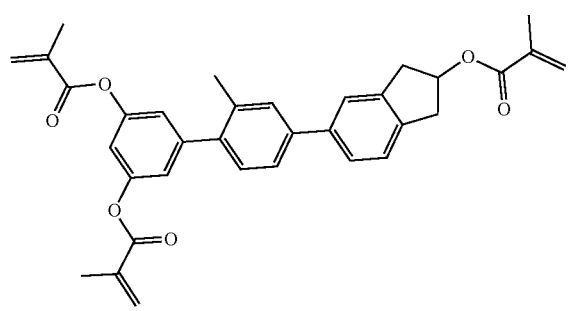
I-11-4
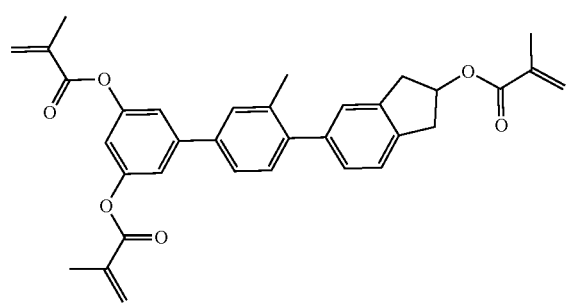
I-11-5
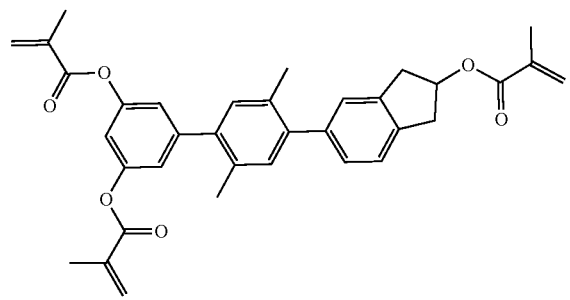
I-11-6
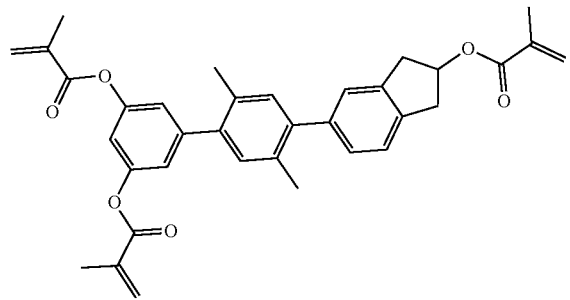
I-11-7
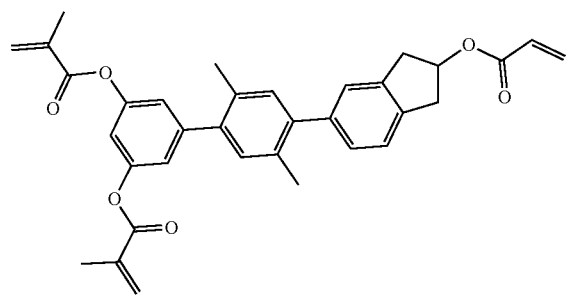
I-11-8
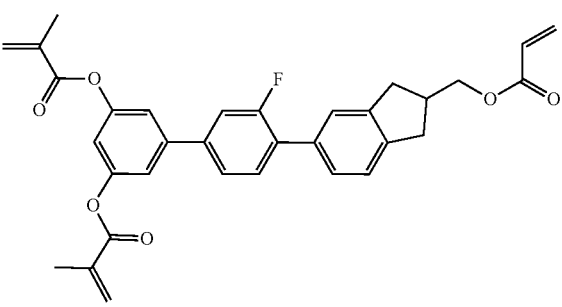
I-11-9
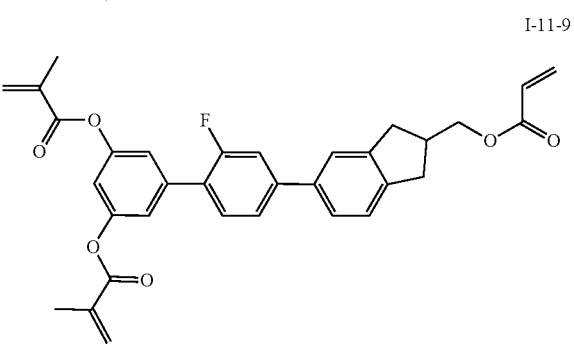
I-11-10
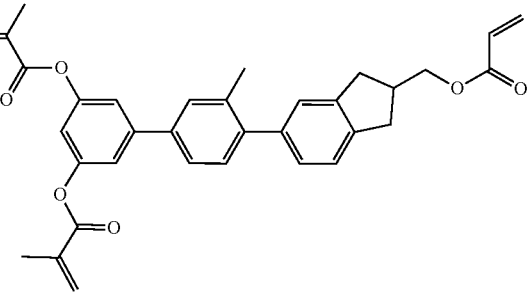
I-11-11
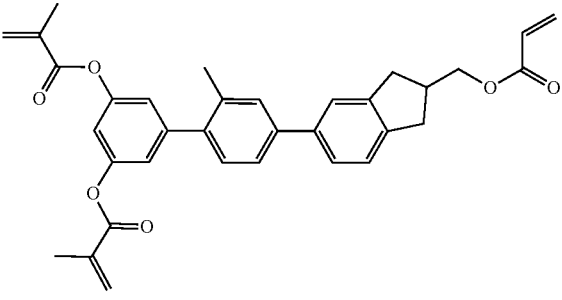
I-11-12
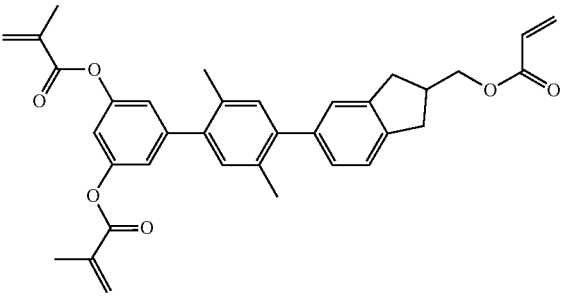

I-11-13
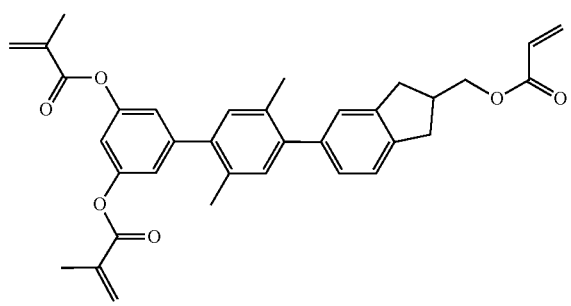
I-11-14
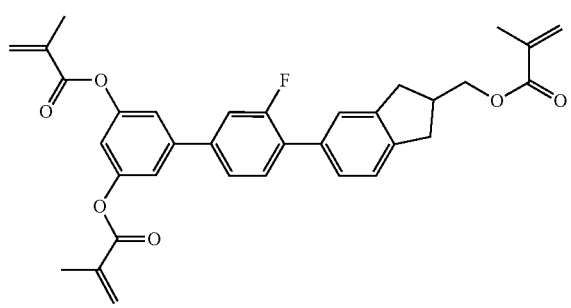
I-11-15
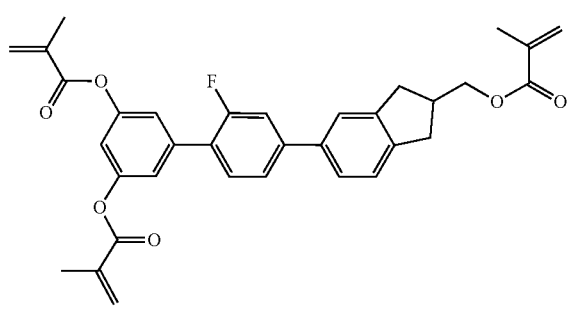
I-11-16
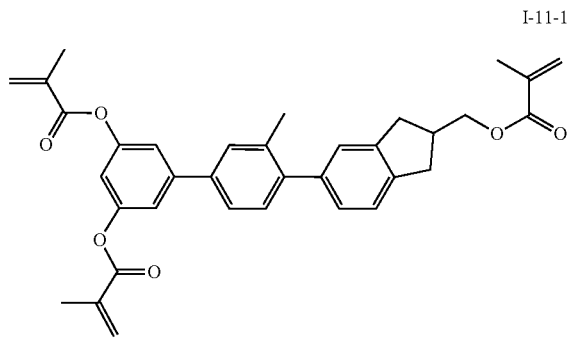
I-11-17
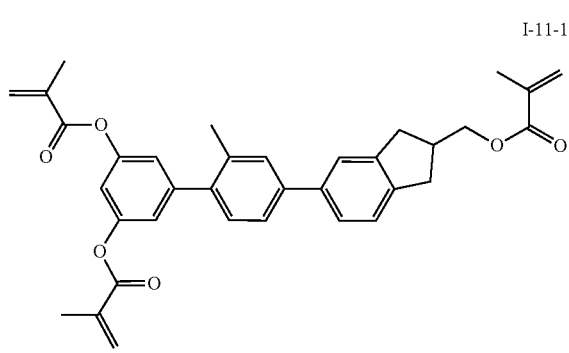
I-11-18
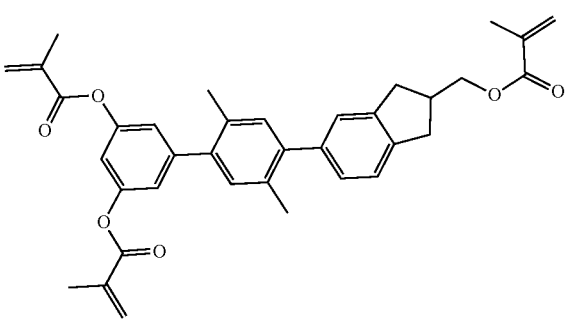
I-11-19
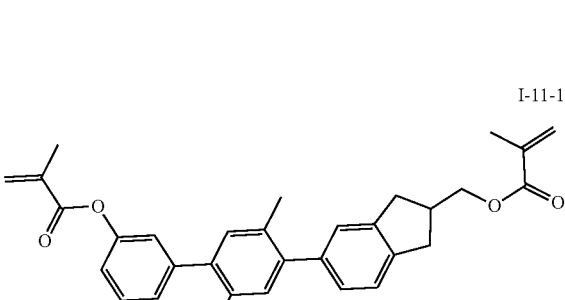
I-12-1
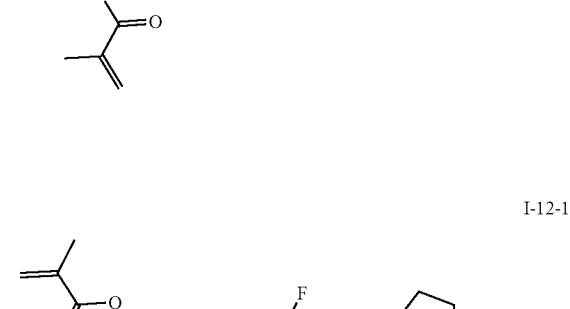
I-12-2
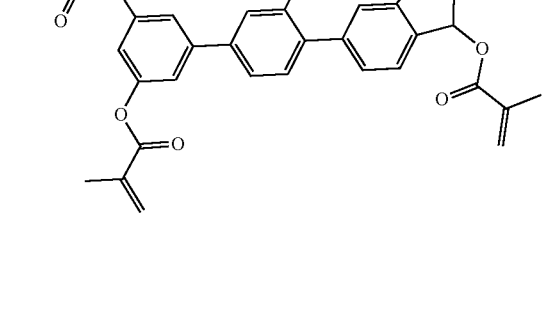

I-12-3
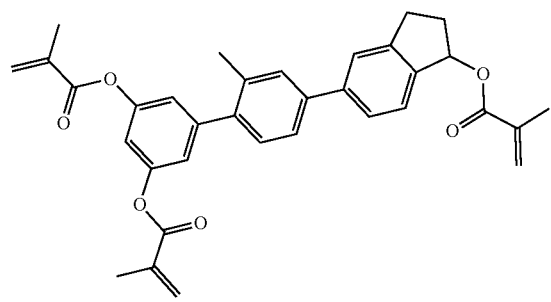
I-12-4
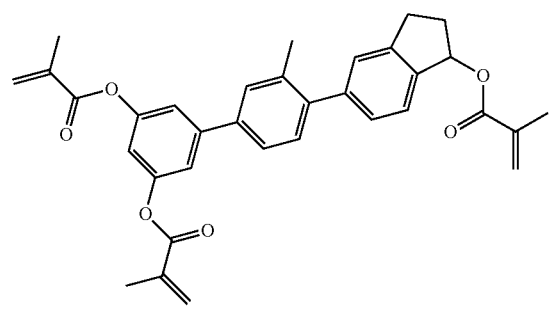
I-12-5
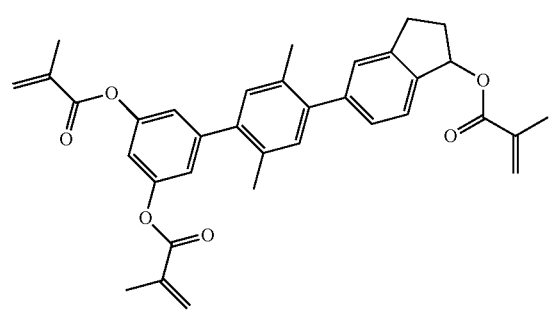
I-12-6
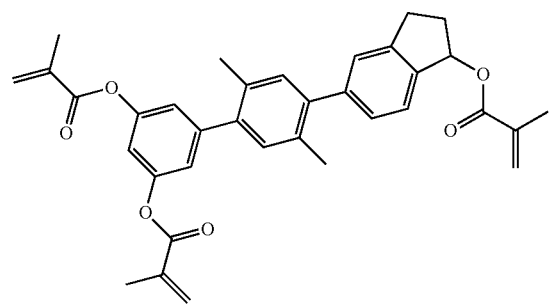
I-12-7
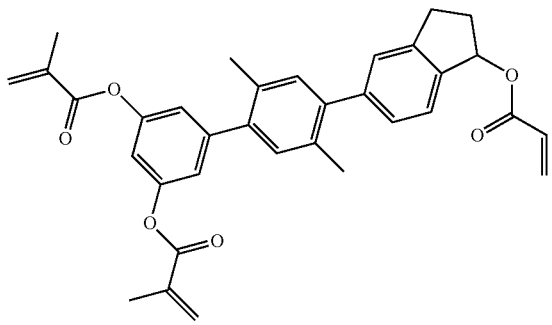
I-12-8
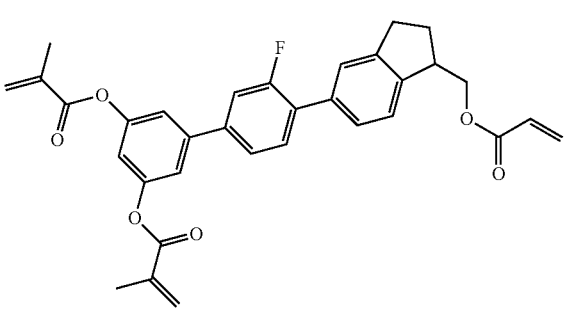
I-12-9
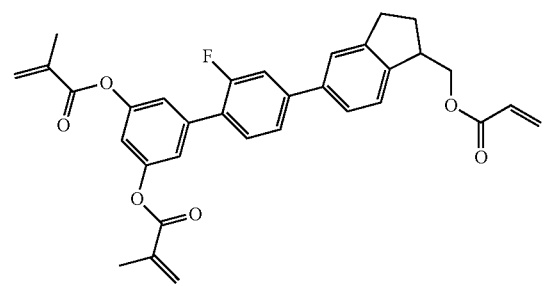
I-12-10
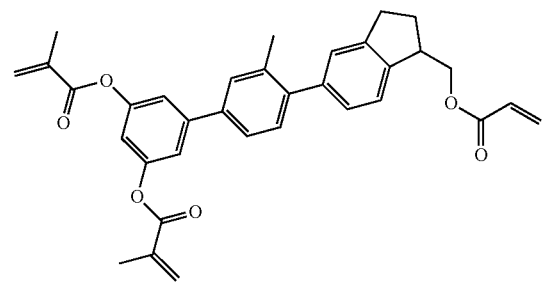
I-12-11
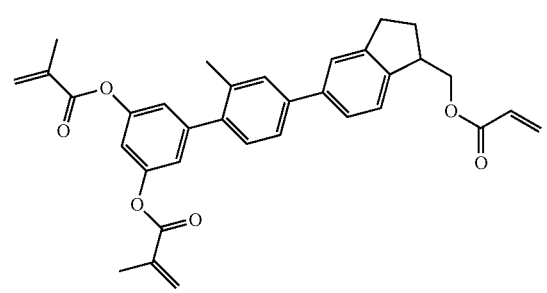

I-12-12
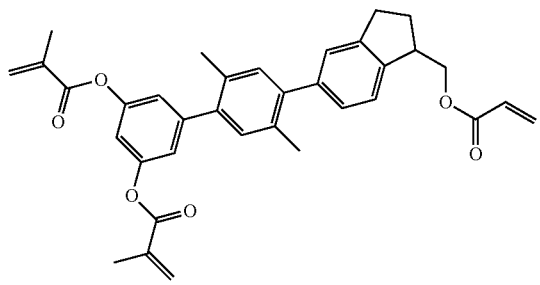
I-12-13
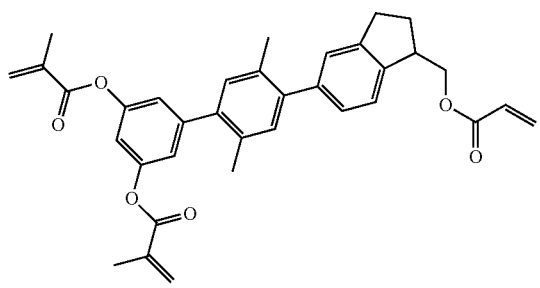
I-12-14
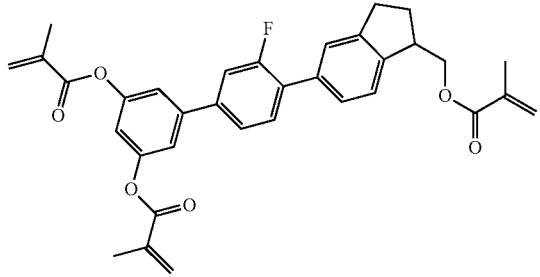
I-12-15
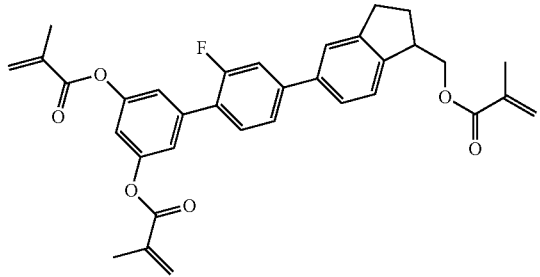
I-12-16
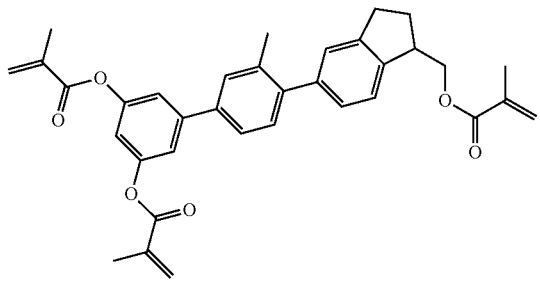
I-12-17
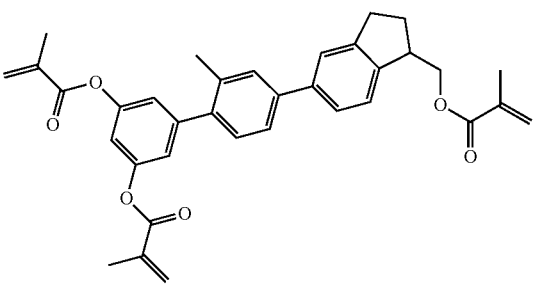
I-12-18
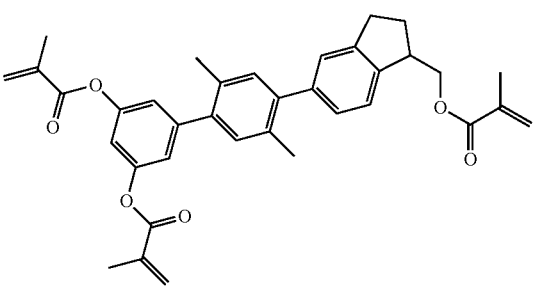
I-12-19
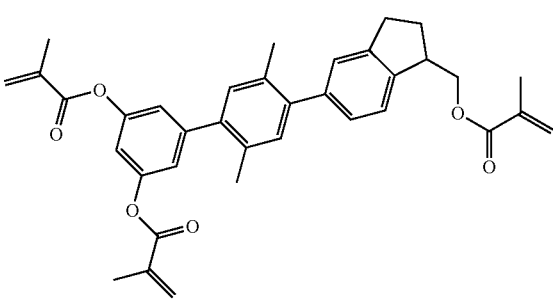
I-13-1
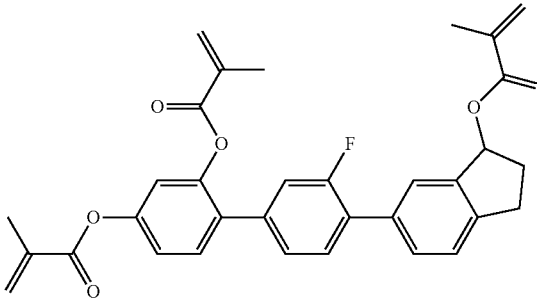
I-13-2
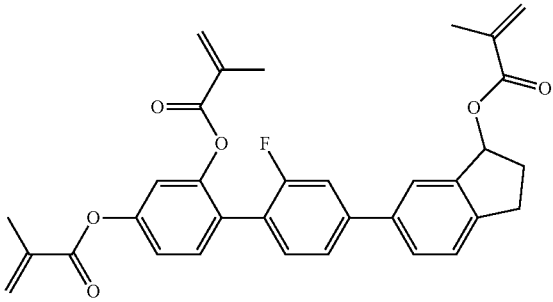

I-13-3
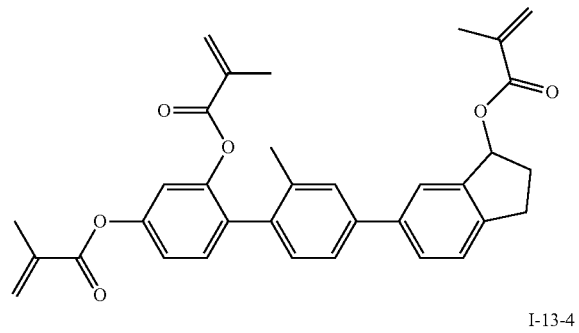
I-13-4
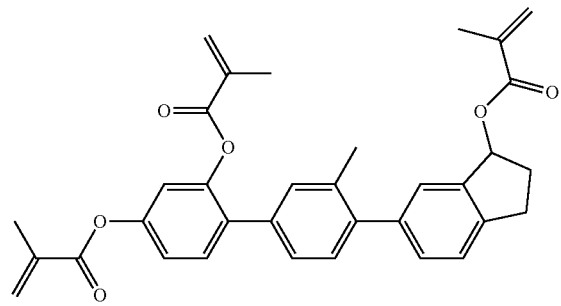
I-13-5
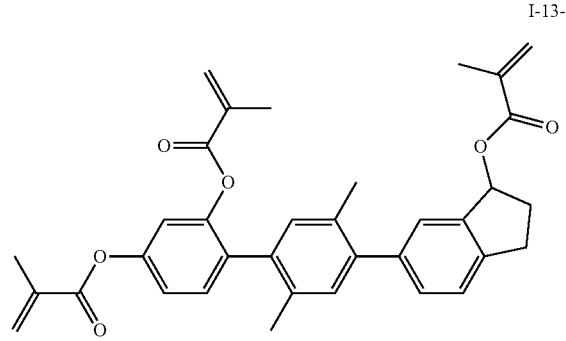
I-13-6
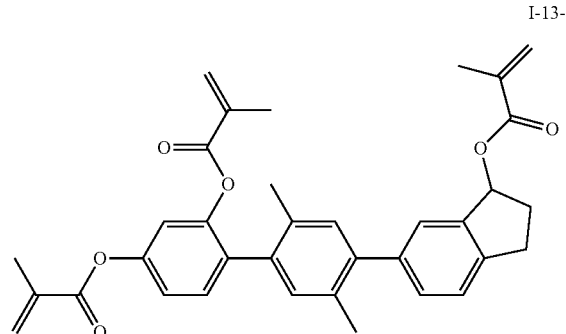
I-13-7
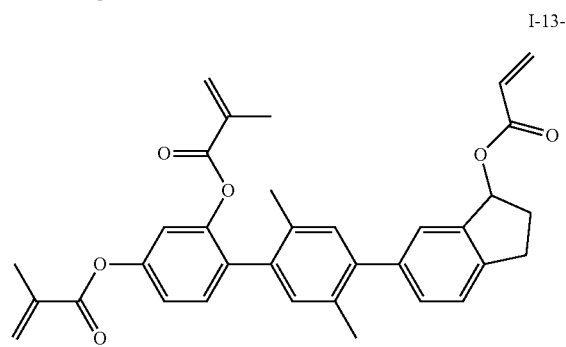
I-13-8
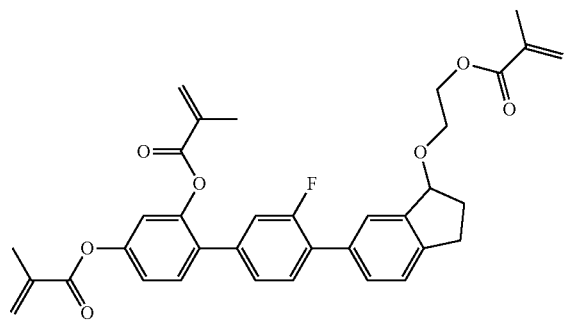
I-13-9
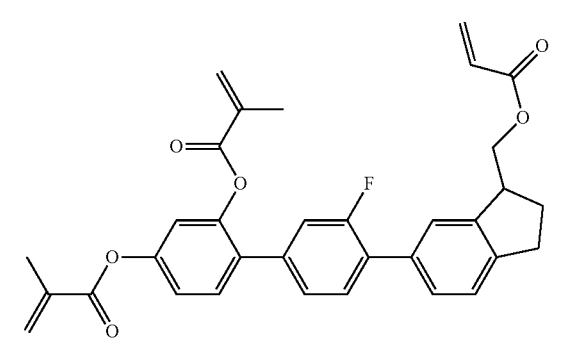
I-13-10
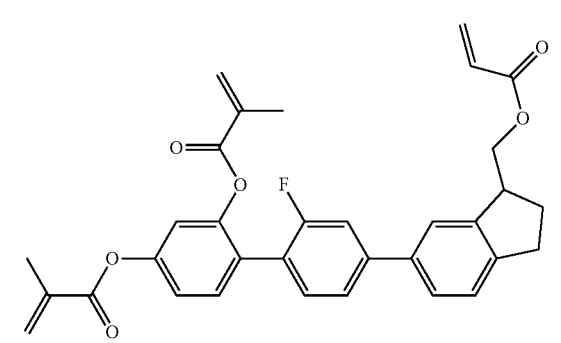
I-13-11
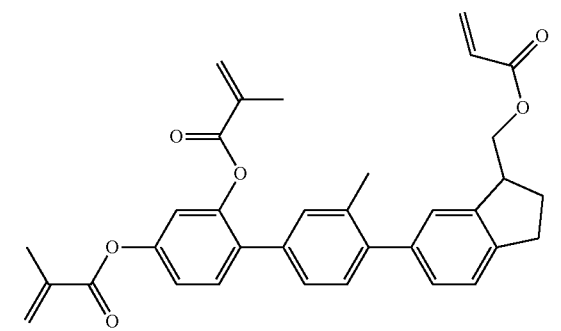

I-13-12
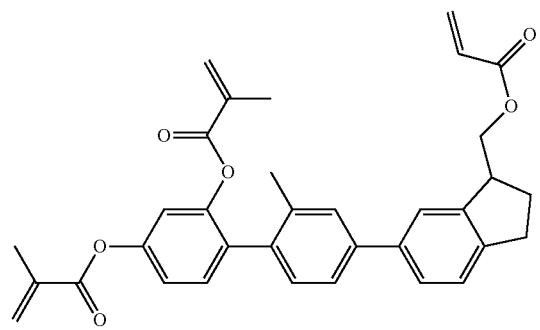
I-13-13
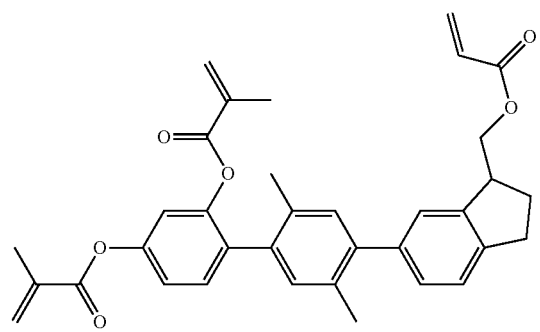
I-13-14
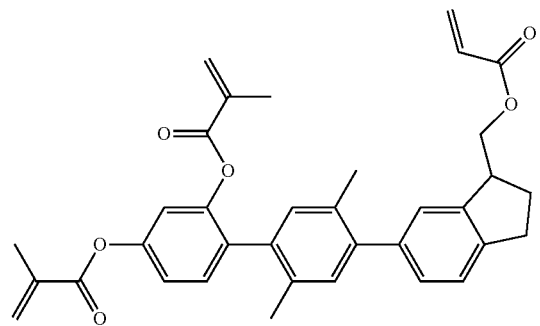
I-13-15
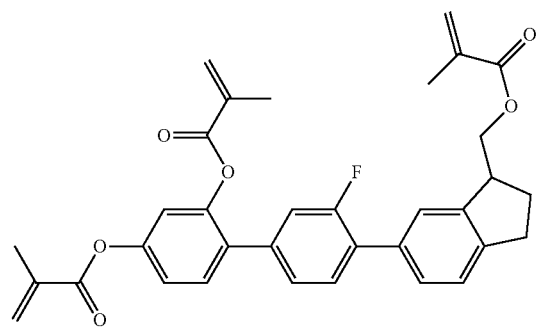
I-13-16
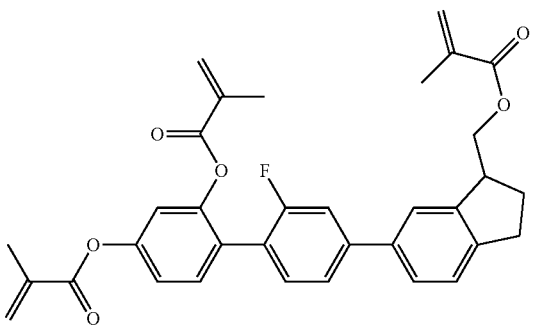
I-13-17
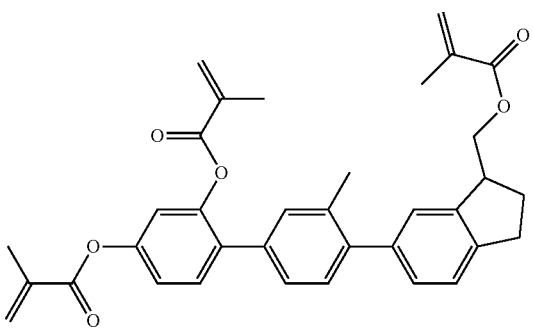
I-13-18
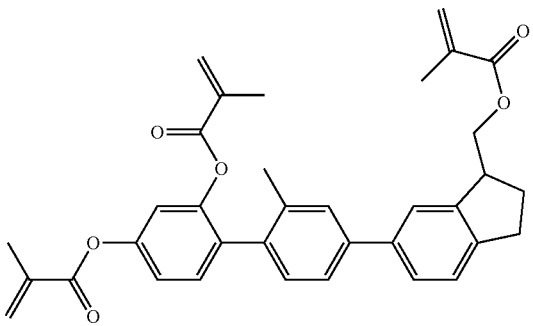
I-13-19
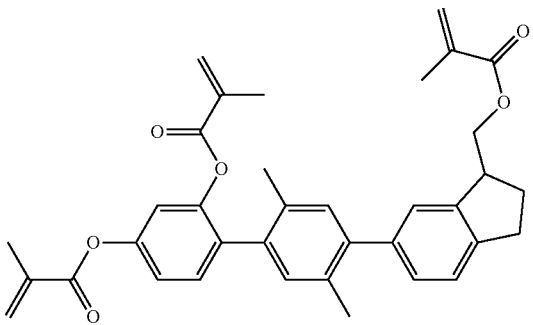

I-13-20
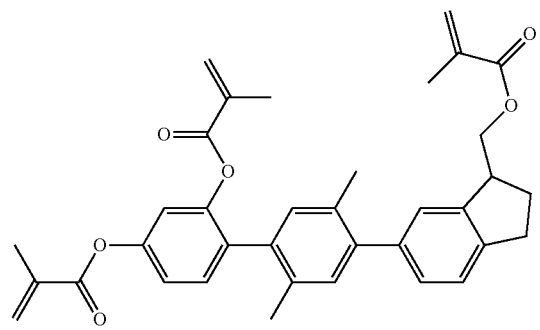
I-14-1
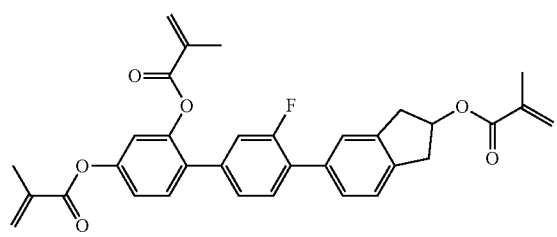
I-14-2
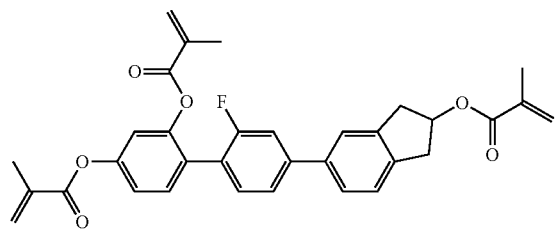
I-14-3
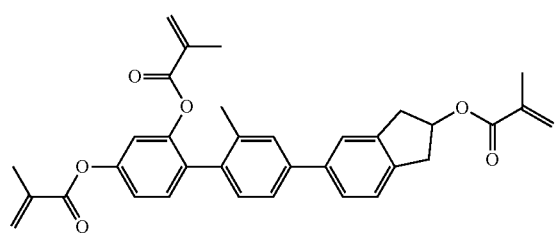
I-14-4
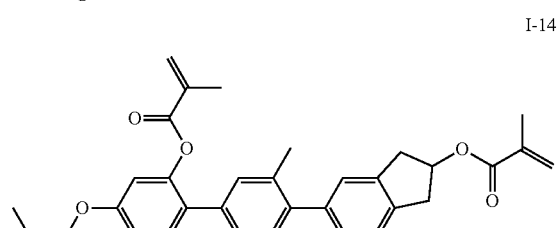
I-14-5
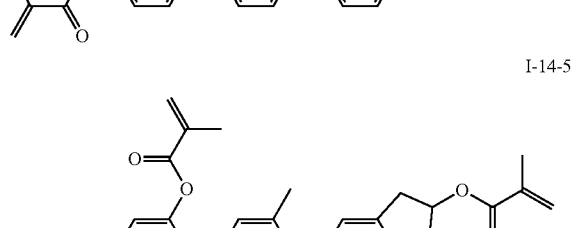
I-14-6
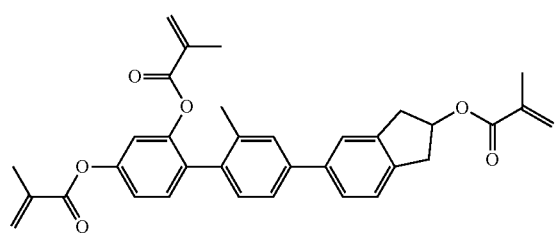
I-14-7
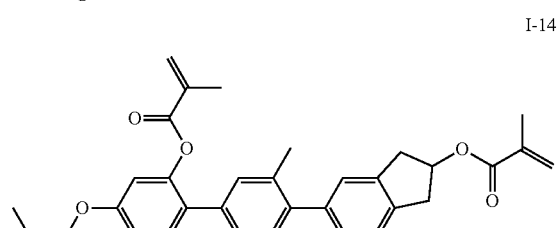
I-14-8
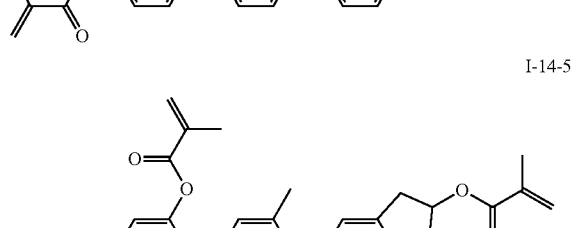
I-14-9
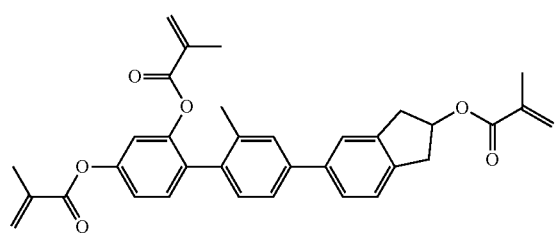
I-14-10
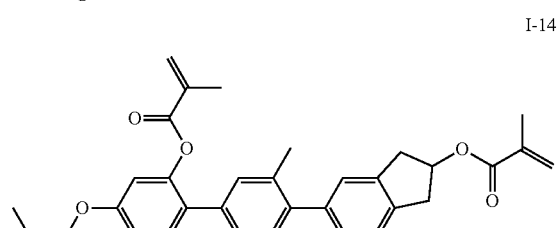
I-14-11
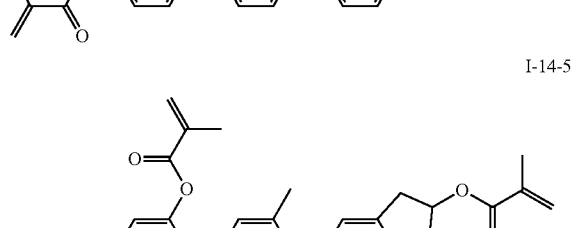

I-14-12
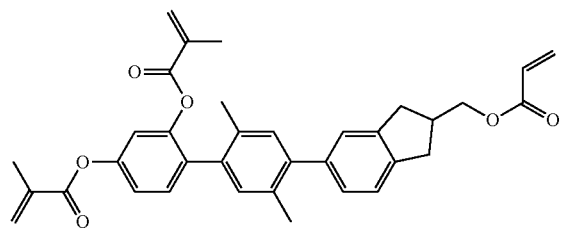
I-14-13
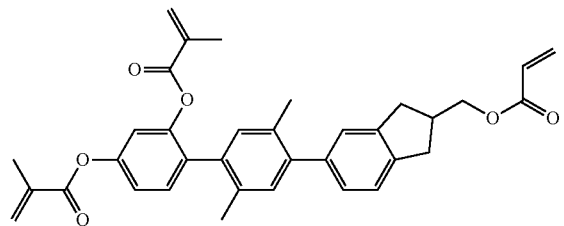
I-14-14
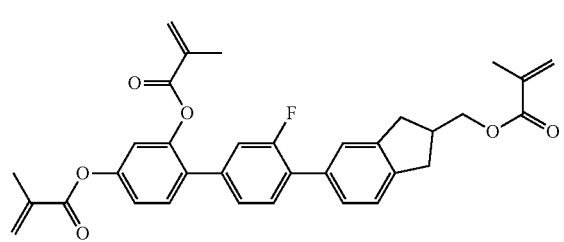
I-14-15
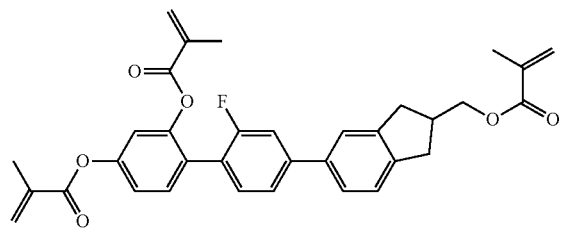
I-14-16
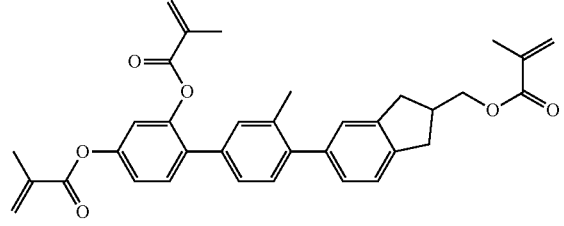
I-14-17
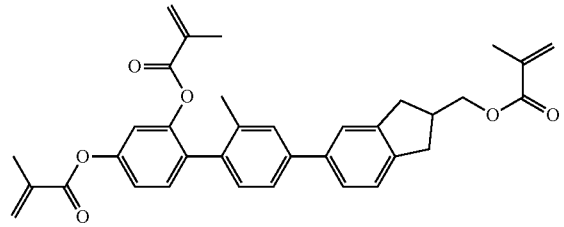
I-14-18
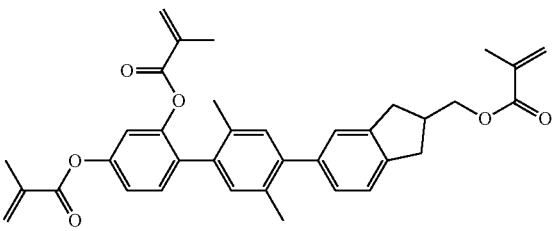
I-14-19
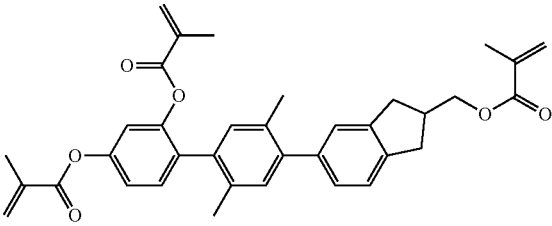
I-15-1
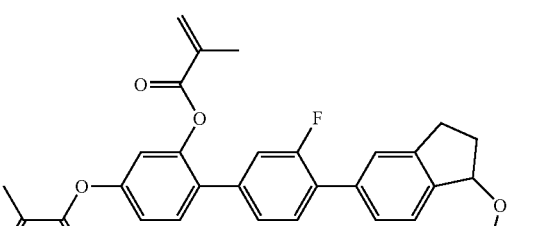
I-15-2
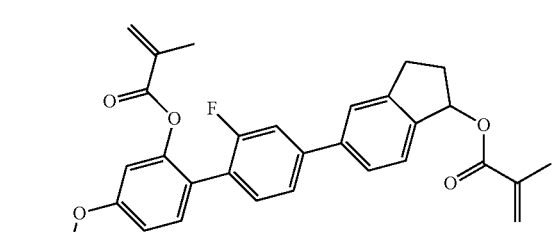
I-15-3
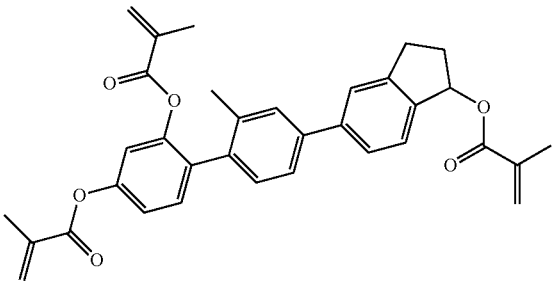

I-15-4
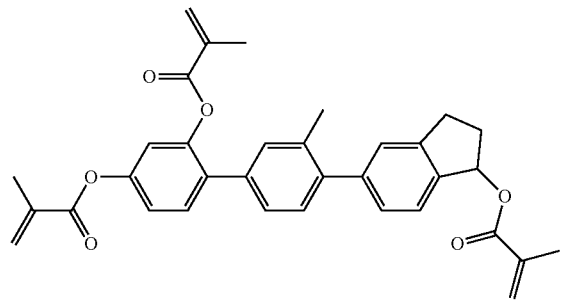
I-15-5
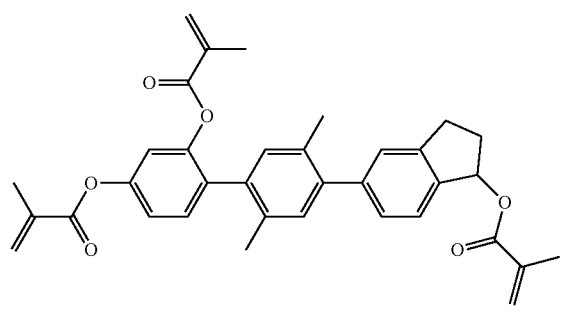
I-15-6
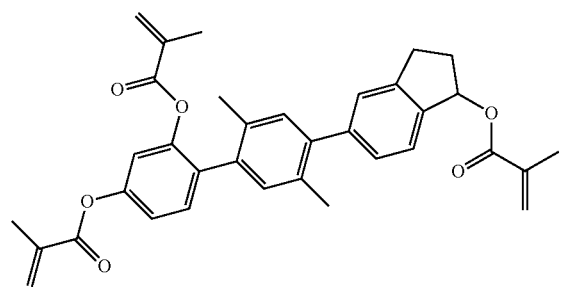
I-15-7
I-15-8
I-15-9
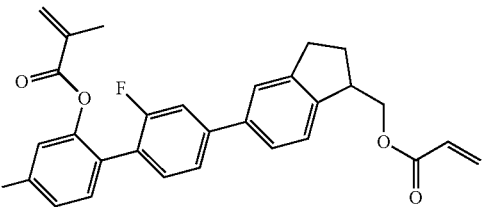
I-15-10
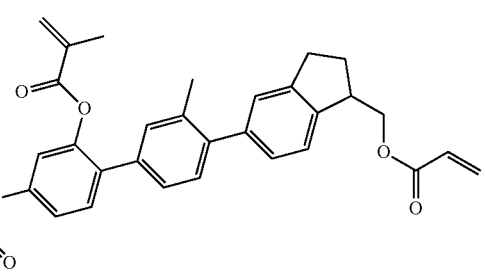
I-15-11
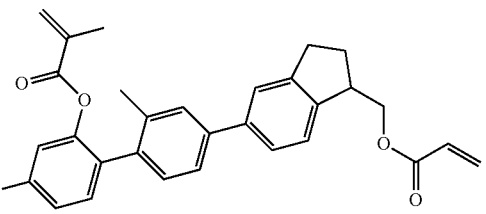
I-15-12
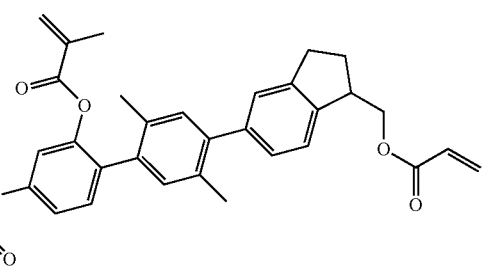
I-15-13
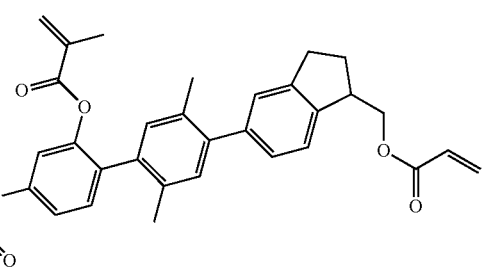

I-15-14
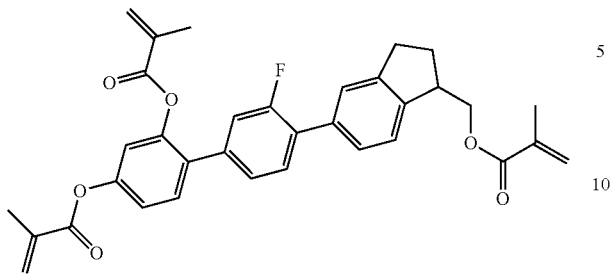
I-15-15
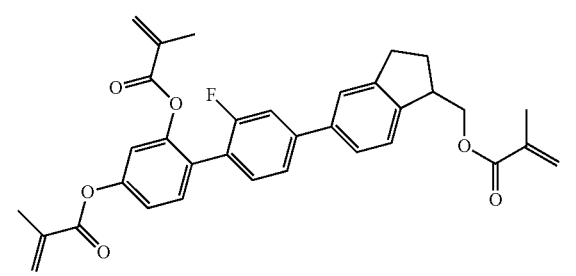
I-15-16
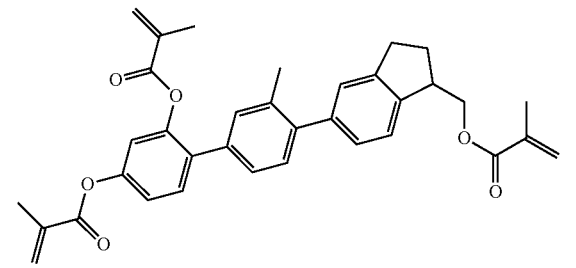
I-15-17
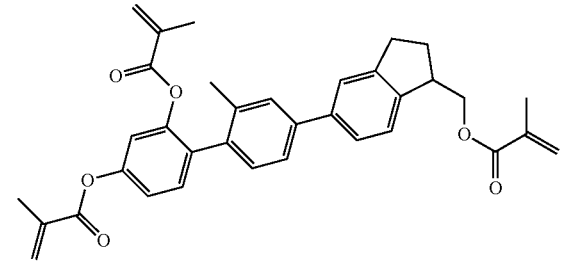
I-15-18
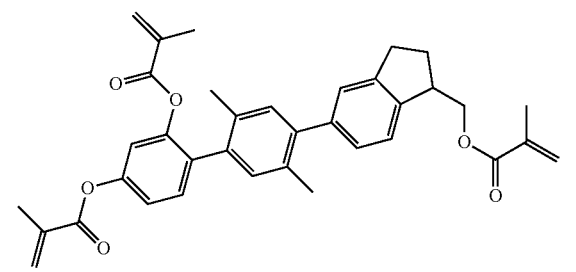
I-15-19
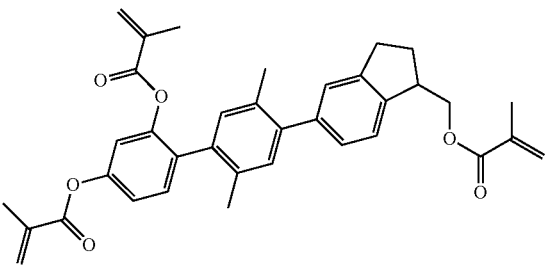
I-19-1
I-19-2
I-19-3
I-19-4
I-19-5
I-19-6

I-19-7
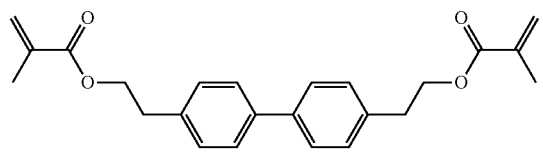
I-19-8
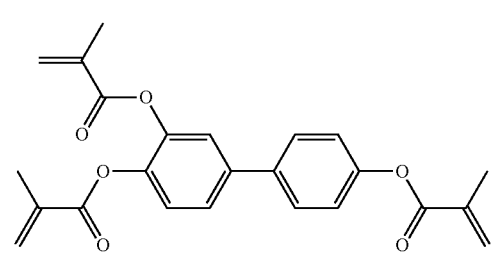
I-19-9
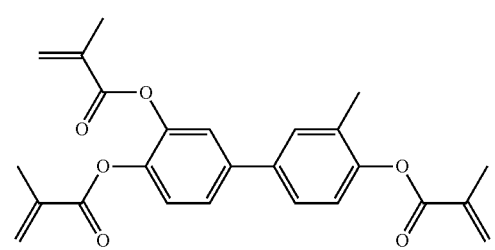
I-19-10
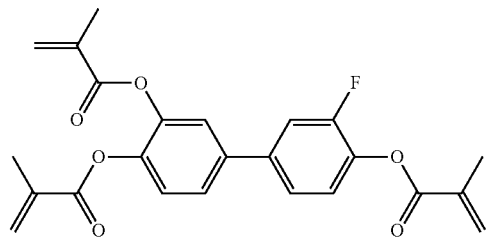
I-19-11
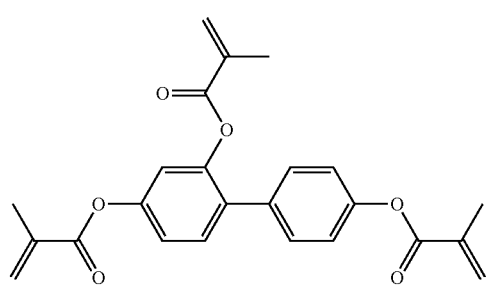
I-19-12
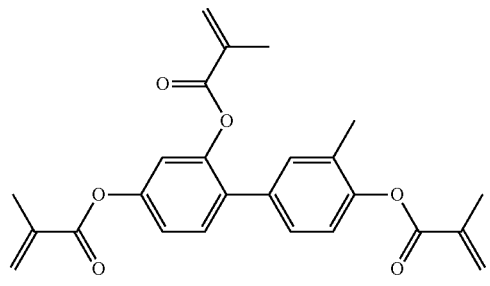
I-19-13
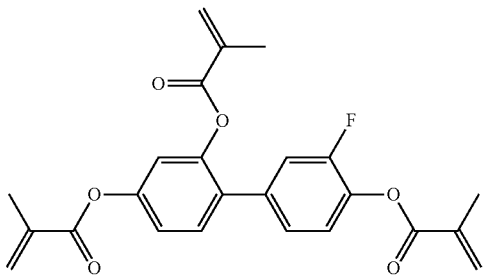
I-19-14
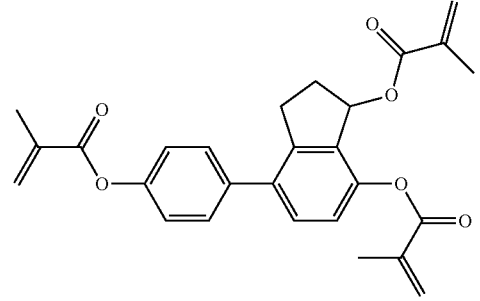
I-19-15
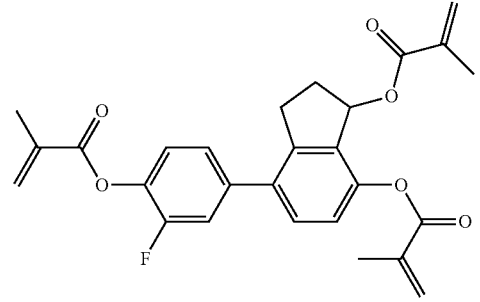
I-19-16
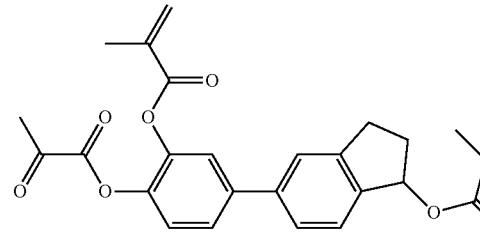
I-19-17
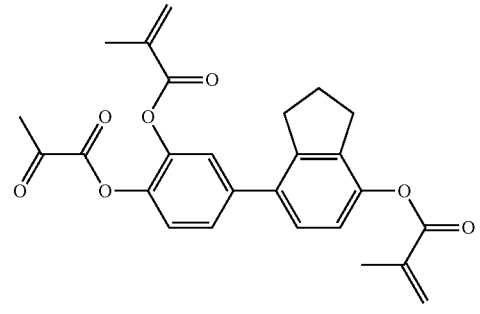

I-20-1
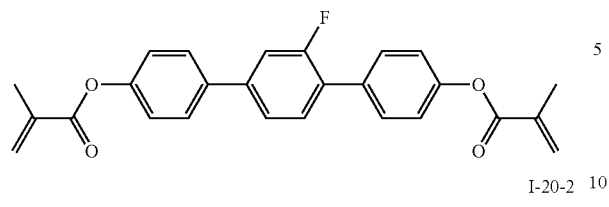
I-20-2
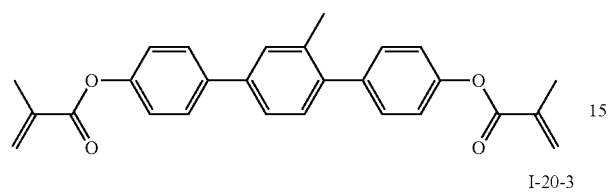
I-20-3
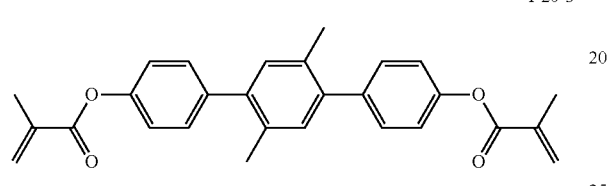
I-20-4
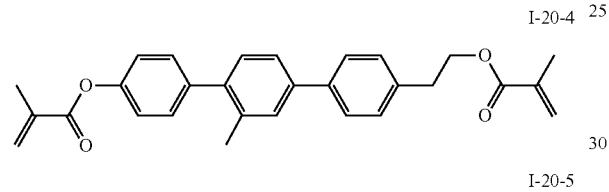
I-20-5
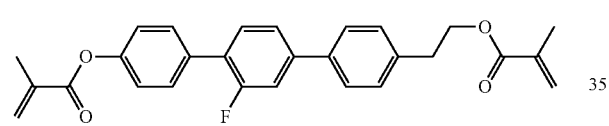
I-20-7
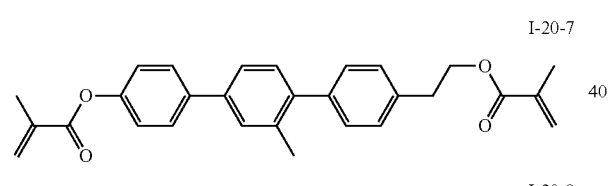
I-20-8
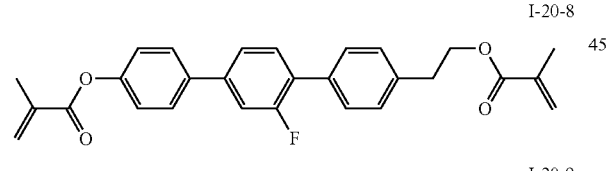
I-20-9
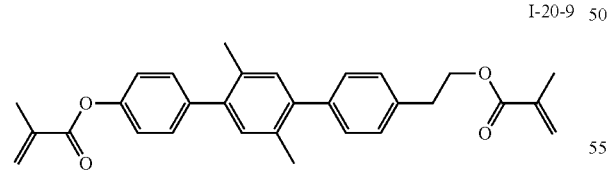
I-20-10
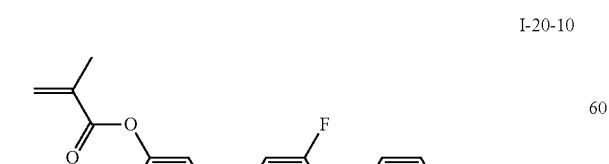
I-20-11
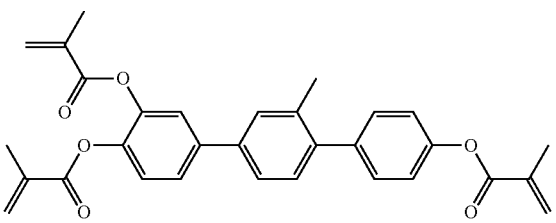
I-20-12
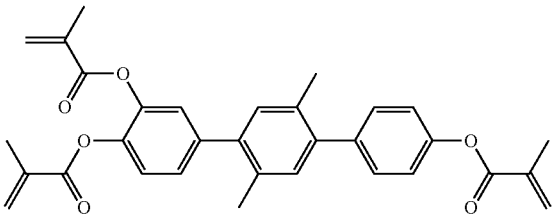
I-20-13
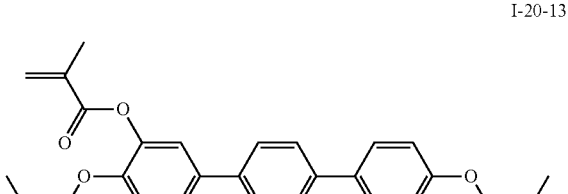
I-20-14
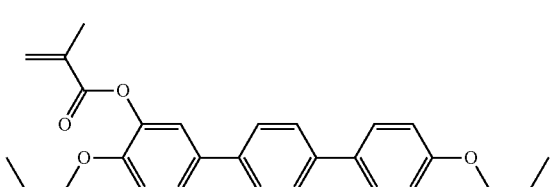
I-20-15
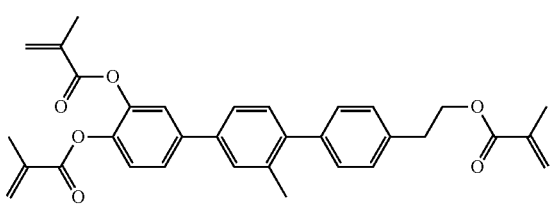
I-20-16
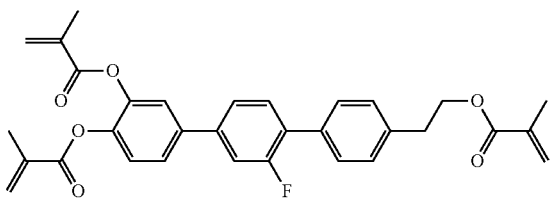

-continued

I-20-17

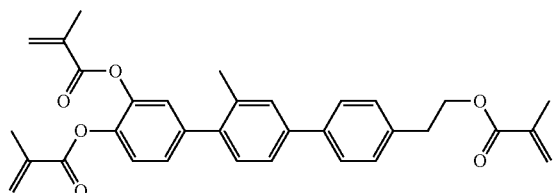

I-20-18

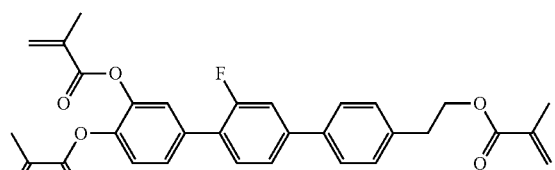

I-20-19

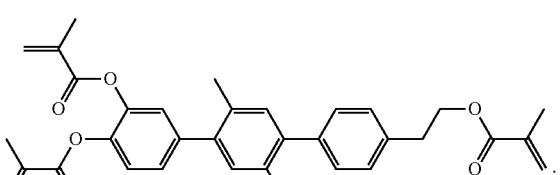

3. The liquid crystal composition according to claim 1, comprising one or more polymerizable liquid crystal compounds represented by formula IV and one or more polymerizable liquid crystal compounds represented by formula V:

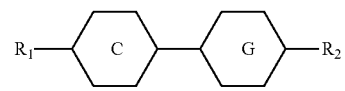
IV

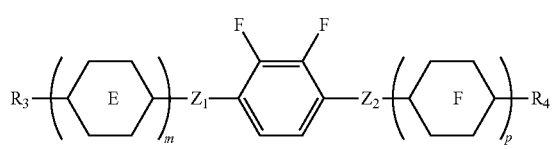
V wherein $R_1$, $R_2$, $R_3$, and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one $CH_2$ or several $CH_2$ that are not adjacent in the groups represented by $R_3$ and $R_4$ may be substituted with cyclopentyl, cyclobutyl or cyclopropyl;

$Z_1$ and $Z_2$ each independently represent a single bond, —$CH_2CH_2$— or —$CH_2O$—;

each independently represent

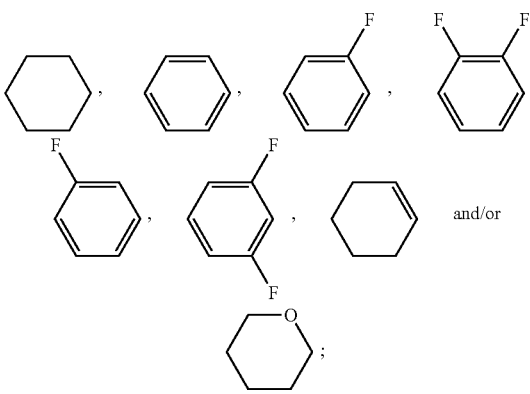

each independently represent one or more of m represents 1 or 2; and p represents 0, 1 or 2.

4. The liquid crystal composition according to claim 3, wherein in said liquid crystal composition, the total mass content of the polymerizable liquid crystal composition is 0.01%-1%, the total mass content of said one or more compounds represented by formula IV is 20%-80%, and the total mass content of said one or more compounds represented by formula V is 20%-60%.

5. The liquid crystal composition according to claim 3, wherein said one or more compounds represented by formula IV are one or more compounds represented by formulas IV-1 to IV-15; and said one or more compounds represented by formula V are one or more compounds represented by formulas V-1 to V-12

IV-1
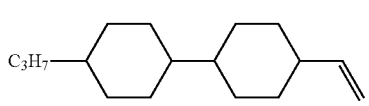

IV-2
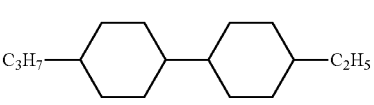

IV-3
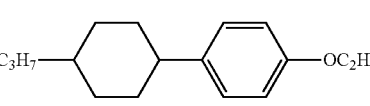

IV-4
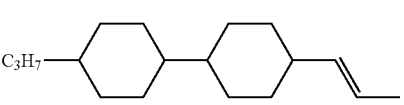

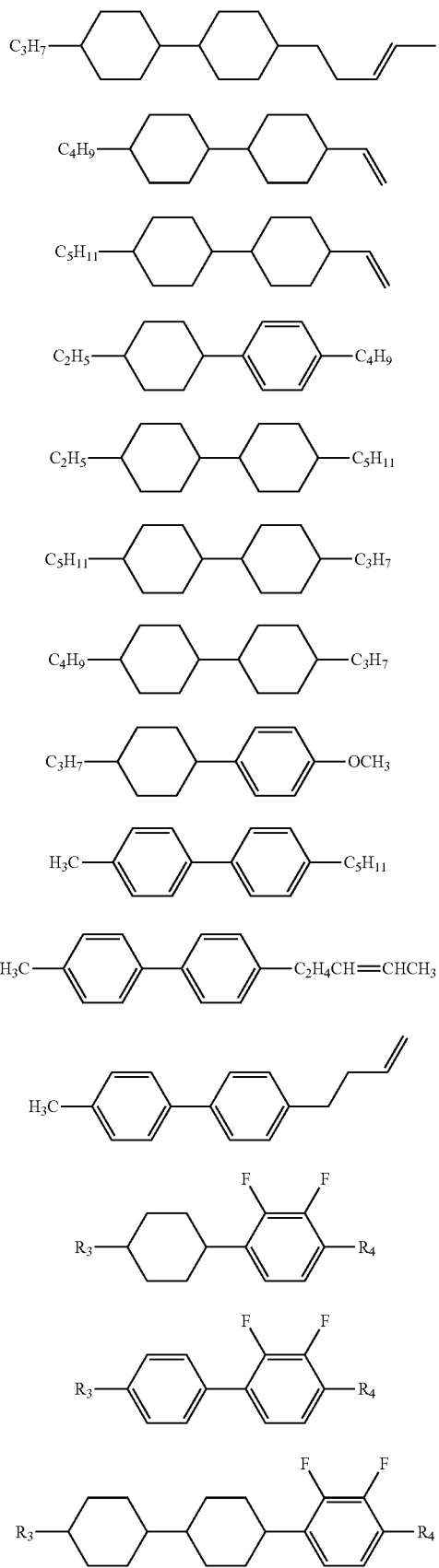

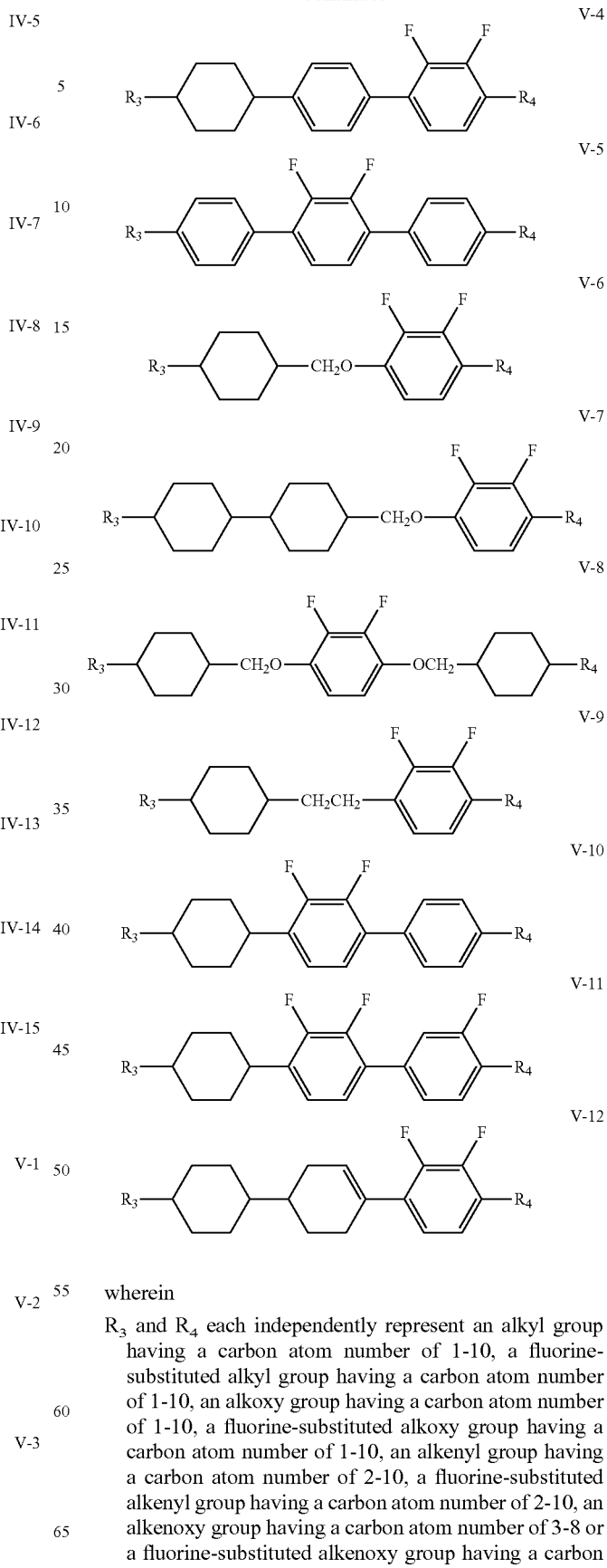

wherein

R$_3$ and R$_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one CH$_2$ or several CH₂ that are not adjacent in the groups represented by R₃ and R₄ may be substituted with cyclopentyl, cyclobutyl or cyclopropyl.

6. The liquid crystal composition according to claim 3, wherein said liquid crystal composition is a negative liquid crystal composition and further comprises one or more compounds represented by formula VI:

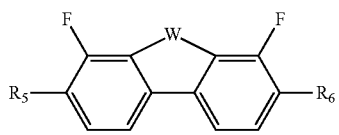

formula VI wherein

R₅ and R₆ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, wherein any one or more CH₂ in the groups represented by R₅ and R₆ may be replaced by cyclopentyl, cyclobutyl or cyclopropyl; and W represents O, S or —CH₂O—.

7. The liquid crystal composition according to claim 3, further comprising one or more compounds represented by formula VII

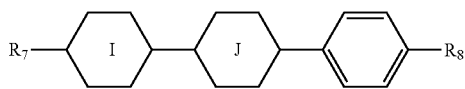

formula VII wherein

R₇ and R₈ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; and

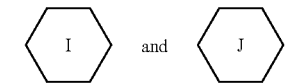

each independently represent 1,4-phenylene, 1,4-cyclohexylene or 1,4-cyclohexenylene.

8. The liquid crystal composition according to claim 3, further comprising at least one selected from compounds represented by formula VII and/or IX, as a functional additive

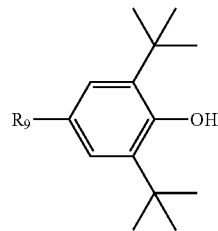

formula VII

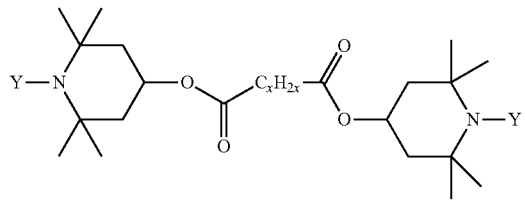

formula IX wherein

R₉ represents an alkyl group having a carbon atom number of 1-10 or an alkoxy group having a carbon atom number of 1-10, and one or more methylene groups in the group represented by R₉ may be substituted with 1,4-cyclohexylene, 2,4-dioxane, cyclopentyl and/or cyclopropyl;

each Y independently represents H or methyl; and

X represents 8, 10 or 12.

9. A liquid crystal display element or liquid crystal display comprising the liquid crystal composition of claim 3, wherein said display element or display is an active matrix display element or display or a passive matrix display element or display.

\* \* \* \* \*